(12) United States Patent
Marty et al.

(10) Patent No.: US 11,896,884 B2
(45) Date of Patent: *Feb. 13, 2024

(54) SYSTEMS AND METHODS FOR EVALUATING PLAYER PERFORMANCE

(71) Applicant: Pillar Vision, Inc., Menlo Park, CA (US)

(72) Inventors: Alan W. Marty, Menlo Park, CA (US); John Carter, Elkmont, AL (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,468

(22) Filed: Jan. 17, 2023

(65) Prior Publication Data
US 2023/0173367 A1 Jun. 8, 2023

Related U.S. Application Data

(63) Continuation of application No. 17/862,606, filed on Jul. 12, 2022, now abandoned, which is a (Continued)

(51) Int. Cl.
*A63B 69/00* (2006.01)
*A63B 24/00* (2006.01)

(52) U.S. Cl.
CPC ...... *A63B 69/0071* (2013.01); *A63B 24/0021* (2013.01); *A63B 2024/0028* (2013.01); *A63B 2024/0053* (2013.01); *A63B 2220/806* (2013.01)

(58) Field of Classification Search
CPC ............ A63B 69/0074; A63B 24/0021; A63B 2024/0053; A63B 24/0062;
(Continued)

(56) References Cited

U.S. PATENT DOCUMENTS

| 4,858,920 A | 8/1989 | Best |
| 5,039,977 A | 8/1991 | Mele |

(Continued)

OTHER PUBLICATIONS

Hahn, "Knicks may have lost time for last shot," https://www.newsday.com/sports/basketball/knicks/knicks-may-have-lost-time-for-last-shot-1.2548130, 2010.

(Continued)

*Primary Examiner* — Pierre E Elisca
(74) *Attorney, Agent, or Firm* — Butler Snow LLP; Jon E. Holland

(57) ABSTRACT

Systems and methods relating to evaluating the performance of a person playing basketball are described. The systems and methods can be used to provide an evaluation sequence that can determine and evaluate the performance level of a person at one or more basketball skills. The evaluation sequence for the person can include a first sequence of actions that are the same each person being evaluated for a particular skill and a second sequence of actions that is based on the results of the first sequence and may be different for each person. Once the first and second sequences have been completed by the person, the system can determine a performance level for the person for the skills being evaluated.

28 Claims, 17 Drawing Sheets

Related U.S. Application Data continuation of application No. 16/505,661, filed on Jul. 8, 2019, now Pat. No. 11,413,514, which is a continuation-in-part of application No. 15/684,413, filed on Aug. 23, 2017, now Pat. No. 10,343,015.

(60) Provisional application No. 62/800,005, filed on Feb. 1, 2019.

(58) Field of Classification Search
CPC ............ A63B 71/0622; A63B 71/0669; A63B 2024/0025; A63B 2024/0037; A63B 2071/065; A63B 2071/0655; G07C 1/22
USPC ........................................ 434/248; 473/433
See application file for complete search history.

(56) References Cited

U.S. PATENT DOCUMENTS

| | | | |
|---|---|---|---|
| 5,294,913 A | 3/1994 | Mower | |
| 6,389,368 B1 | 5/2002 | Hampton | |
| 7,094,164 B2 | 8/2006 | Marty et al. | |
| 7,850,552 B2 | 12/2010 | Marty et al. | |
| 7,854,669 B2 | 12/2010 | Marty et al. | |
| 8,408,982 B2 | 4/2013 | Marty et al. | |
| 8,409,024 B2 | 4/2013 | Marty et al. | |
| 8,617,008 B2 | 12/2013 | Marty et al. | |
| 8,622,832 B2 | 1/2014 | Marty et al. | |
| 8,908,922 B2 | 12/2014 | Marty et al. | |
| 8,948,457 B2 | 2/2015 | Marty et al. | |
| 9,238,165 B2 | 1/2016 | Marty et al. | |
| 9,283,431 B2 | 3/2016 | Marty et al. | |
| 9,283,432 B2 | 3/2016 | Marty et al. | |
| 9,345,929 B2 | 5/2016 | Marty et al. | |
| 9,358,455 B2 | 6/2016 | Marty et al. | |
| 9,370,704 B2 | 6/2016 | Marty et al. | |
| 9,390,501 B2 | 7/2016 | Marty et al. | |
| 9,442,464 B2 | 9/2016 | Singleton | |
| 9,694,238 B2 | 7/2017 | Marty et al. | |
| 9,697,617 B2 | 7/2017 | Marty et al. | |
| 9,734,405 B2 | 8/2017 | Marty et al. | |
| 9,886,624 B1 | 2/2018 | Marty et al. | |
| 10,092,793 B1 | 10/2018 | Marty et al. | |
| 10,610,757 B1 | 4/2020 | Marty | |
| 11,123,605 B1 | 9/2021 | Marty | |
| 11,413,514 B2 | 8/2022 | Marty et al. | |
| 2008/0259215 A1 | 10/2008 | Roeske | |
| 2008/0312010 A1 | 12/2008 | Marty et al. | |
| 2009/0156316 A1 | 6/2009 | Brown | |
| 2010/0030350 A1* | 2/2010 | House | G06V 20/40 |
| | | | 700/91 |
| 2010/0085167 A1 | 4/2010 | Costabile | |
| 2010/0102938 A1* | 4/2010 | Delia | A63B 71/0616 |
| | | | 340/326 |
| 2011/0013087 A1 | 1/2011 | House | |
| 2011/0306444 A1 | 12/2011 | McKay | |
| 2012/0099405 A1* | 4/2012 | Lidor | G07C 1/28 |
| | | | 368/10 |
| 2014/0087796 A1 | 3/2014 | Lee | |
| 2014/0222177 A1 | 8/2014 | Thurman | |
| 2014/0285669 A1 | 9/2014 | Lindner | |
| 2015/0153374 A1 | 6/2015 | Balakrishnan | |
| 2015/0202517 A1 | 7/2015 | Jacobson | |
| 2015/0382076 A1* | 12/2015 | Davisson | H04N 21/435 |
| | | | 725/62 |
| 2016/0012810 A1 | 1/2016 | Cronin | |
| 2016/0121193 A1 | 5/2016 | Marty et al. | |
| 2016/0193518 A1 | 7/2016 | Baxter | |
| 2016/0249023 A1 | 8/2016 | Bacus | |
| 2016/0279498 A1 | 9/2016 | Gordon | |
| 2016/0330362 A1 | 11/2016 | Singleton | |
| 2017/0161561 A1 | 6/2017 | Marty et al. | |
| 2017/0177930 A1 | 6/2017 | Holohan | |
| 2018/0056124 A1 | 3/2018 | Marty et al. | |
| 2018/0140935 A1 | 5/2018 | Bacus | |
| 2018/0204391 A1 | 7/2018 | Costabile | |
| 2018/0225889 A1 | 8/2018 | Kolen | |
| 2019/0076713 A1* | 3/2019 | Cuenin | G07C 1/22 |
| 2019/0076714 A1 | 3/2019 | Dougherty | |
| 2019/0176012 A1* | 6/2019 | Ianni | A63B 71/0669 |
| 2020/0009443 A1 | 1/2020 | Moravchik | |
| 2020/0023262 A1* | 1/2020 | Young | G06N 3/08 |

OTHER PUBLICATIONS

Beard, "Basketball refs using clock technology to get it right," https://abcnews.go.com/Sports/wireStory/basketball-refs-clock-technology-62144366, 2019.

Verstteeg, "Instant Replay: A Contemporary Legal Analysis," https://law.olemiss.edu/wp-content/uploads/2020/11/EIC-VerSteeg-Edit-FINAL-Macro-p.-153-273, 2014.

NHL, "Situation Room: Ekblad's goal is overturned," https://www.youtube.com/watch?v=MXsDNhcnUyA, 2016.

Marty, U.S. Appl. No. 15/346,509, entitled, "Systems and Methods Monitoring Basketballs Along Rebound Flight Paths," filed on Nov. 8, 2016.

Marty, U.S. Appl. No. 15/624,527, entitled, "True Space Tracking of Axisymmetric Object Flight Using Diameter Measurement," filed on Jun. 15, 2017.

Marty, U.S. Appl. No. 17/862,606, entitled, "Systems and Methods for Evaluating Player Performance," filed on Jul. 12, 2022.

\* cited by examiner

SYSTEMS AND METHODS FOR EVALUATING PLAYER PERFORMANCE

CROSS REFERENCE TO RELATED APPLICATION

This application is a continuation of and claims priority to U.S. patent application Ser. No. 17/862,606, entitled "Systems and Methods for Evaluating Player Performance" and filed on Jul. 12, 2022, which is incorporated herein by reference. U.S. patent application Ser. No. 17/862,606 is a continuation of U.S. Pat. No. 11,413,514, entitled "Systems and Methods for Evaluating Player Performance" and filed on Jul. 8, 2019, which is incorporated herein by reference. U.S. Pat. No. 11,413,514 claims the benefit of U.S. Provisional Application No. 62/800,005, filed Feb. 1, 2019, which is hereby incorporated herein by reference. U.S. Pat. No. 11,413,514 is a continuation-in-part of U.S. application Ser. No. 15/684,413, filed Aug. 23, 2017 and entitled "Systems and Methods for Tracking Basketball Player Performance," which is hereby incorporated herein by reference. U.S. application Ser. No. 15/684,413 claims the benefit of U.S. Provisional Application No. 62/378,548, filed Aug. 23, 2016, and entitled "Systems and Methods for Tracking Basketball Shooting Performance," which is hereby incorporated by reference.

BACKGROUND

Athletes often spend countless hours training in order to improve their skill level so that they can become more competitive in sporting events, such as basketball games. In an effort to assist athletes in improving their skill level, systems have been developed that track an athlete's performance while training or playing a game and then provide feedback indicative of the performance. Such feedback can then be evaluated for helping the athlete to improve his skill level. As an example, commonly-assigned U.S. Pat. No. 7,094,164 describes a system that tracks the trajectory of a basketball during a basketball shot so that the shooter can use feedback from the system for the purpose of improving his/her skill at shooting basketballs.

In addition to improving shot trajectory when shooting a basketball, a shooter may also want to improve the "aiming" of the shot, i.e., the placement of the ball with respect to the basketball hoop. Ideally, the shooter will want to place each shot within a "guaranteed make zone" of the basketball hoop. The "guaranteed make zone" of the basketball hoop is a target area within the basketball hoop. A trajectory that results in the center of the basketball passing through the "guaranteed make zone" results in a made shot, i.e., the ball passes through the hoop. In some cases, the "guaranteed make zone" may be defined to be a relatively small area within the hoop such that it is possible to make the shot without the center of the ball passing through the "guaranteed make zone." The shooter may need to make lateral adjustments (e.g., left or right adjustments) and/or depth adjustment (e.g., front or rear adjustments) to his/her shot placement in order to better place the ball within the "guaranteed make zone" and increase the number of made shots.

Tracking the placement of the ball at the basketball hoop when a shot is taken can present various challenges that may limit the effectiveness of a system that attempts to assess shooting performance. As an example, many basketball shots are often at a non-orthogonal angle to the backboard (and corresponding basketball hoop) as a result of the shooter being located on one side of the court or the other. The taking of shots at different angles often results in a variety of different shot placements with respect to the basketball hoop. Thus, it can be difficult to accurately assess the shooter's overall performance and skill level with respect to shot placement since the same shot placement at the hoop may be within the "guaranteed make zone" when the shot is taken from one angle (or court location) but may be outside of the "guaranteed make zone" if taken from another angle (or court location).

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

DETAILED DESCRIPTION

Figure 1:
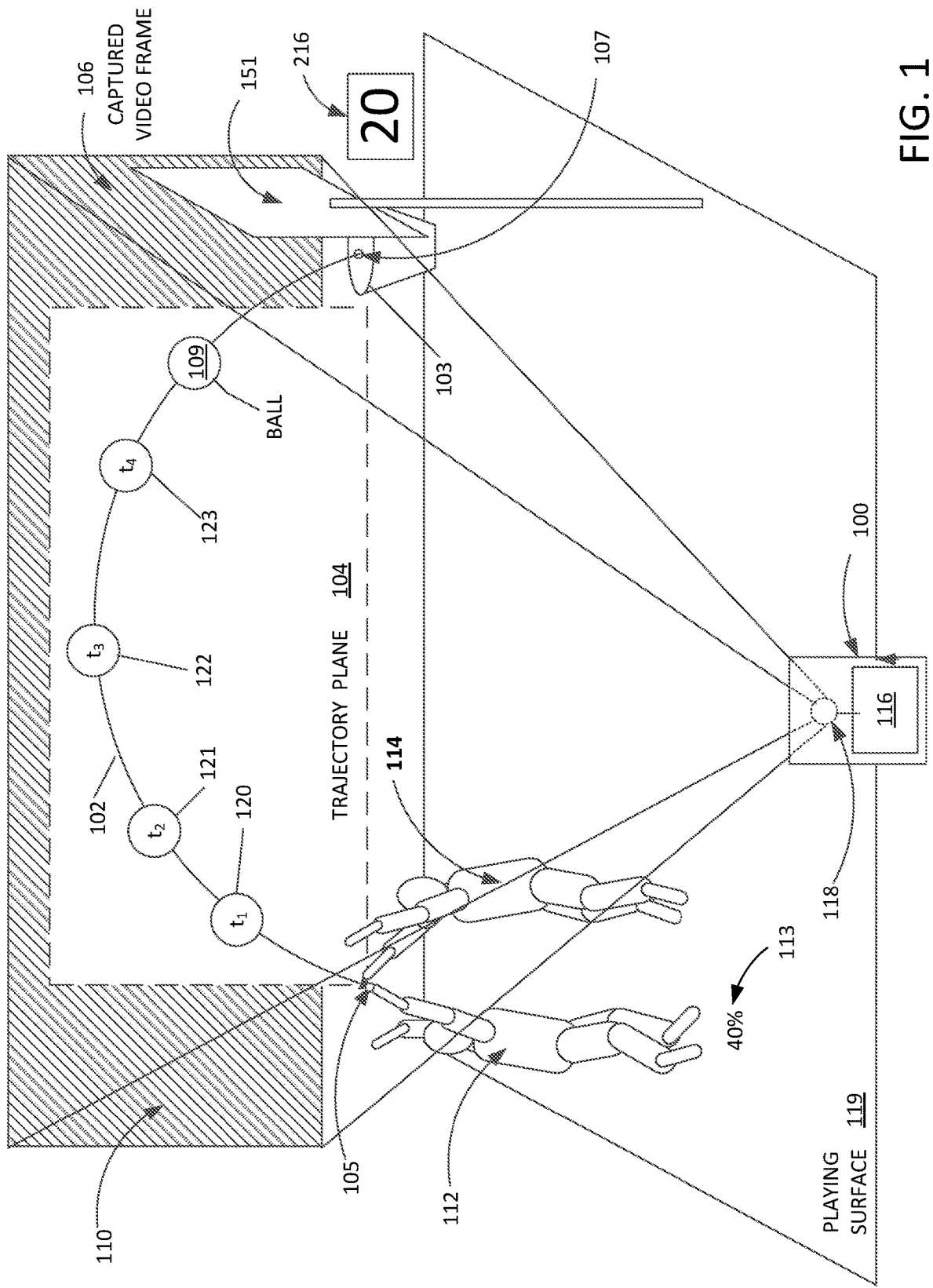
FIG. 1 is a diagram of a trajectory capture scenario performed by a shooting performance system.

Systems and methods are provided for evaluating the performance for a person engaged in either a training session or the playing of a game for a sport, such as a basketball. The evaluation of the performance of the person can include the tracking and analysis of numerous parameters associated with the performance of the person and the determining of an overall performance level of the person based on the analyzed parameters. Some parameters that can be tracked and analyzed can be associated with the ability of the person to perform basic basketball actions (e.g., passing, shooting, dribbling, etc.). Other parameters that can be tracked or analyzed can be associated with the physical and/or mental performance of the person (e.g., the person's response to particular game situations or how quickly does the person become fatigued).

One parameter that can be used to evaluate a person's overall basketball performance is the shooting performance of the person. In basketball, shooting performance can be based on the trajectory of the shot toward the basketball hoop (shot trajectory) and the placement of the ball with respect to the basketball hoop (shot placement). Depending on the shot trajectory and the shot placement, the shot is either made (i.e., the ball passes through the hoop) or missed (i.e., the ball does not passes through the hoop). The system can use one or more cameras to capture images of the ball from the release of the shot by the person to the ball reaching a termination point at the hoop (which can indicate the end of the trajectory and may indicate the shot placement at the hoop) and at least one processor to analyze the images to determine and evaluate the shot placement and shooting performance. The system can evaluate the shot placement with respect to a "guaranteed make zone" to determine if the shooter needs to make left or right adjustments or front or back adjustments to the shooter's shot placement in order to increase the probability of making the shot. The "guaranteed make zone" can correspond to an area within the basketball hoop that will result in a made shot if the center of the basketball passes through the area. The "guaranteed make zone" can vary for each shot and can be based on factors such as shot length (i.e., distance from the basketball hoop 103), shot release height and entry angle. The system can also identify tendencies in the shooter's shot placement by reviewing multiple shots from the shooter and determining if the shooter is more likely to miss a shot in a particular manner relative to the "guaranteed make zone" (e.g., more shots are to the left of the "guaranteed make zone" or more shots are short of (i.e., in front of) the "guaranteed make zone").

In order to evaluate shot placement and corresponding shooter tendencies for shots from different locations on the basketball court, the system is configured to "normalize" the shot placements from the shooter so that the evaluation of the shot placements can be performed using the same evaluation criteria. The system can normalize each shot placement based on the front of the hoop (or rim) with respect to the shooter's location (i.e., the portion of the hoop that is closest to the shooter when taking a shot). The location of the front of the hoop for the shooter can vary based on the shooter's location on the court. Once the front of the hoop is determined, the evaluation of the shot placement can then occur based on the center line for the hoop that is correlated to the front of the hoop and a "guaranteed make zone" for the shot that is correlated to the front of the hoop. Depending on the location of the front of the hoop, the same shot placement from two different shots may require different adjustments to result in the ball passing through the "guaranteed make zone." For example, the shot placement for a shot taken from a first position on the court may be to the right of the center line and within the "guaranteed make zone," but the same shot placement may be to the left of the center line and outside the "guaranteed make zone" for a second shot taken from a different position on the court. The shot placement can then be normalized by adjusting the shot placement to a new front of the hoop location that corresponds to a common point for all shots. By having all the shot placements normalized to a common point, shooter tendencies with respect to a "guaranteed make zone" can be identified regardless of the location of the shooter.

One process for evaluating shooting performance can have the system capture the shot with the one or more cameras and then determine the trajectory and shot placement for the shot. The system can then use the trajectory of the shot to determine the location of the shooter on the basketball court. Once the location of the shooter and the origin of the shot are determined, the system can then determine the location of the front of the hoop with respect to the shooter's location. Using the location of the front of the hoop, the system can then evaluate the shot placement with respect to one or more lines correlated with the front of the hoop. The system can then store the shot placement and the location of the shooter and can use the stored information to generate a shot placement map (also referred to as just "placement map" for simplicity) that shows the shooter's tendencies over multiple shots with regard to shot placement. The system can generate a placement map for a particular area of the court or a normalized placement map that covers the entire court.

Systems and methods are also provided for evaluating the shooting skills and capabilities of a shooter based on a set of shooting parameters. The shooting parameters can include average entry angle, average depth position, average lateral (left/right) position, entry angle consistency, depth position consistency, lateral position consistency, and/or other parameters. As described further herein, the entry angle generally refers to the angle (relative to horizontal, e.g., relative to a plane formed by the hoop) that the basketball enters the hoop for multiple shots. Depth position generally refers to the depth (e.g., distance in a horizontal direction parallel to the trajectory of the basketball) from a reference point, such as a center of the hoop, that a center of the basketball passes through the hoop for multiple shots. Lateral position generally refers to the distance in a horizontal direction perpendicular to the trajectory of the basketball from a reference point, such as the center of the hoop, that the center of the basketball passes through the hoop for multiple shots.

In some embodiments, the shooting parameters can be determined using the shot information obtained in generating the placement maps. The shooting capabilities of a shooter can also be evaluated based on a shooting parameter, referred to herein as "release efficiency parameter," which generally refers to a parameter indicating how well the shooter releases the basketball during a shot. The release efficiency parameter can be determined based on parameters such as release height, release speed and release separation that have been normalized to account for different shooters and shot types. The shooting parameters can be used to identify "good" shooters or players who may develop into "good" shooters with additional training.

In some embodiments, the shooting parameters are used to provide various assessments about the shooter's skills and capabilities. As an example, based on the shooting parameters, the system can determine a skill level for the player indicating an assessment of the shooters current shooting skill and ability. Such skill level can be quantitative (e.g., a higher value indicates greater skill) or qualitative (e.g., the shooter could be evaluated to be "bad," "good," or "superior"). As will be described in more detail, the player's skill level may change as he/she trains and is monitored by the system.

In other embodiments, the system can incorporate biological parameters into the evaluation of player performance. Some biological parameters used to evaluate player performance can be associated with genetic information, microbiome information, physiological information (e.g., heart rate, respiration rate, blood pressure, temperature, oxygen level), or psychological information. The biological parameters can be used in conjunction with other skill-based parameters (e.g., shooting performance) to make short-term (e.g., during a game) and long-term (e.g., several years later) assessments of the player. For example, biological parameters (e.g., physiological information) may be used to determine when a player is fatigued during a game and should be rested before there is a significant reduction in performance from the player with respect to skill-based parameters. In addition, biological parameters (e.g., genetic or microbiome information) may also be used to determine what level of performance can be expected from a player in the future.

A data aggregation system is provided to collect information from multiple systems at multiple locations. The data aggregation system can aggregate the data from the reporting systems and use the aggregated data to identify possible trends or patterns. The data aggregation system can also identify training exercise and programs that have produced "above-average" results in certain areas and that may benefit players and/or teams in improving their performance. The data aggregation system can also be used to provide a portal to third parties such that the third parties can obtain access to and use (e.g., reserve) the systems and corresponding facilities.

FIG. 1 is a diagram of a trajectory capture scenario performed by a player performance evaluation system. In the embodiment shown in FIG. 1, a player performance evaluation system 100 can include a machine vision system with one or more cameras 118 (only one camera 118 is shown in FIG. 1 for simplicity) to detect and analyze a trajectory 102 of a basketball 109 shot towards the basketball hoop 103 by the shooter 112. In other embodiments, the player performance evaluation system 100 can also detect and analyze player movements and reactions (whether on or off of the basketball court) and the movement of the ball (e.g., passing and dribbling) prior to a shot being taken by a shooter 112. In an embodiment, the cameras 118 may be placed above each basketball hoop 103. As an example, one or more cameras 118 may be mounted above the hoop 103 on a pole or other structure that connects the basketball to a ceiling or wall, or one or more cameras 118 may be placed in the ceiling or rafters of the building, in a scoreboard (including both suspended scoreboards and mounted scoreboards), in a seating area surrounding the basketball court (i.e., playing surface 119) or other locations in the building away from the basketball court that provide a view of the basketball court. Note that it is unnecessary for a camera 118 to be positioned above the hoop 103. As an example, it is possible for a camera 118 to be positioned in a seating area or on a wall where the camera 118 observes play from the side at a height below the hoop 103.

The player performance evaluation system 100 can detect and analyze the trajectory 102 of a shot with a trajectory detection, analysis and feedback system. An exemplary trajectory detection, analysis and feedback system is described in commonly-assigned U.S. Pat. No. 9,283,432 issued on Mar. 15, 2016 and titled, "Trajectory Detection and Feedback System," which is incorporated by reference herein in its entirety and for all purposes.

The basketball hoop 103 may be mounted to a backboard 151 with a support system, such as a pole or other structure anchored into the ground, a support anchored into a wall or supports suspended from a ceiling, to hold the backboard 151 and hoop 103 in a desired location. The basketball hoop 103 may be of a standard height and the basketball may be a standard men's size basketball. However, trajectories for a basketball of a different size, such as a women's ball, shot at basketball hoop of varying heights may also be detected and analyzed with the system 100.

The camera(s) 118 in the machine vision system can record physical information within corresponding detection volumes 110, i.e., the field of view of the camera 118. In one embodiment, the camera(s) 118 can be ultra-high definition (UHD) cameras, also referred to as "4K" cameras, having a resolution between 3840×2160 and 4096×2160 that can do stereoscopic collection or ball size tracking, but other types of cameras are possible in other embodiments. The physical information that is recorded can be images of objects at a particular time in the detection volume 110. The images recorded at a particular time may be stored as a video frame 106. The camera(s) 118 may capture images of the basketball 109 as it moves in a trajectory plane 104, as well as images of other secondary objects, e.g., the players. The secondary objects may be closer to the camera than the basketball 109 (i.e., between the camera 118 and the trajectory plane 104) or the secondary objects may be farther away from the camera than the basketball 109 (i.e., beyond the trajectory plane 104). The machine vision system may utilize software to distinguish between the movement of secondary objects that may be detected and the movement of the basketball 109.

The player performance evaluation system 100 may be set-up in a playing area where basketball is normally played, such as a basketball court with playing surface 119 located in gymnasium or arena. The system 100 may be positioned on the outside of the court and remotely detect the trajectories of the shots by shooter 112 using the machine vision system. Thus, the shooter 112 and a defender 114 may engage in any of their normal activities on the playing surface 119 without any interference from the system 100. As shown in FIG. 1, the shooter 112 is guarded by the defender 114. However, the system 100 may also be used when the shooter 112 is unguarded (e.g., no defender 114 is present).

In one embodiment, the system 100 can use multiple cameras 118 positioned around the playing surface 119 to determine the trajectory 102 of shots taken anywhere on the playing surface 119. The machine vision system can use the video frames 106 from some or all of the cameras 118 in determining the trajectory 102 of a shot. The trajectory plane 104 may be at any angle with respect to the basketball backboard 151 and can range from about 0 degrees for a shot at one corner of the playing surface 119 to about 180 degrees for a shot at the opposite corner of the playing surface 119 (relative to the basketball backboard 151).

To analyze a trajectory 102 of the basketball 109, each camera 118 may record a sequence of video frames 106 in its corresponding detection volume 110 at different times. The number of frames 106 recorded by each camera 118 over a given time period, such as the duration of the ball's trajectory 102, may vary according to the refresh rate of the camera 118. The captured video frames 106 may show a sequence of states of the basketball 109 at different times along its trajectory 102. For instance, the camera 118 may capture some or all of: 1) an initial state 105 of the trajectory 102 shortly after the ball 109 leaves the shooter's hand; 2) a number of states along the trajectory 102, such as 120, 121, 122 and 123 at times t1, t2, t3 and t4; and 3) a termination point 107 in the basketball hoop 103, i.e., the point where the center of the ball 109 passes (or would pass) through the plane of the basketball hoop 103. In one embodiment, the location of the termination point 107 with respect to the basketball hoop 103 can be used to determine a shot placement for the shot.

The sequence of captured video frames may be converted to digital data for analysis by the processor 116. As described with respect to FIG. 1, the digitized frames capture an image of the ball 109 at times, t1, t2, t3 and t4 as it approaches the basketball hoop 103. The analysis of video frame data may require the detection volume 110 to remain constant during the trajectory 102. However, the detection volume 110 may be adjusted to account for different set-up conditions of a playing area where the system 100 is employed. For instance, the camera(s) 118 may be capable of zooming in or out of a particular area and/or changing focus.

Pattern recognition software may be used to determine the location of the ball 109 from the images that can be captured by camera 118. In one embodiment, a reference frame is captured without a ball and the reference frame is compared with the frames 106 that contain the ball 109. In cases where the reference frame is relatively fixed, i.e., the only moving object is the ball 109. The ball 109 can be identified via subtraction of the frames. The system 100 may capable of updating the reference frame as needed to account for new objects that have moved into the frame or have been removed from the frame. When there is a lot of noise in the frame, such as people or other objects moving around in the frames, as well as the basketball 109, then more complex filtering techniques may be applied. In other embodiments, other techniques for tracking the ball may be used. As an example, the ball may include sensors (e.g., accelerometers, identification devices, such as radio frequency identification (RFID) tags, and other types of sensors) for detecting ball motion and transmit sensor data indicative of such motion to the processor 116 for analysis.

Once the position of the basketball 109 is determined from each frame. A curve-fit for the trajectory 102 may be developed in a computational space with a coordinate system. The basketball shot by the shooter 112 travels in an essentially parabolic arc in the trajectory plane 104 with gravity 109 being the dominant force acting on the ball. A parabolic curve-fit may be generated using a least squares curve-fit or other curve-fitting algorithm to determine the trajectory 102.

In one embodiment, curve-fits for the x and y position of the ball 109 may be parameterized as a function of time using a time at which each frame was recorded. In another embodiment, a curve-fit of height (y) as a function of distance (x) in the coordinate system may be generated. Using the curve-fit, trajectory parameters, such as an entry angle and the entry velocity of the object as it enters the hoop 103, is near the hoop 103 or at other states along the trajectory 102 may be generated and subsequently used in evaluating shooting performance. For instance, the entry angle may be generated from the tangent of the curve-fit at the termination point 107. The entry velocity may be generated from derivatives of the parameterized equations at the time corresponding to the termination point 107. If the release time is known, then the release velocity and release angle may also be determined from the parameterized trajectory equations.

In one embodiment, trajectory parameters may be generated without curve-fitting the entire trajectory and may only provide data related to a portion of a trajectory 102, such as a beginning, middle or end portion of a trajectory 102. Using a trajectory analysis methodology, other portions of a trajectory 102 that were not captured may be simulated or extrapolated. In particular, after an initial portion of a trajectory 102 is captured, a later aspect of the trajectory 102 may be predicted. For instance, with enough position data near a particular location on the trajectory 102, such as the termination point 107, then an entry angle may be calculated by simply fitting a line through available data points near the termination point 107. As another example, the velocity, direction and angle of the ball 109 as it leaves the shooter's hand may be predicted based upon captured data of the basketball 109 approaching the basketball hoop 103. Thus, the beginning of a trajectory 102 is predicted based on data captured near the end of the trajectory 102. In some embodiments, trajectory parameters may be generated for a portion of a trajectory 102 captured in video frame data and analyzed in a manner described above. The trajectory parameters may be provided as feedback information to a user of the system 100.

The series of frames used to capture the trajectory 102 may also capture the shooter 112 shooting the basketball 109 including all or a portion of the shooter's body as well as the defender's body during the shot. The physical information captured by the cameras 118 regarding the shooter 112 and the defender 114 may also be analyzed by the system 100. For example, different motions of the shooter 112 may be analyzed by the system 100 to determine if the shooter is using proper shooting mechanics. As another example, data, such as, a jump height, hang-time, a release point position on the playing surface 119, and a landing position on the playing surface 119 may be determined using the video frame data captured by the camera(s) 118 in the machine vision system.

Figure 2:
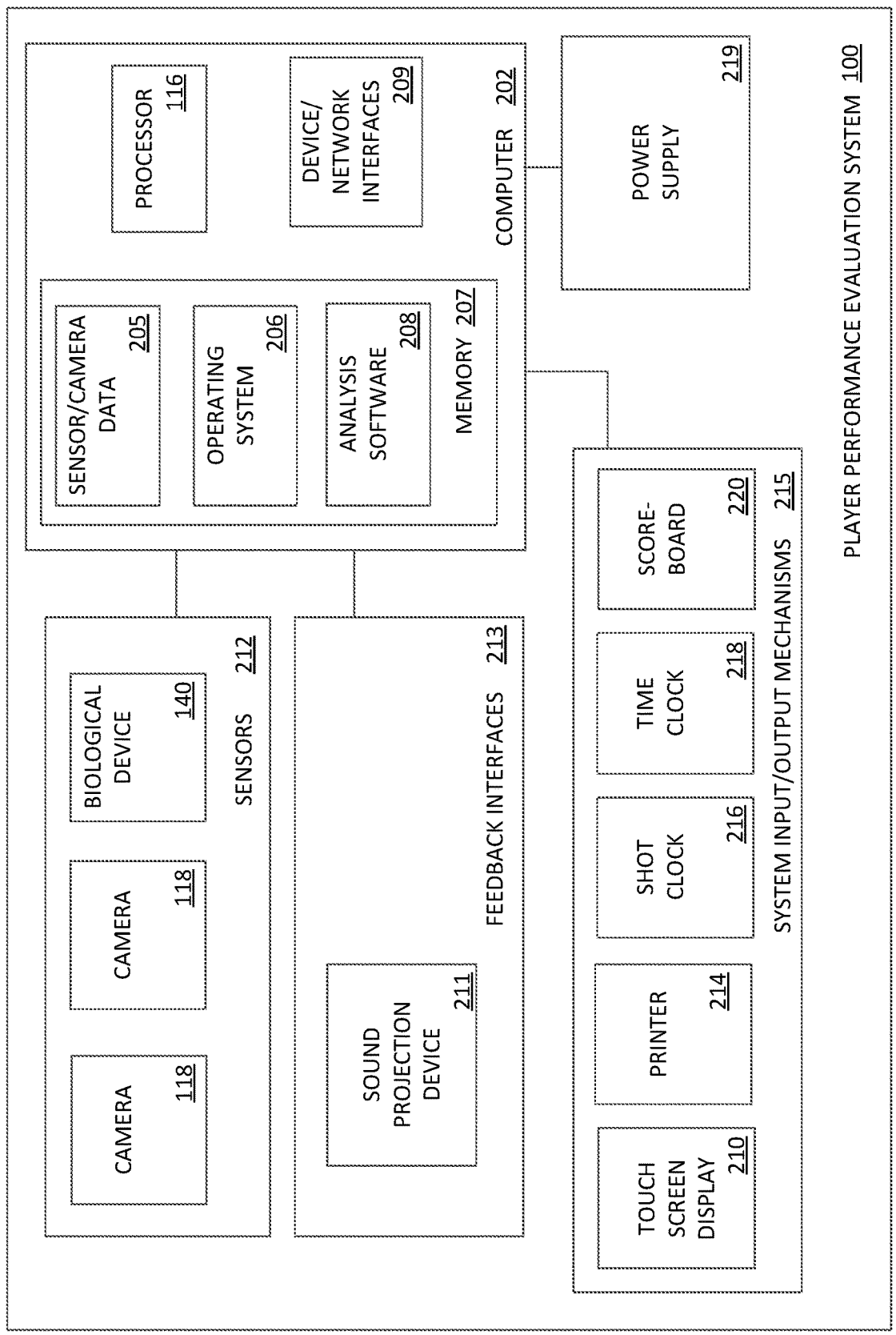
FIG. 2 is a block diagram of an embodiment of a shooting performance system.

FIG. 2 is a block diagram of the player performance evaluation system 100 for one embodiment. The components of the system 100 may be enclosed within a single housing or may be divided between a plurality of different housings enclosing different components of the system. Further, the system 100 may include different components that are not shown, such as the peripheral devices and remote servers.

Physical information is input into a computer 202 of the system 100 via sensors 212. In one embodiment, a machine vision system may be used where the machine vision system includes one or more cameras 118 (e.g., CCD cameras or CMOS cameras) and a microprocessor for digitizing captured frame data. In another embodiment, the system 100 may employ a plurality of cameras 118 arranged on a mechanism that allows different type cameras 118 to be rotated or moved into place where only one camera 118 is used at a time to record frame data. The different cameras 118 may allow the detection volume 110 of the system 100 to be adjusted. In still other embodiments, the sensors 212 can include sensors, such as audio sensors, accelerometers, motion sensors and/or other types of sensors, that can be used to provide information on events occurring on the playing surface 119. For example, an accelerometer used with ball 109 can provide ball position, movement and/or acceleration information to the computer 202 for use in determining shooting performance. In a further embodiment, the sensors 212 can include biological devices 140 that can be used to collect biological samples (e.g., blood, saliva, sweat, etc.) from the player and/or sense biological parameters (e.g., heart rate, oxygen level, blood pressure, temperature, etc.) of the player. The digitized frame data from the machine vision system (or cameras 118) and/or other sensor data may be stored as sensor/camera data 205 and processed by the computer 202.

The computer 202 may be implemented as one or more general or special-purpose computers, such as a laptop, hand-held (e.g., smartphone), user-wearable (e.g., "smart" glasses, "smart" watch), user-embedded, desktop, or mainframe computer. The computer 202 can include an operating system 206 for generally controlling the operation of the computer 202, including communicating with the other components of the system 100, such as feedback interfaces 213 and the system input/output mechanisms 215. The computer 202 also includes analysis software 208 for analyzing trajectories using the sensor/camera data 205 from sensors 212, determining and analyzing shot placement, determining and analyzing shooting parameters, determining and analyzing release efficiency, determining and analyzing designated offensive and defensive parameters and generating feedback information.

The analysis software 208 may include "computer vision logic," for processing and analyzing the sensor/camera data 205 from the cameras 118. An example of computer vision logic that can be used by the system 100 is described in commonly-assigned U.S. application Ser. No. 16/026,029 filed on Jul. 2, 2018 and titled, "Systems and Methods for Determining Reduced Player Performance in Sporting Events," which is incorporated by reference herein in its entirety and for all purposes. The analysis software 208 can also incorporate other techniques, such as ball tracking, gate tracking, face tracking, body motion tracking, etc., to determine the movement of the players and the ball. The operating system 206 and the analysis software 208 can be implemented in software, hardware, firmware or any combination thereof. In the computer 202 shown in FIG. 2, the operating system 206 and the analysis software 208 are implemented in software and stored in memory 207 of the computer 202. Note that the operating system 206 and the analysis software 208, when implemented in software, can be stored and transported on any non-transitory computer-readable medium for use by or in connection with an instruction execution apparatus that can fetch and execute instructions.

The computer 202 can include at least one conventional processor 116, which has processing hardware for executing instructions stored in memory 207. As an example, the processor 116 may include a central processing unit (CPU), a digital signal processor (DSP), a graphic processing unit (GPU) and/or a quantum processing unit (QPU). The processor 116 communicates to and drives the other elements within the computer 202 via a local interface (not shown), which can include at least one bus.

The computer 202 may also include various network/device communication interfaces 209, such as wireless and wired network interfaces, for connecting to a local area network (LAN), wide-area network (WAN) or the Internet. The device communication interfaces 209 may allow the computer 202 to communicate with a plurality of peripheral devices and other remote system components. The computer 202 can communicate wirelessly, i.e., via electromagnetic or acoustic waves carrying a signal, with the other components of the system 100, but it is possible for the computer 202 to communicate with the other components of the system 100 over a conductive medium (e.g., a wire), fiber, or otherwise.

Power to the computer 202 and other devices may be provided from the power supply 219. In one embodiment, the power supply 219 may be a re-chargeable battery or a fuel cell. The power supply 219 may include one or more power interfaces for receiving power from an external source, such as an AC outlet, and conditioning the power for use by the various system components. In one embodiment, for indoor/outdoor models, the system 100 may include photocells that are used to provide direct power and charge an internal battery.

Feedback information, used by clients of the system 100 to improve their shooting skills, may be output through one or more feedback interface devices 213, such as a sound projection device 211. In general, the system 100 may be capable of outputting feedback information to a plurality of different devices simultaneously in a plurality of different formats, such as visual formats, auditory formats and kinetic formats.

The system 100 may support a plurality of different input/output mechanisms 215 that are used to input/display operational information for the system 100. The operational information may include calibration and configuration setting inputs for the system 100 and system components. In one embodiment, a touch screen display 210 may be used to input and display operational information using a plurality of menus. Menus may be available for configuring and setting up the system 100, for allowing a player to sign into the system and to select preferred setting for the system 100 and for viewing session information in various formats that have been generated by the system 100. The printer 214 may be used to output hard copies of the session information for a player or other client of the system 100. In other embodiments, a monitor, liquid crystal display (LCD), or other display apparatus, can be used to output data to the user. The system 100 is not limited to a touch screen display 210 as an interface for operational information. Other input mechanisms, such as a keyboard, a mouse, a touch pad, a joystick and a microphone with voice recognition software, may be used to input operation information into the system 100. In still other embodiments, the input/output mechanisms 215 can include devices such as a shot clock 216, time (or game) clock 218 or scoreboard 220 that can provide relevant information (e.g., score, time remaining to take a shot or time remaining in game (or portion of the game)) to players and/or spectators of a game.

As will be described in greater detail below, the system 100 can be used to automatically control one or more of the shot clock 216, time clock 218 and/or scoreboard 220 based on made or missed shot determinations (or other determinations such as whether the ball contacts the basketball hoop) made by the system 100. A time clock refers to a clock that is used to track the time remaining in a period of a basketball game. Typically, the time clock is decremented periodically (e.g., every second or tenth of a second) from a predetermined value until the clock reaches a zero value indicating the end of a period. A time clock is also sometimes referred to as a "game clock." A shot clock refers to a clock that is used to track the time remaining for a team to shoot the basketball toward a goal. Typically, the shot clock is decremented periodically (e.g., every second or tenth of a second) from a predetermined value until the clock reaches a zero value indicating the end of a time period to shoot the basketball. A violation is called if a shot is not attempted by the offensive team prior to expiration of the shot clock.

The player performance evaluation system 100 may be incorporated into or be a component of a more comprehensive training and feedback system. An exemplary training and feedback system is described in commonly-assigned U.S. Pat. No. 9,390,501 issued on Jul. 12, 2016 and titled, "Stereoscopic Image Capture with Performance Outcome Prediction in Sporting Environments," which is incorporated by reference herein in its entirety and for all purposes.

The player performance evaluation system 100 can be used to generate a placement map (also referred to as a "heat map") indicating the placement of the shots (with respect to the basketball hoop 103) taken by the shooter 112. The placement map can indicate both a lateral position, i.e., a left-right placement in the hoop 103, and a depth position, i.e., a front-back placement in the hoop 103, for each shot taken by the shooter 112. The placement map can also indicate with an indicator of a first type (e.g., a circle) when the shot was made (i.e., the ball 109 passes through the hoop 103) and indicate with an indicator of a different type (e.g., an "X") when the shot was missed (i.e., the ball 109 did not pass through the hoop 103). The placement map may also indicate areas of the hoop 103 having different shot placement activity (or shot frequency) by the shooter 112. The placement map can show areas where more shots are taken (i.e., areas with more shot placements) and areas of the hoop 103 where fewer (or no) shots are taken (i.e., areas with few to no shot placements).

In one embodiment, the placement map can indicate made shots with a first color and missed shots with a second color. When multiple shots have about the same shot placement, a color selected from a range of colors can be used to indicate how often a shot is made or missed at that shot placement. For example, a made shot can be indicated with green, a missed shot can be indicated with red, and multiple shots can be indicated with a color selected from a range of colors that transitions from green (indicating all shots are made) to yellow (indicating half the shots are made) to red (indicating all shots are missed). Similarly, the placement map can indicate areas with a high shot frequency (i.e., areas of the hoop 103 with many shot placements) with a first color and areas with low shot frequency (i.e., areas of the hoop 103 with few (if any) shot placements) with a second color. When multiple areas have different shot frequencies, a color selected from a range of colors can be used to indicate the frequency of a shot placement occurring in the area. For example, an area where a shot frequently occurs can be indicated with green, an area where a shot infrequently occurs can be indicated with red, and other areas having different shot frequencies can be indicated with a color selected from a range of colors that transitions from green (indicating more shots occur in the area) to yellow (indicating some shots occur in the area) to red (indicating few or no shots occur in the area).

A placement map can be generated for the shooter 112 for any specific location on the playing surface 119. Alternatively, placement maps that correspond to particular areas of the playing surface 119 can be generated for the shooter 112. For example, placement maps can be generated for shots taken from the right or left side of the playing surface 119, shots taken from a center area of the playing surface 119, shots taken close to or far away from the hoop 103, shots taken within a predetermined distance of a specific location on the playing surface 119, shots taken in a predefined area of the playing surface 119 or combinations thereof. In addition, a comprehensive placement map can be generated that normalizes and combines the individual placement maps described above and provides shot placement information based on all of the shots taken by the shooter 112.

Figure 3:
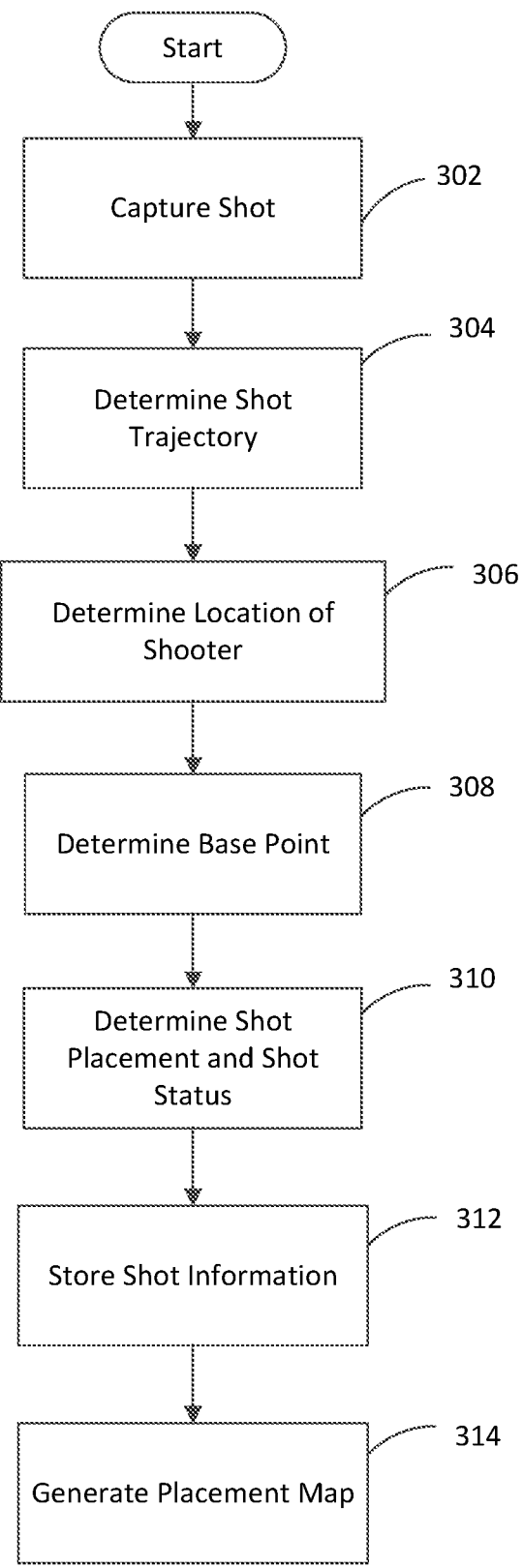
FIG. 3 is a flow chart showing an embodiment of a process for generating a placement map.

FIG. 3 shows an embodiment of a process for generating a placement map for a group of shots taken by a shooter 112. The process begins by capturing a plurality of images of a shot (step 302) with the cameras 118 positioned around the playing surface 119. The cameras 118 can capture the images of the shot as described above. Once the images of the shot have been captured, the player performance evaluation system 100 can determine the trajectory 102 of the shot (step 304). In one embodiment, the system 100 can determine the trajectory 102 of the shot as described above.

Using the trajectory information, the system 100 can determine the location of the shooter 112 on the playing surface 119 (step 306). In one embodiment, if the system 100 calculated the entire trajectory 102 of the shot, the system 100 can use the trajectory information to determine the location on the playing surface 119 where the shooter 112 took the shot since the entire trajectory 102 includes both the release point 105, which can correspond to the location of the shooter 112, and the termination point 107. In another embodiment, if only a partial trajectory 102 has been calculated, the system 100 can use the partial trajectory 102 information to extrapolate the entire trajectory 102 for the shot and the shooter's location on the playing surface 119. In still other embodiments, the system 100 can determine the location of the shooter 112 on the playing surface 119 by analyzing image data from the cameras 118 that includes the shooter 112 and other sensor data that may be collected. As an example, the location of the shooter within the images captured by the system 100 may be used to determine the shooter's location on the playing surface 119 at the time of shooting the basketball 109. In another example, the shooter 112 may wear one or more sensors (e.g., a radio frequency identification (RFID) tag or a location sensor) that wirelessly communicate with the system 100 to enable the system 100 to determine the shooter's location. For example, the system 100 may use triangulation or other location determination techniques to determine the shooter's location. In some embodiments, sensors (e.g., accelerometers or location sensors) within the basketball 109 may wirelessly communicate with the system 100, which may use data from such sensors to determine the location of the ball 109 at the time of shooting or the trajectory of the ball 109 that can then be used to determine the shooter's location. Various other techniques for determining the shooter's location are possible.

Figure 4:
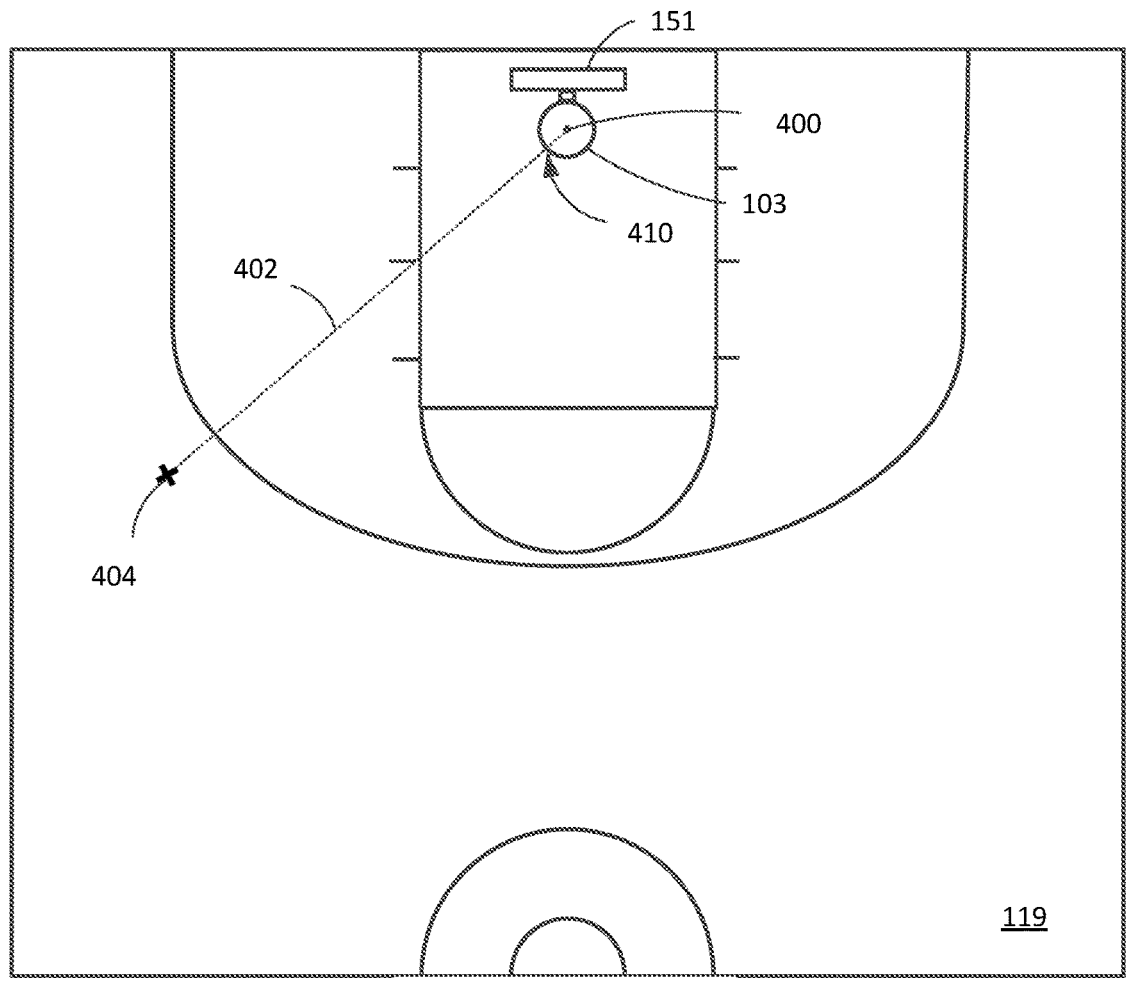
FIG. 4 shows an embodiment of the determination of the base point for a shot.
Figures 5A, 5B:
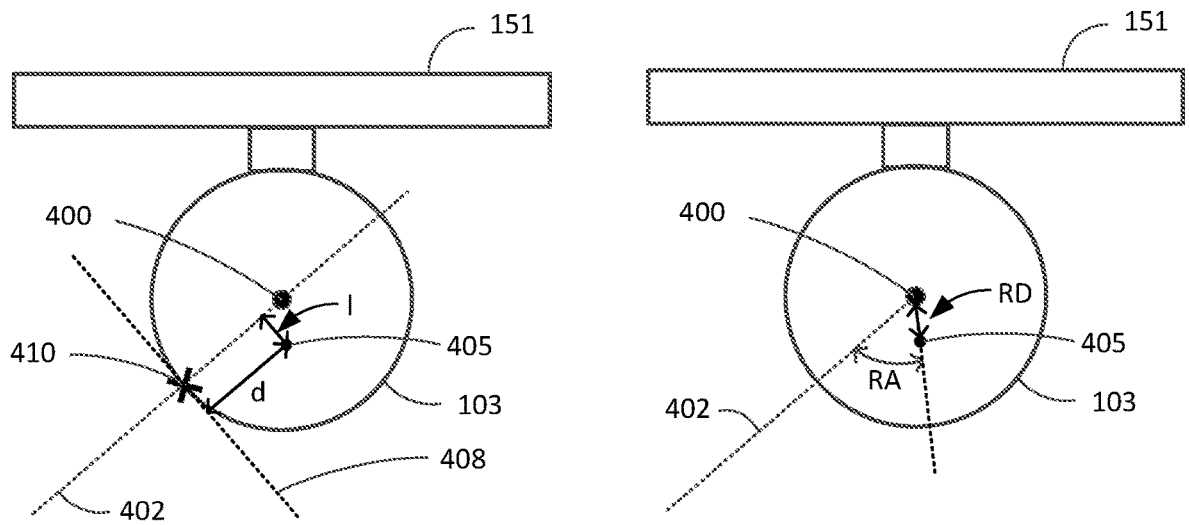
FIGS. 5A and 5B show an enlarged view of the basketball hoop from the embodiment of FIG. 4.

After the location of the shooter 112 is determined, the system 100 can then identify a base point with respect to the shooter's location (step 308). In one embodiment, the base point can correspond to the portion of the hoop 103 that is closest to the shooter's location and can be referred to as the "front of the hoop." However, in other embodiments, other locations for the base point can be used (e.g., "rear of the hoop"). FIGS. 4 and 5 show the determination of the base point from the shooter's location. As shown in FIG. 4, the location 404 of the shooter 112 on the playing surface 119 (shown with an "X") can be connected with a line 402 to the center 400 of the hoop 103 (shown with a dot). The portion 410 (shown in FIG. 5A with an "X") of the hoop 103 where the line 402 intersects the hoop 103 can be used as the base point 410. The location of the base point 410 relative to a predefined reference point (e.g., the center of the hoop) indicates the direction of the shooter from the hoop. In other embodiments, other reference points can be selected for the base point 410.

Referring back to FIG. 3, once the base point 410 is determined, the system 100 can determine the shot placement for the shot and the shot status, i.e., whether the shot was made or missed (step 310). The shot placement can correspond to the center of the ball 109 when the ball 109 reaches (or would reach) the plane of the basketball hoop 103. The shot placement can be numerically defined in terms of a lateral position with respect to the base point 410 and a depth position with respect to the base point 410. In other embodiments, other reference points may be used to define the coordinates or other positional data of the shot placement. Note that the coordinates may be relative to any desired coordinate system (e.g., Cartesian or polar).

The lateral position can correspond to a left-right position of the shot with respect to a center line, e.g., line 402 (see FIG. 5A), for the basketball hoop 103 that passes through the center 400 of the basketball hoop 103 and a reference point, such as the base point 410. Note that the direction of the line 402 from the center of the hoop indicates the approximate direction, referred to herein as "shot direction," of the shooter's location from the hoop. The depth position can correspond to a front-back position of the shot with respect to a line 408 (see FIG. 5A) that passes through the base point 410 of the basketball hoop 104 and is perpendicular to the center line 402 (or is tangent to the basketball hoop 103 at the base point 410). For example, as shown in FIG. 5A, an exemplary shot placement shown with a dot 405 can have a lateral position defined by the distance l and a depth position defined by the distance d. A positive l distance can correspond to a shot to the right side of the center line 402 (corresponding to the right side of the shooter 112) and a negative l distance can correspond to a shot to the left side of the center line 402 (corresponding to the left side of the shooter 112). A positive d distance can correspond to a shot "above" line 408, i.e., away from the shooter 112, and a negative d distance can correspond to a shot "below" line 408, i.e., toward the shooter 112. In the embodiment shown in FIG. 5A, the lateral position of shot 405 can be +2 inches (corresponding to a shot 2 inches to right of line 402) and the depth position of shot 405 can be +8 inches (corresponding to a shot 8 inches into the basketball hoop 103).

In other embodiments, line 408 can be defined at different locations with respect to the basketball hoop 103, e.g., though the center 400 or at a distance from the base point 410, e.g., approximately 11 inches from the base point 410, corresponding to a desired depth position for the shot. The depth position can be defined in terms of distances above the line 408 (i.e., away from the shooter 112) or below the line 408 (i.e., toward the shooter 112). In one embodiment, the shot placement can correspond to the termination point 107 of the trajectory 102. The system 100 can also determine if the shot was made, i.e., the ball 109 passed through the hoop 103, or missed, i.e., the ball 109 did not pass through the hoop 103, using the trajectory information and the shot placement information. In still another embodiment, the system 100 can determine if the shot was made using the sensor/camera data 205, e.g., looking for the path of the ball 109 relative to the basketball hoop 103.

In another embodiment as shown in FIG. 5B, the shot placement can be numerically defined in terms of polar coordinates having a reference distance and a reference angle in place of the lateral position and the depth position shown in FIG. 5A. The reference angle can correspond to an angular position of the shot with respect to a reference line (e.g., line 402) for the basketball hoop 103 that passes through a reference point (e.g., the center 400 of the basketball hoop 103). Note that the direction of the line 402 from the center 400 of the hoop indicates the approximate direction, referred to herein as "shot direction," of the shooter's location from the hoop 103. The reference distance can correspond to a distance of the shot from a reference point (e.g., the center 400 of the basketball hoop 103) for the basketball hoop 103. For example, as shown in FIG. 5B, an exemplary shot placement shown with a dot 405 can have a reference distance defined by the distance RD and a reference angle defined by the angle RA. An RA angle between 0 and 180 degrees can correspond to a shot to the right side of the reference line 402 (corresponding to the right side of the shooter 112) and an RA angle between 180 and 360 degrees can correspond to a shot to the left side of the reference line 402 (corresponding to the left side of the shooter 112). A RA angle equal to 0 or 180 degrees can correspond to a shot on the reference line 402. A smaller RD distance can correspond to a shot closer to the center 400 of the hoop 103, and a larger RD distance can correspond to a shot further away from the center 400 and closer to the hoop 103. In the embodiment shown in FIG. 5B, the reference distance of shot 405 can be 1.75 inches (corresponding to a shot 1.75 inches from the center 400) and the reference angle of shot 405 can be 55 degrees (corresponding to a shot angled 55 degrees from reference line 402).

In one embodiment, a "guaranteed make zone" can be defined for each shot that corresponds to an area of the basketball hoop 103 that can result in a made shot by the shooter 112 if the center of the ball 109 passes through the "guaranteed make zone." The "guaranteed make zone" can be calculated for each shot based on factors such as the shot length, shot release height and entry angle. The calculated "guaranteed make zone" can have an oval shape and a corresponding center point. The calculation of the "guaranteed make zone" can be independent of shot direction. However, the orientation of the "guaranteed make zone" with respect to the basketball hoop 103 can be dependent on shot direction. The calculated "guaranteed make zone" can be defined relative to (e.g., within) a plane defining the top of the basketball hoop 103. In one embodiment, the "guaranteed make zone" can be defined using polar coordinates about the center point of the oval shape of the "guaranteed make zone."

The size of the "guaranteed make zone" can either increase or decrease based on changes in the trajectory 102 or other factors, such as shot velocity, shot length and/or entry angle. For example, a decrease in the entry angle of the trajectory 102 can result in a smaller "guaranteed make zone," while a small increase in the entry angle of the trajectory 102 can result in a larger "guaranteed make zone." However, a large increase in the entry angle of the trajectory 102 may result in a smaller "guaranteed make zone." In one embodiment, an optimal "guaranteed make zone" can be defined based on an entry angle of about 45 degrees. Entry angles greater or lesser than about 45 degrees can result in "guaranteed make zones" having a smaller size than the optimal "guaranteed make zone."

In addition, the size of the "guaranteed make zone" can increase or decrease depending on the size of the ball 109 being used (e.g., a men's ball has a circumference of about 29.5 inches (size 7), a women's ball has a circumference of about 28.5 inches (size 6) and a youth ball has a circumference of about 27.5 inches (size 5) or 25.5 inches (size 4)) by the shooter 112. In one embodiment, a center point for the "guaranteed make zone" can change position with respect to the hoop 103 as the size of the "guaranteed make zone" increases or decreases. In addition, the center point for the "guaranteed make zone" can change position with respect to the hoop 103 as the "guaranteed make zone" changes locations within the hoop as a result of different shot directions.

The "guaranteed make zone" can include areas that result in the ball 109 coming into contact with the basketball hoop 103 so long as the ball 109 maintains a downward trajectory through the basketball hoop 103. In one embodiment, if the "guaranteed make zone" is defined to include shot placements where the ball 109 contacts the basketball hoop 103 while maintaining a downward trajectory, the edges of the "guaranteed make zone" can be updated to account for the additional shot placements that result in made shots. The system 100 can analyze the trajectory data (including shot length and entry angle data) for numerous shots to determine the specific adjustments to be made to the "guaranteed make zone" to account for and include shots that contact the basketball hoop 103 but continue with a downward trajectory. In another embodiment, the entry position for a shot placement can be defined with respect to the "guaranteed make zone" and more specifically, the defined edge of the "guaranteed make zone." For example, a player may be informed that a particular shot placement was only an inch away from the edge of the "guaranteed make zone."

In contrast, a "dirty make zone" can be defined as an area where the ball 109 passes through the basketball hoop 103 after contacting the basketball hoop 103, but the ball 109 has a change in trajectory (e.g., the ball 109 travels upwards and/or laterally, including possibly hitting the backboard) before resuming a downward trajectory through the basketball hoop 103. The "dirty make zone" may not have a defined shape like the "guaranteed make zone" and can be a collection of shot placements that have resulted in the ball passing through the basketball hoop. In addition, substantially identical shot placements in the "dirty make zone" may result in different outcomes for the shots (e.g., one shot may be made while another shot may be missed). In some embodiments, the system 100 can predict whether shot placements in the "dirty make zone" will result in made shots by analyzing trajectory data (including shot length and entry angle data) for the shot. In other embodiments, the placement map can indicate shots passing through the "guaranteed make zone" in a first color (e.g., dark green) and shots passing through the "dirty make zone" in a second color (e.g., light green). For example, FIG. 6, as described in more detail below, shows an embodiment of a placement map. The circles in FIG. 6, which correspond to made baskets, can be filled with different colors (e.g., dark green and light green) in one embodiment to indicate whether the shot was in the "guaranteed make zone" or the "dirty make zone."

The system 100 can then use the shooter's shot placement information to provide feedback to the shooter 112 on how to increase the shooter's probability of making subsequent shots. For example, if the average lateral position for a shooter is off of a desired point (such as a center of the "guaranteed make zone") by more than a threshold amount, the feedback can indicate the amount that the shooter 112 should adjust his/her shot to the left or right to bring his/her shots closer to the desired point. Similarly, if the average depth for a shooter is off of a desired point (such as a center of the "guaranteed make zone") by more than a threshold amount, the feedback can indicate the amount that the shooter 112 should adjust his/her shot to the front or back of the hoop to bring his/her shots closer to the desired point. By training according to the feedback, it is possible for the shooter through muscle memory learn to shoot better shots that have a higher probability of passing through the hoop.

Referring back to FIG. 3, the system 100 can then store information (step 312) on the shot placement, the trajectory 102 of the shot, the base point 410 for the shot, i.e., the "front of the hoop," the location of the shooter 112, whether the shot was made or missed and any other shot information that may be collected by the system 100. Note that the location of the base point indicates the approximate shot direction for the shot. That is, the direction of the shot is approximately along a line from the center of the hoop to the base point. In other embodiments, other types of information may (e.g., angle from a center of the hoop) may be used to indicate shot direction.

After storing information relating to the shot, the system 100 can generate one or more placement maps (step 314) to provide the shooter 112 with information on the shots taken by the shooter 112. FIGS. 6-11 show embodiments of placement maps that can be displayed on display 210 to provide the shooter 112 with information regarding shooting performance.

Figure 6:
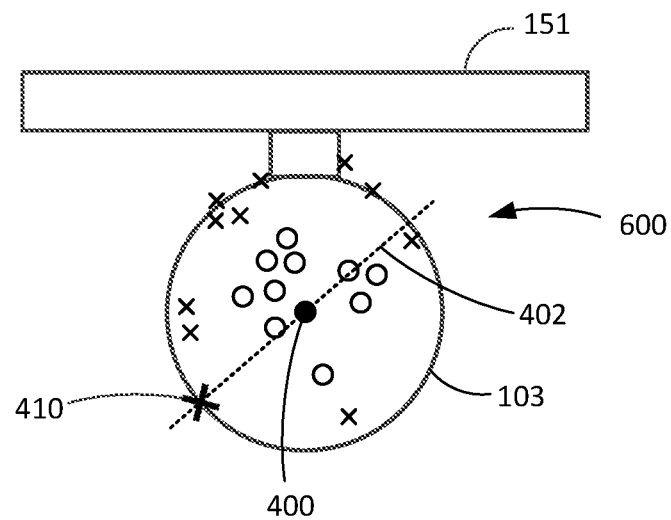
FIGS. 6 and 7 show embodiments of placement maps with the same base point.
Figure 7:
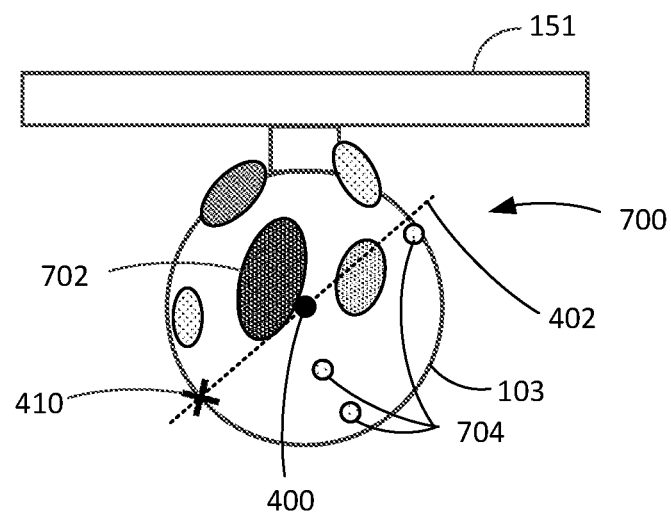

FIGS. 6 and 7 show placement maps for a group of shots taken by the shooter 112 from a specific location 404 on the playing surface 119. FIG. 6 shows a placement map 600 that indicates the shot placements for the group of shots and whether the shot was made (indicated by a circle) or missed (indicated by an "X"). FIG. 7 shows a placement map 700 for the same group of shots used in FIG. 6. However, instead of showing individual shot placements and corresponding shot statuses, FIG. 7 provides information on the frequency with which the shooter 112 has shots in a particular area. As shown in FIG. 7, a first area 702 indicates an area where a shot placement is more likely to occur (e.g., a 30% probability) and second areas 704 that indicate an area where a shot placement is less likely to occur (e.g., a 5% probability) based on the number of shots determined to pass through the respective areas during monitoring. The placement map 700 can also indicate other areas that have a shot frequency somewhere between the frequency of the first area 702 and the frequency of the second area 704. In the embodiment of FIG. 7, the darker the pattern in a corresponding area, the higher the frequency of a shot occurring in that area. The placement maps 600 and 700 can include the location of the base point 410 on the basketball hoop 103, the center 400 of the basketball hoop 103 and the corresponding center line 402 to provide the shooter 112 with information on the angle and location with which the shooter 112 was shooting at the hoop 103. Based on the information in placement maps 600 and 700, the shooter 112 can determine that more of his/her shots are to the left of center line 402 and that more shots are closer to the "back of the hoop" instead of the "front of the hoop."

Figure 8:
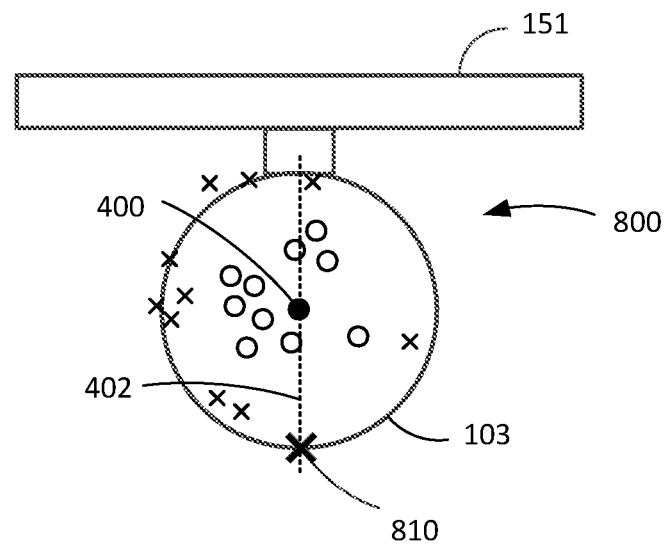
FIGS. 8 and 9 show embodiments of the placement maps of FIGS. 6 and 7 with a normalized base point.
Figure 9:
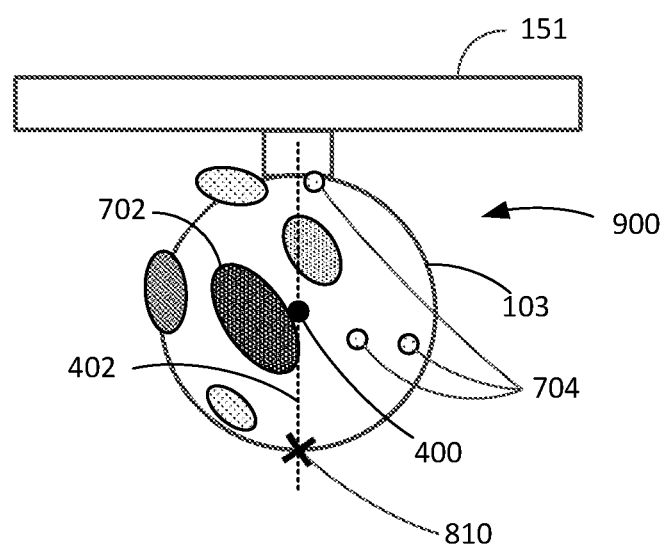

FIGS. 8 and 9 provide the same information from FIGS. 6 and 7 except that the information has been "normalized." FIG. 8 shows a normalized placement map 800 similar to placement map 600 with information and shot location and shot status. FIG. 9 shows a normalized placement map 900 similar to placement map 700 with information on shot frequency areas. To normalize the shot placement information, the shot information in placement maps 600 and 700 (including the lateral position and depth position with respect to the base point 410) can be used with a front point 810 to calculate the "normalized" shot placement. The front point 810 can be a portion of the hoop 103 that is at a location farthest away from the basketball backboard 151. The normalized shot placement for a shot can be determined as the lateral position and the depth position for the shot as measured from the front point 810 instead of the shot's corresponding base point 410. In another embodiment, the shot placement information can be normalized by rotating the base point 410 and each shot placement location about the center 400 of the basketball hoop 103 by an angle A (see FIG. 10, where base point 410-2 corresponds to front point 810) that corresponds to the angle (as measured from the center 400 of the basketball hoop 103) between the shot's corresponding base point 410 and the front point 810. The center line 402 through the front point 810 and the center 400 of the basketball hoop 103 can be perpendicular to the basketball backboard 151.

The normalizing of the shot placement information for shots corresponding to different base points enables the information for multiple shots taken from different shot directions to be displayed on a comprehensive placement map in a manner such that all shot placements are relative to the same shot direction. Without normalization, it may be difficult for a user to visualize whether the shooter tends to shoot in a certain direction (e.g., left, right, front, back) relative to hoop center or other reference point. By adjusting the shot placements such that they are relative to the same shot direction, then shots that drift from the center of the hoop 103 in the same direction will appear to be grouped together on the map (e.g., indicated within the same general vicinity), thereby helping the user to better visualize shooting tendencies. Thus, the normalization can be viewed as adjusting shot placement in order to account for variations in shot direction.

In performing normalization in one embodiment, each shot placement is correlated with data indicative of shot direction (i.e., the direction at which the basketball 109 approaches the hoop 103). For example, as described above, the shot placement (e.g., location within a plane of the hoop 103 through which a center (or other reference point) of the ball 109 passes) may be correlated with a base point that is based on and indicates shot direction. In the normalization process, the shot placement of each shot is updated such that it indicates the location through which the center or other reference point of the ball 109 would have passed had the ball 109 been shot from a predefined reference direction rather than the actual direction indicated by the shot's corresponding base point (assuming that the distance from the hoop 103 and other trajectory parameters remain the same). As an example, the shot placement for a shot taken from a side of the hoop 103 may be adjusted so that it is consistent with the same shot taken from the front of the hoop 103 instead of the side of the hoop 103. If all shot placements of a placement map are normalized to the same reference direction, then tendencies in shot placement can be readily ascertained by viewing the shot placement map.

In other embodiments, the front point 810 can be selected to be any desired reference point on or near the basketball hoop 103. In still another embodiment, the shot direction information can be used to adjust the shot placement information to correspond to a predefined shot direction. In one embodiment, the shot placement information can be normalized by angularly adjusting the shot placement position by an angle corresponding to the difference in angle between the shot direction and the predefined shot direction.

Figure 10:
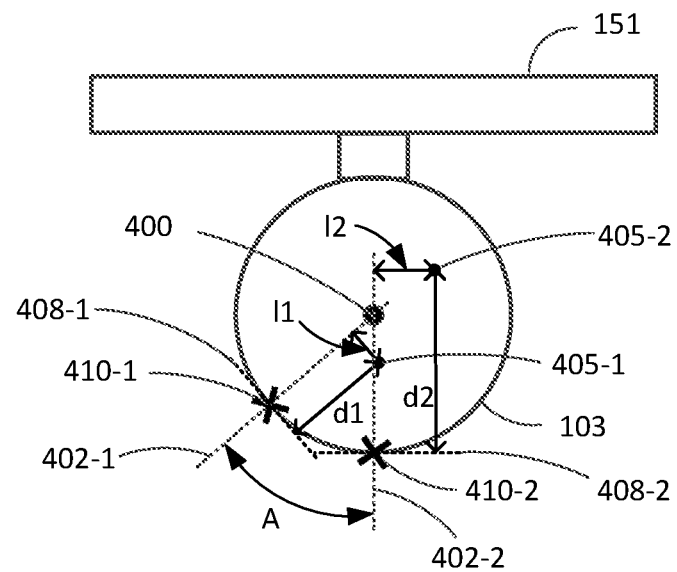
FIG. 10 shows an embodiment of a shot placement map with multiple base points.
Figure 11:
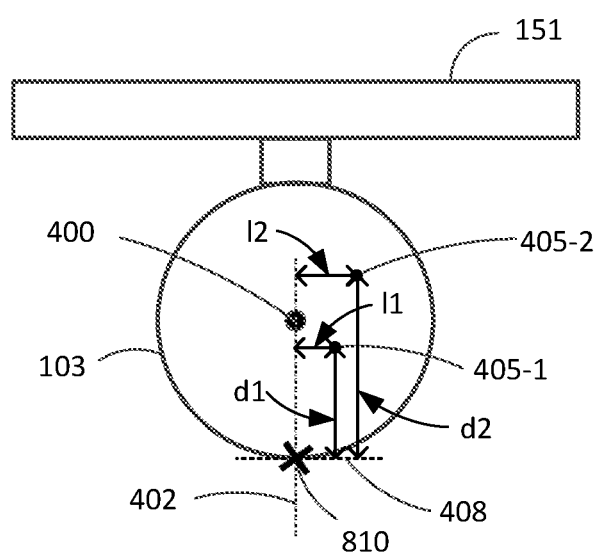
FIG. 11 shows the shot placement map of FIG. 10 with a normalized base point.

As an example of how the normalization of shots may occur, reference is made to FIGS. 10 and 11. FIG. 10 shows an exemplary placement map for two shots. The placement map of FIG. 10 does not provide make/miss information with respect to the shots only the location of the shots. As seen in FIG. 10, a first shot can have a first shot placement identified by dot 405-1. The first shot placement 405-1 can have a corresponding base point 410-1, center line 402-1 and "tangent" line 408-1. Based on the center line 402-1 and tangent line 408-1, the first shot placement 405-1 can be defined according to a lateral position (l1) and a depth position (d1) with respect to the base point 410-1. A second shot can have a second shot placement identified by dot 405-2. The second shot placement 405-2 can have a corresponding base point 410-2, center line 402-2 and "tangent" line 408-2. As can be seen in FIG. 10, base point 410-2 can correspond to the front point 810 (see FIG. 11) and the center line 402-2 can be perpendicular to the backboard 151. Based on the center line 402-2 and tangent line 408-2, the second shot placement 405-2 can be defined according to a lateral position (l2) and a depth position (d2) with respect to the base point 410-2.

As shown in FIG. 11, the first shot placement 405-1 and the second shot placement 405-2 have been normalized to the front point 810. Since the base point 410-2 for the second shot placement 405-2 is at the same location as the front point 810 (i.e., the base point 410-2 and the front point 810 coincide), the location of the second shot placement 405-2 is the same in both FIGS. 10 and 11. However, the base point 410-1 for the first shot placement 405-1 is at a different location from the front point 810 and thus has to be normalized to the front point 810. To normalize the first shot placement 405-1 to the front point 810, a point can be located at the corresponding lateral distance for the first shot placement 405-1 (the lateral distance l1) based on center line 402 for front point 810 and at the corresponding depth distance for the first shot placement 405-1 (the depth distance d1) based on tangent line 408 for front point 810. The location of the point at the lateral position l1 and the depth position d1 with respect to the front point 810 corresponds to the normalized location for the first shot placement 405-1.

Figure 13:
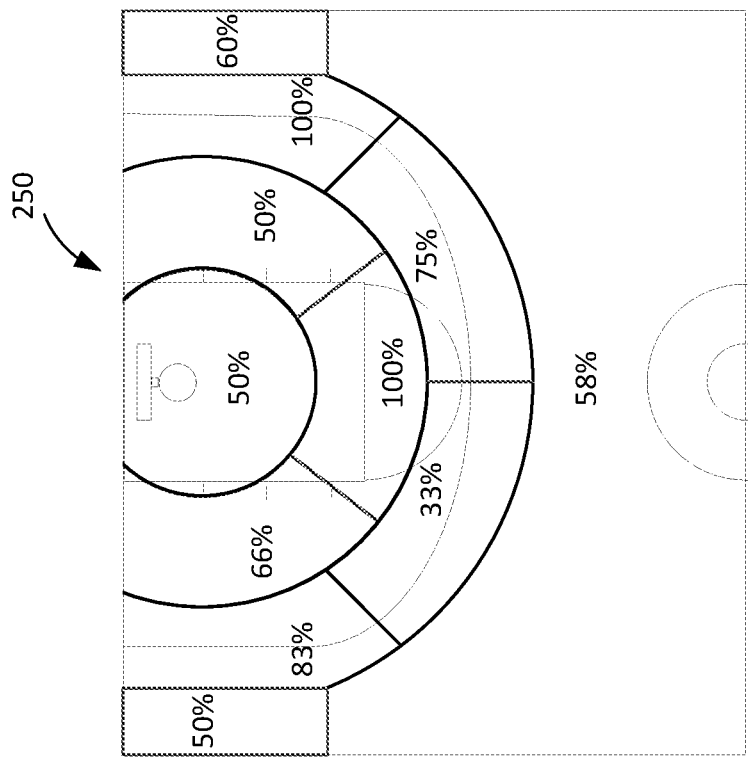
FIGS. 12 and 13 show embodiments of a shot location map and a shot percentage map for a shooter.
Figure 12:
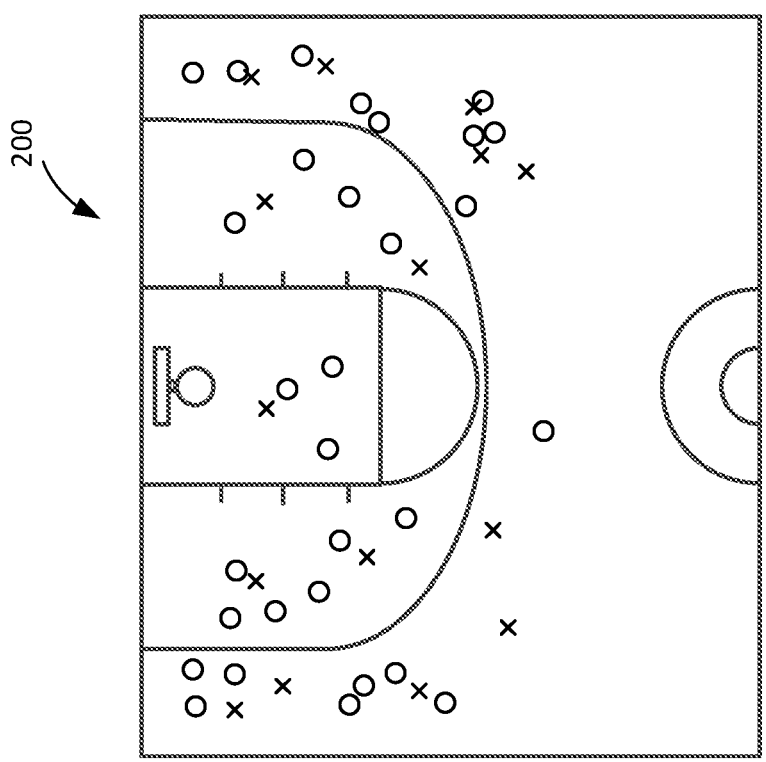

FIGS. 12 and 13 show shot location maps that may be displayed on display 210 to provide information on the shooter's location on the playing surface 119 when taking shots. FIG. 12 shows a shot location map 200 that indicates the shot placements for all the shots and whether the shot was made (indicated by a circle) or missed (indicated by an "X"). FIG. 13 shows a shot map 250 (e.g., a shot percentage map) for the same group of shots used in FIG. 12. However, instead of showing individual shot placements and corresponding shot statuses, FIG. 13 provides information on the percentage of shots made by the shooter 112 in a particular area of the playing surface 119. As shown in FIG. 13, each area of the playing surface 119 can include the percentage of shots made by the shooter 112 within that corresponding area. In one embodiment, the areas of the shot percentage map 250 can be provided with a color from a range of colors to visually indicate the percentage in an area relative to the percentages in other areas. In other embodiments, the size of the areas in the shot percentage map 250 can be adjusted such that more areas or a fewer areas are included in the shot percentage map 250.

Figure 13A:
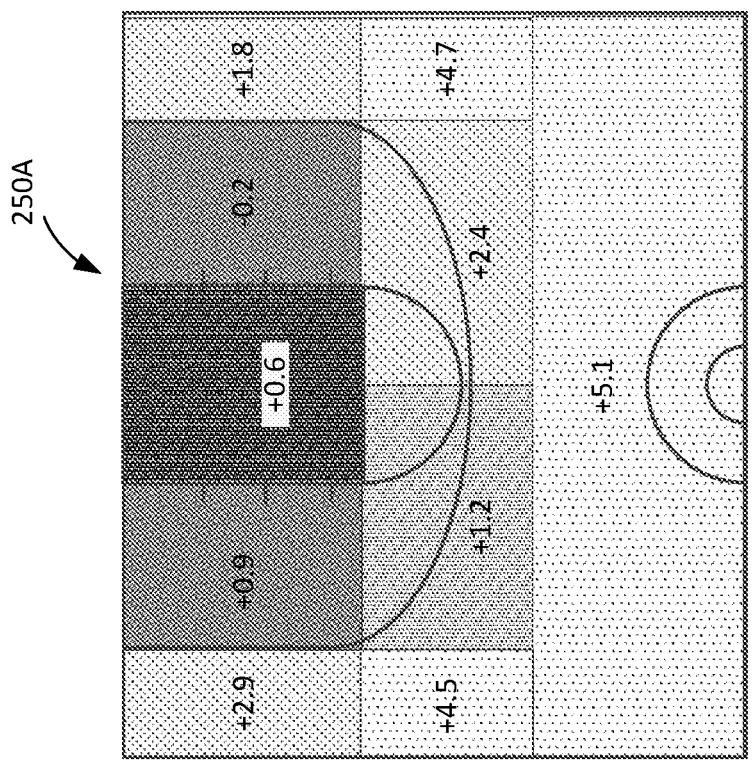
FIGS. 12A and 13A show different embodiments of a shot location map and a shot percentage map for a shooter.
Figure 12A:
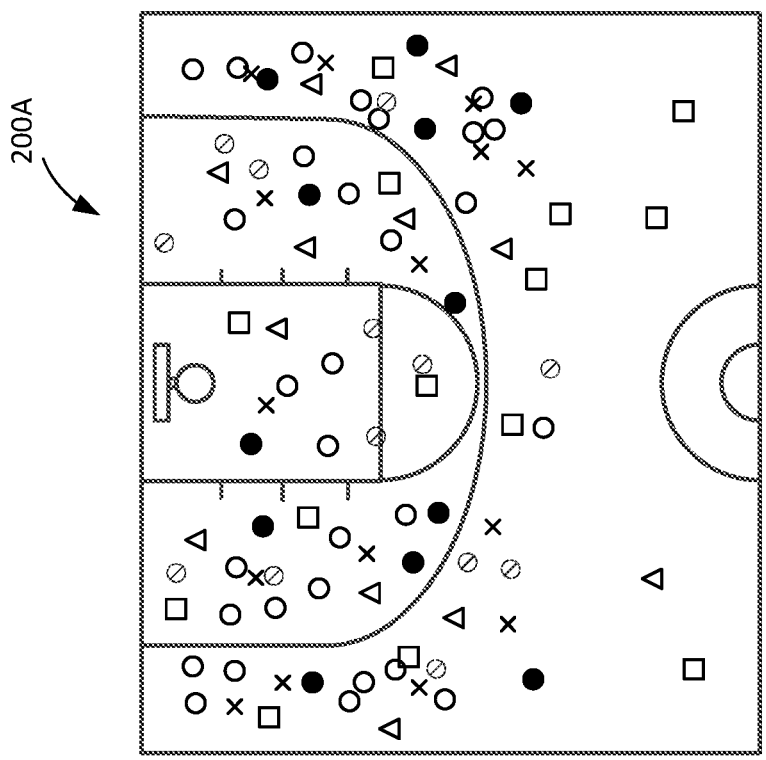

In other embodiments, as shown in FIGS. 12A and 13A, the shot location map and the shot percentage map can provide information about one or more parameters relating to shot placement (e.g., left-right position and/or depth position) occurring at the basketball hoop. FIG. 12A shows an embodiment of a shot location map 200A that can provide information regarding whether the shot was made or missed and the depth position of the shot relative to the rim. In FIG. 12A, made shots are indicated with different circular symbols (e.g., open circle, solid circle or circle with a slash) and missed shots are indicated with different non-circular symbols (e.g., "X," triangle or square). In addition to providing information on whether the shot has been made or missed, the symbols can also provide information related to the depth position of the shot. For made shots (i.e., circular symbols), a shot having a depth position near the center of the hoop can be indicated with an open circle, a shot having a depth position past the center of the hoop (e.g., towards the backboard) can be indicated with a solid circle and a shot having a depth position in front of the center of the hoop can be indicated with a circle with a slash. For missed shots (i.e., non-circular symbols), a shot having a depth position near the center of the hoop can be indicated with an "X", a shot having a depth position past the center of the hoop (e.g., towards the backboard) can be indicated with square and a shot having a depth position in front of the center of the hoop can be indicated with a triangle. In other embodiments, the symbols for a made shot or a missed shot may be colored differently to provide depth position information in place of using the different symbols. In still other embodiments, the different symbols (or different colors) for made or missed shots can provide, in place of depth position, other shot information associated with the shot (e.g., left-right position or entry angle). For example, a made shot to the left of the center of the hoop can be indicated with the circle with the slash and a made shot to the right of the center of the hoop can be indicated with a solid circle). In further embodiments, the different symbols for made or missed shots may also be colored to provide, in addition to depth position, further information about the shot. For example, a green solid circle may indicate a made shot that has a depth position past the center of the hoop and a left-right position to the right of the center of the hoop.

FIG. 13A shows an embodiment of a shot map 250A (e.g., a shot percentage map) that can provide information regarding the shooting percentage of the person in a particular area and the average depth position of the shots taken in that area. In FIG. 13A, the playing surface 119 can be divided into a plurality of different areas (or zones) and a shooting percentage for the shooter 112 can be determined for the shots taken in each of the corresponding areas of the playing surface 119. The shooting percentage of the shooter 112 for shots in a particular area can be indicated with a particular pattern. In the embodiment of FIG. 13A, the darker the pattern in a corresponding area, the higher the shooting percentage (i.e., percentage of made shots) for the shooter 112 in the area. In addition to providing information on the shooting percentage for shots in the area, the shot percentage map can also provide information related to the average depth position of the shots taken in the area. A positive number displayed in a particular area can indicate that the shots taken in that area are past the center of the hoop by an average distance indicated by the number. A negative number displayed in a particular area can indicate that the shots taken in that area are in front of the center of the hoop by an average distance indicated by the number. In other embodiments, the areas of the shot percentage map 250A may be colored differently to provide depth position information in place of using numeric values. In still other embodiments, the numeric values in the areas of the shot percentage map 250A can indicate, in place of depth position, other shot information associated with the shot (e.g., average left-right position or average entry angle). For example, a shot to the left of the center of the hoop can be indicated with a negative number and a shot to the right of the center of the hoop can be indicated with a positive number. In further embodiments, the areas of the shot percentage map 250A can be both colored and patterned to provide, in addition to depth position, further information about the shot. For example, a green cross-hatch area may indicate a high shooting percentage from the green color, a depth position past the center of the hoop as indicated by the numeric value, and a left-right position to the right of the center of the hoop from the cross-hatching. In still other embodiments, the size of the areas in the shot percentage map 250A can be adjusted such that more areas or a fewer areas are included in the shot percentage map 250A. In addition, the numeric values in the areas may be color coded to indicate certain information. As an example, the value of a number in the area may indicate how far the ball is from the center of the rim in a left/right direction, and the color of the value may indicate whether the shot is to the left or right of center. In another example, a positive or negative value may indicate a distance from rim center for one direction (e.g., left/right) and the color of the value may indicate the shot placement in a different direction (e.g., whether the shot is short of rim center or past the rim center). In yet other embodiments, the characteristics of the shot map may be varied in other ways to convey other types or combinations of shot placement information relative to the rim or other reference points.

In other embodiments, if information on multiple parameters is being shown, the areas of the shot percentage maps 250, 250A may use multiple display techniques (e.g., color, pattern and/or topographical) to convey the information in a manner similar to FIG. 13A. For example, average depth position information can be shown topographically and average left-right position information can be shown in color for each area. By showing multiple parameters on the same map, trends may be identified (by a person or the system 100) that can be used to improve player performance. In another embodiment, the shot location maps 200, 200A can show areas with more shot placements and fewer shot placements, similar to placement maps 700 and 900. In still another embodiment, the information in placement maps 600, 700, 800 and 900 can be provided with the shot location maps 200, 200A and/or the shot percentage maps 250, 250A to provide the shooter 112 with additional information on shooting performance. For example, in response to the selection of an area in shot location maps 200, 200A and/or the shot percentage maps 250, 250A, the system 100 can generate and provide the shooter with a placement map 600 and 700 for the shots taken in the selected area. Depending on the size of the selected area, a "normalized" base point can be created that corresponds to the mean of the base points for the group of shot placements in the selected area.

The player performance evaluation system 100 can also provide analytical information relating to shooting parameters used to evaluate whether the shooter 112 is a "good shooter." In one embodiment, the shooting parameters for evaluating a "good shooter" can include average entry angle, entry angle consistency, average depth in the hoop (i.e., average depth position), depth consistency, average left/right position (i.e., average lateral position) and left/right consistency. In other embodiments, shooting parameters such as entry angle range, median entry angle, depth range, median depth position, left/right range, median left/right position, ball velocity or other suitable shooting parameters can be used by the system 100 in place of or in addition to the previously identified shooting parameters when evaluating shooting performance.

The player performance evaluation system 100 can use the shot trajectory and shot placement data used in generating the shot placement maps to determine average entry angle, entry angle consistency, average depth position, depth consistency, average left/right position, left/right consistency, and/or other parameters. In one embodiment, the player performance evaluation system 100 can determine a "good shooter" by calculating corresponding "guaranteed make zones" based on one or more of the averaged parameters and then comparing one or more of the remaining averaged parameters to determine if those parameters would result in shots in the calculated "guaranteed make zone." For example, as noted herein, the "guaranteed make zone" for a shooter having a more optimal angle of entry is generally larger than a "guaranteed make zone" for a shooter having a less optimal angle of entry. In some embodiments, the system 100 can determine a desired "guaranteed make zone" for a shooter based on his/her average entry angle and then compare the average depth position and average lateral position for the shooter to determine if those parameters are within the calculated "guaranteed make zone." If so, the shooter may be characterized as a "good" shooter or a shooter with a higher shooting percentage. In some embodiments, the system 100 can determine a shooting percentage (or other shooting parameter) of a shooter based on the extent to which the shooter's average lateral position or depth is within his or her "guaranteed make zone." For example, for the shooter's average lateral position or depth is within his or her "guaranteed make zone," then the shooter may be characterized as a better shooter or be associated with a higher percentage the further the average lateral position or depth is from the boundary of his "guaranteed make zone." That is, the shooter is characterized as a better shooter the better that his average shot position (e.g., lateral position or depth) is within his/her "guaranteed make zone." In other embodiments, other techniques for determining shooting performance are possible.

The player performance evaluation system 100 can also use the consistency parameters in evaluating a "good shooter." In one embodiment, the consistency parameters can provide an indication of how frequently the shooter 112 has shots that are equal to or within a range of the corresponding average parameters. For example, the depth consistency for a shooter 112 having an average depth of 8 inches can be determined by calculating the percentage of shots from the shooter 112 that had a depth of 8 inches plus or minus a predetermined range (e.g., 1 inch) from the average value. In another embodiment, the consistency parameters can provide an indication of how frequently the shots of the shooter 112 are repeated at the same measurement. For example, the entry angle consistency for a shooter 112 can be determined by identifying the entry angle (e.g., 43 degrees) that most frequently occurs in the shots from the shooter 112 (which may or may not correspond to the average entry angle) and then determining the percentage of shots that occurred at the most frequent entry angle.

When evaluating shooting performance, the system 100 can use the consistency parameters as an independent factor or as a weighting factor. The system 100 may evaluate a shooter 112 as a "good shooter," if the shots from the shooter 112 have higher consistency percentages. The ability of a shooter 112 to frequently repeat a shot parameter can be indicative of someone who is a "good shooter" or someone who can be become a "good shooter" with additional instruction if the particular parameter that is frequently repeated is not within a desired range.

The player performance evaluation system 100 can provide segmented information on the shooting parameters or other shooting information, e.g., placement maps, as requested, for an individual or for some or all of the members of a team. The system 100 can segment the shooting parameter information for the shooter 112 into categories such as: defended shots; open shots; made shots; missed shots; close shots; far shots; shots off a right pass, left pass, inside pass, right dribble, left dribble, straight ahead dribble, step back dribble with right-hand, step back dribble with left-hand, crossover dribble right to left, crossover dribble left to right; shots from a particular area of the court; shots at a particular basket; shots against a particular team; shots against a particular defender; shots at a particular venue; and any other suitable segment that could provide beneficial information. In addition, the player performance evaluation system 100 can provide time-based information on the shooting parameters or other shooting information, e.g., placement maps, as requested. The system 100 can categorize the shooting parameter information for the shooter 112 into categories such as: shots in a particular period; shots after a particular amount of rest, shots during the pre-season; shots during the regular season; shots during the post-season; and any other suitable category that could provide beneficial information. As an example, the system 100 may indicate a player's shooting percentage (or other shooting parameter) from one or more areas on the playing surface for a particular half, game, or set of games.

The player performance evaluation system 100 can also provide comparison information with respect to the segmented and categorized shooting parameter information. For example, the system 100 can provide a comparison of shooting parameter information for a shooter 112 based on shots from the shooter 112 occurring after 1 day of rest, 2 days of rest, 3 days of rest, etc. Thus, the information can be analyzed to determine or estimate the extent to which rest prior to a game or other performance impacts the shooting performance of the player. The system 100 can also provide a comparison of shooting parameter information during the pre-season, the regular season and the post-season. The system 100 can provide a comparison of shooting parameter information for a shooter 112 based on shots from the shooter 112 occurring before an injury and after an injury. The system 100 can also provide a comparison of shooting parameter information based on shots from the shooter 112 occurring during different stages of the injury recovery process (e.g., at beginning of "rehab" and near end of "rehab").

If shooting information has been obtained for more than one shooter 112 or more than one team, comparison data can be provided between the shooter 112 (or team) and another shooter 112 (or team) or group of shooters 112 (or group of teams) to determine if the comparison data for the shooter 112 (or team) applies only to that shooter 112 (or team) or if the comparison data indicates a trend or tendency that would apply to most shooters 112 (or teams). The system 100 can determine that some shooting parameter comparisons are applicable to a broad group of shooters 112, while other shooting parameter comparisons are specific to an individual shooter 112. If there are some shooting parameter comparisons that are unique to the shooter 112, the information can be used to attempt to maximize team wins by either emphasizing or avoiding situations where the shooter's performance is different from most shooters and/or implementing training regimens to assist the shooter 112 in improving the areas that are not on the same level as most shooters 112. As an example, if a player's shooting performance decreases more than average over the course of the game, then it may be determined that fatigue has greater effect on this player than average. In such case, a coach may decide to utilize the player less in the second half or perform certain shooting drills at the end of practice to help the player to learn to shoot better when fatigued.

Figure 14:
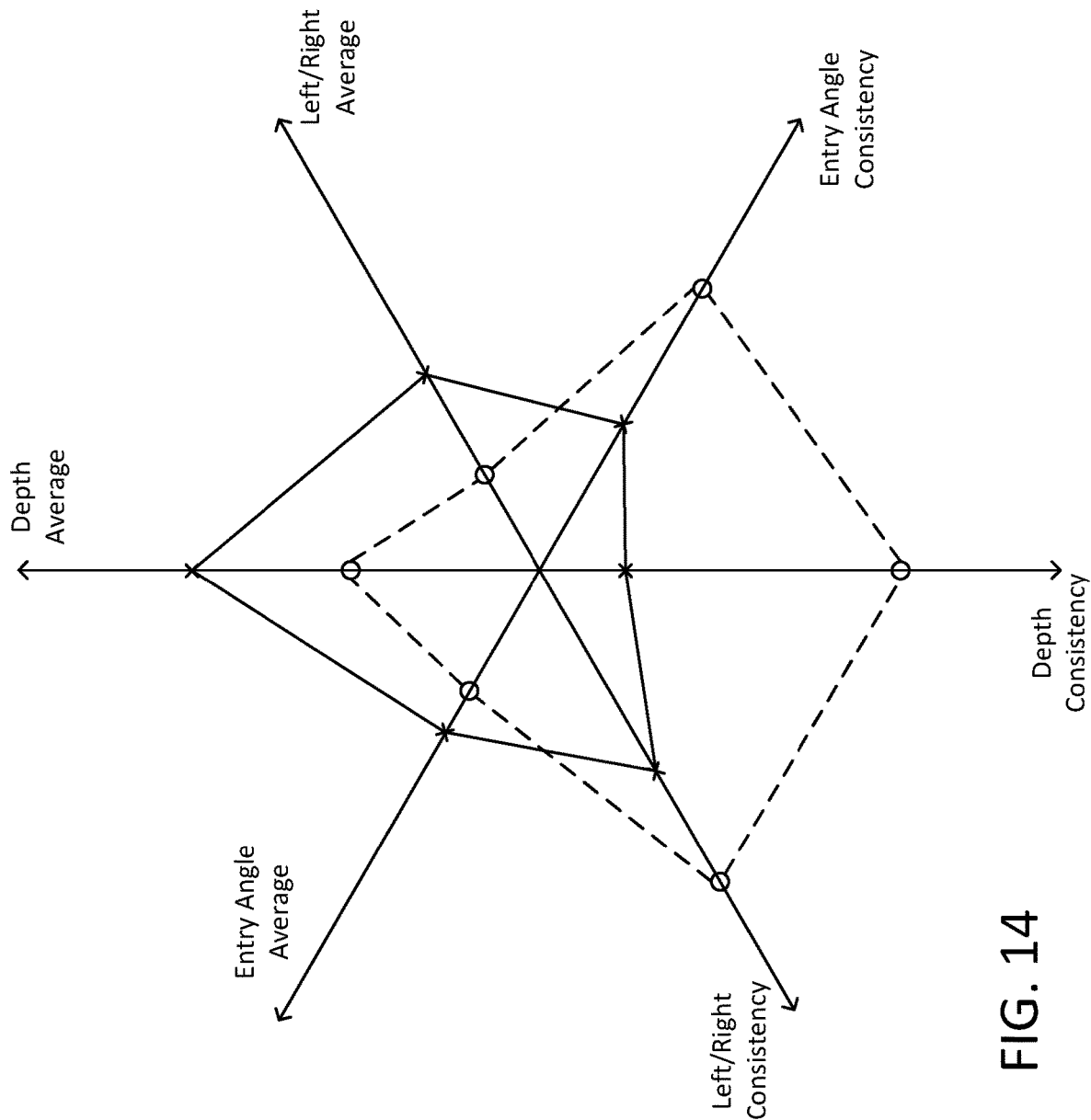
FIG. 14 shows an embodiment of spider graph for the shooting parameters of a shooter.

FIG. 14 shows a spider chart that may be displayed on display 210 to provide information on the shooter's performance with respect to the shooting parameters used to evaluate a "good shooter." FIG. 14 shows a spider chart, radar chart or web chart of average entry angle, entry angle consistency, average depth position, depth consistency, average left/right position and left/right consistency for the made shots (indicated by a circle) and the missed shots (indicated by an "X") for the shooter. In other embodiments, other types or combinations of shooting parameters may be used for the chart depicted by FIG. 14, and different types may be employed as may be desired.

In the example shown in FIG. 14, the shooter 112 has higher consistency parameters for the made shots and lower consistency parameters for the missed shots. The higher consistency parameters for the made shots can be an indicator that the shooter 112 was able to place the ball within the "guaranteed make zone" and the result was a made shot. In contrast, the shooter 112 has "higher" average entry angle, average depth position and average left/right position for the made shots and "lower" average entry angle, average depth position and average left/right position for the missed shots. The higher average entry angle, average depth position and average left/right position parameters for the made shots can be an indicator that the shooter 112 was not able to place the ball within the "guaranteed make zone" and the result was a missed shot.

Figure 17:
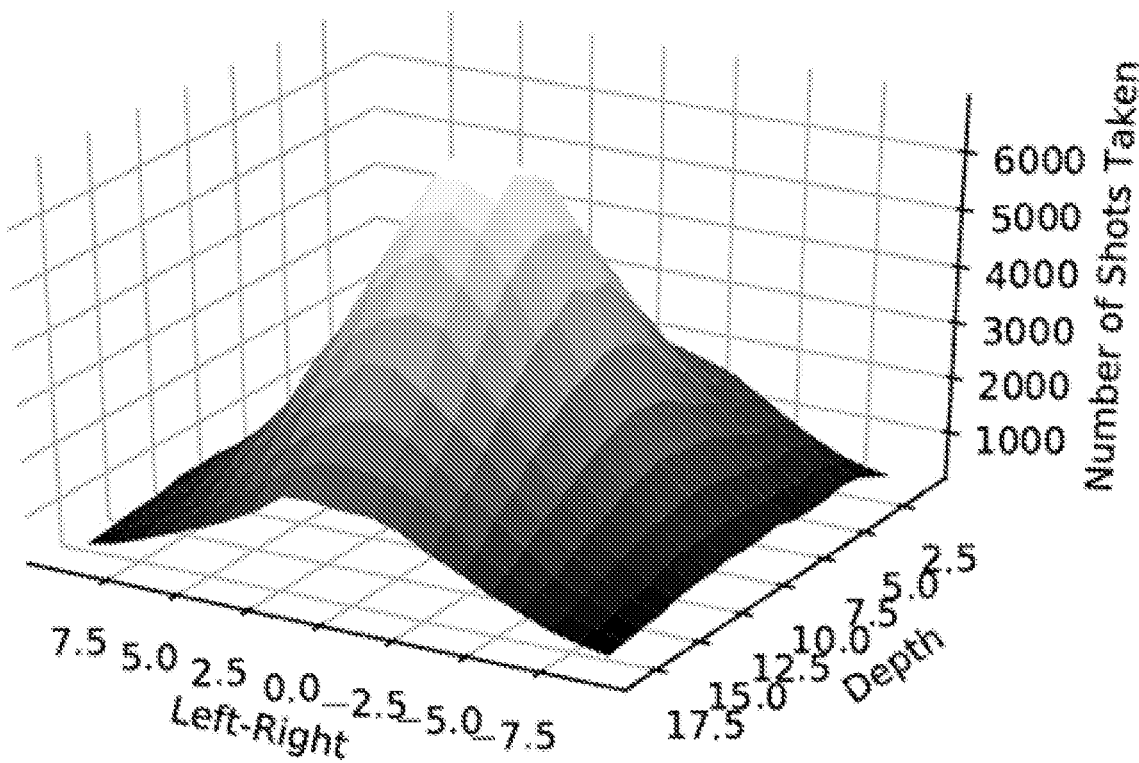
FIGS. 17 and 18 show embodiments of placement maps providing shot placement information topographically.
Figure 18:
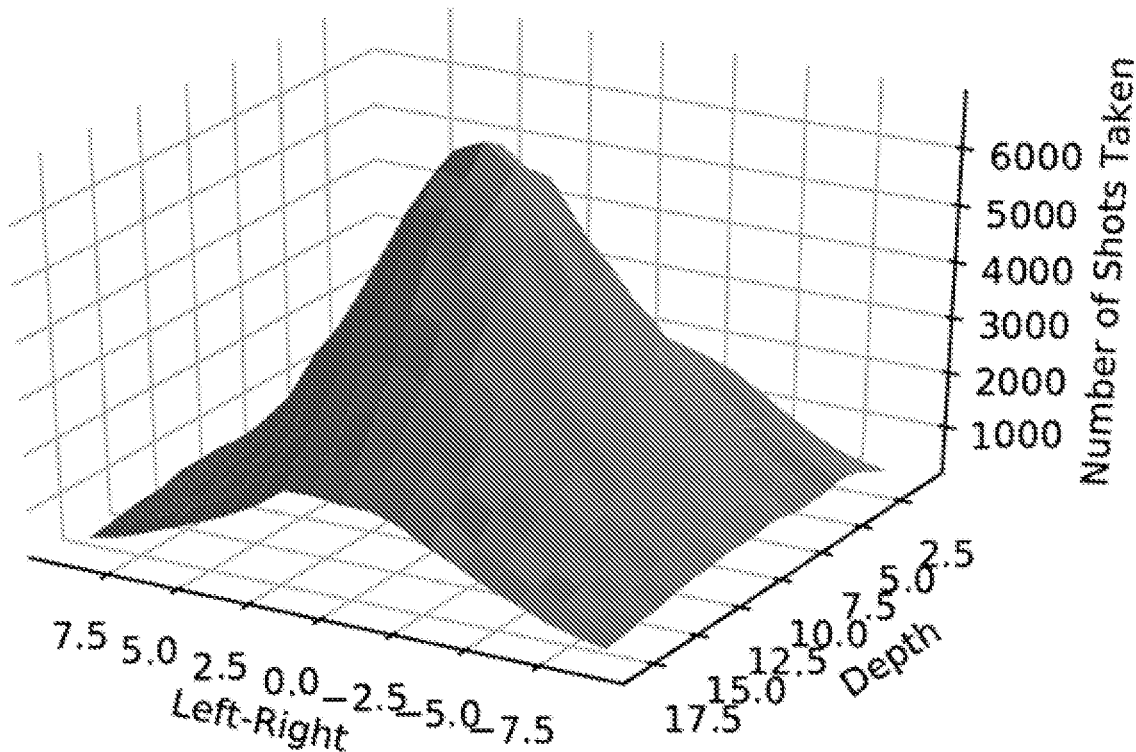

FIGS. 17 and 18 show embodiments of exemplary placements maps that can be generated to provide shot placement information. The placement maps of FIGS. 17 and 18 can provide shot placement information in a topographical format such that a person can easily identify the locations where the player's shot placement most frequently occurs. In some embodiments, the topographical format for the placement map can be shaded or colored (see FIG. 17) to enable a person to more easily distinguish portions of the placement map. While the topographical format for the placement maps is shown with respect to a graph in FIGS. 17 and 18, the topographical format can also be shown with respect to a basketball hoop similar to the display format used in FIGS. 6-11.

In one embodiment, the placement map can be presented to a person over a preselected time period that permits a person to visualize changes to the placement map that occur during the time period. The "time-based" placement map can be presented as a video or a sequence of static placement maps that show the changes in a player's shot placement over a preselected time period. For example, the "time-based" placement map may show monthly changes in a player's placement map over a year time period. In addition, the "time-based" placement map may present information cumulatively (e.g., a subsequent placement map incorporates information from a previous placement map) or independently (e.g., a subsequent placement map does not incorporate information from a previous placement map).

In further embodiments, performance related information may be provided to a user using a layering methodology that can provide additional information on a display being viewed by the user. Performance information about a player or team can be simultaneously shown on the screen during a broadcast of a game without materially interfering with the viewing of the game. For example, during the broadcast of a game, the shooting percentage of the player with the ball may be displayed on the screen. The displayed shooting percentage may correspond, in one embodiment, to the player's overall shooting percentage (i.e., for all shots taken by the player). However, in other embodiments, the displayed shooting percentage can correspond to the player's shooting percentage for the area of the basketball court in which the player is located and/or the player's shooting percentage with respect to the defender that is currently guarding the player. As the player moves about the basketball court and/or is being guarded by different defenders, the displayed shooting percentage for the player can change to correspond to the current area where the player is located and/or the current defender of the player. In other embodiments, the displayed shooting percentage can correspond to the player's shooting percentage for the type of shot being taken by the player (e.g., pull-up shots, lay-ups, catch and shoot shots, off-balance shots, left-handed shots, right-handed shots, driving shots, etc.). In still other embodiments, performance information can be displayed that relates to the quality of an assist provided by a teammate. In other words, performance information can be displayed regarding how likely (or unlikely) a player will be able to make a shot based on a pass received from a teammate. Factors such as the type of pass received, the location of the pass with respect to the player, the location of the pass with respect to the court, the location of the pass with respect to a defender, the speed of the pass, or the ability of the player to stay in motion when receiving the pass can be used to determine the probability (based on historical data) that the player will be able to make a shot based on the pass received from a teammate.

As an example, in FIG. 1, a graphical element 113 (which in this example is a numeric value) is displayed beneath the shooter 112, though this graphical element 113 may be displayed at other locations in other embodiments. In the instant embodiment, the graphical element 113 indicates the shooter's shooting percentage from the shooter's current location, though other types of shooting or performance characteristics may be indicated in other embodiments. The shooting percentage indicated by the graphical element 113 may indicate the probability that the shooter 112 will successfully make a shot if he or she attempts a shot at the current time from his or her current location, and this shooting percentage may be based on several factors. As an example, the shooting percentage may be based on other shots captured by the system for the shooter 112 from the same approximate area as the shooter's current location. Thus, the shooting percentage of the shooter 112 may change as the shooter's location changes.

Note that the shooting percentage calculated by the system 100 may simply be the ratio of the number of successful shot attempts to the total number of shot attempts from the same area in which the shooter 112 is currently located. However, a more accurate prediction of shooting probability may be calculated based on various other shot characteristics tracked by the system 100, such as average release height, average entry angle, average shot placement relative to the rim, or other shot characteristics, for shots taken from the same approximate area as the shooter's current location. In this regard, the shooter's performance as indicated by such shot parameters may be a better indicator of shot probability than the shooter's past make/miss performance, particularly for a low number shots that may not have a high statistical significance.

The shooting percentage may also be based on other factors, such as how closely the shooter 112 is being guarded by the nearest defender 114. As an example, as described in commonly-assigned U.S. Pat. No. 10,010,778, entitled "Systems and Methods for Tracking Dribbling and Passing Performance in Sporting Environments," which is incorporated herein by reference, the system 100 may be configured to track the defender 114, such as the distance of the defender 114 from the shooter, and track the shooter's past shooting performance from the same area relative the distance of the defender 114 from the shooter 112. As an example, the data tracked by the system 100 may reveal that the shooter's performance characteristics, such as make/miss percentage, entry angle, release height, etc., may be affected by how closely he is being guarded, and the shooting percentage indicated by the graphical element 113 may be adjusted to account for such factor. In other embodiments, other types of factors, such as factors indicative of the shooter's fatigue, as described further herein, may be used to determine the probable shooting percentage (or other shot characteristic) of the shooter 112.

In some embodiments, the shooting percentage may be calculated using a weighted formula for which certain more important shooting characteristics (e.g., average entry angle for shots from the same area) are weighted higher than at least some other shooting characteristics. In some embodiments, the shooter's past shooting percentage from the same area as his or her current location may be used as a starting point for the calculation, and this value may be adjusted based on other shooting characteristics, such as average entry angle for shots from the same area. In other embodiments, it is unnecessary to even use the shooter's past make/miss percentage as the player's shooting percentage may be based solely on other shooting characteristics, such as the player's average entry angle and shot placement relative to the rim. In yet other embodiments, past shooting characteristics (e.g., average make/miss, average entry angle, average release height, shot placement relative to the rim, etc.) for shots from the same area may be provided as inputs to a machine learning algorithm that determines the shooting percentage or other probable shot characteristic to be displayed.

In any event, as conditions change (such as the shooter's location and/or the distance of the defender 114 from the shooter 112), the graphical element 113 may be updated to account for the changed conditions. Thus, as play occurs, the graphical element 113 may be continuously updated to indicate the shooter's current probability of making or missing a shot from the shooter's current location. In some embodiments, the location of the graphical element 113 is stationary relative to the shooter 112. Thus, as the shooter 112 moves within the display of the game, the graphical element 113 moves with the shooter 112. In other embodiments, the location of the graphical element 113 may be stationary (e.g., positioned at predefined location, such as a corner of the display, that is not likely to materially interfere with a user's view of gameplay). In some embodiments, the graphical element 113 may indicate the probable shooting percentage of the player who currently has the ball. Thus, as the ball is passed from one player to another, the graphical element 113 is updated to reflect the likely shooting percentage of the player who receives the pass.

Note that is unnecessary for the graphical element 113 to display a numeric value as is shown by FIG. 1. As an example, the graphical element 113 may be a symbol that is changed depending on the shooting percentage or other shooting parameter calculated for the shooter 112 by the system 100. As an example, if the current shooting percentage is below a predefined threshold, the graphical element 113 may be color coded with a first color (e.g., red) and if the current shooting percentage is above the threshold, the graphical element 113 may be color coded with a second color (e.g., green or yellow). If the shooting percentage increases above another threshold, the graphical element 113 may be color coded with a third color indicating that it is highly desirable for the shooter 113 to take a shot at the current time. In another embodiment, the shape of the graphical element 113 may change based on the calculated shooting percentage or other shot characteristic. As an example, the graphical element 113 may be in the shape of an x if the shooting percentage is below a threshold, and the graphical element may be changed to a circle if the shooting percentage increases above the threshold. Graphically coding the shape or color of the element 113 may enable a viewer to quickly assess when it is deemed desirable for the shooter 112 to take a shot.

In addition, it should be noted that similar techniques may be used to provide a prediction of performances of other athletes in other sports. As an example, a graphical element indicating a probability that a quarterback in football will complete a pass may be indicated by the system 100. Such probability may be based on the quarterback's past throwing performance (e.g., spin rate, release velocity, accuracy of throw, etc.) tracked by the system 100 for previous pass attempts. The probability may also be affected by the actions or locations of defenders relative to receivers. As an example, the current velocity and location of a receiver relative to the current velocity and location of the nearest defender may be used to predict separation distance between the receiver and defender at the time that the ball will likely arrive at the receiver if the quarterback initiates a throw at the present time to the receiver. Such separation distance, as well as the receiver's performance in receiving passes in the past, may be used to calculate the quarterback's probability of completing a pass initiated at the present time.

In hockey or soccer, the probability of a player making a shot from his or her current location may be calculated by the system 100 and displayed to a viewer of the game. Such probability may be based on the player's past performance tracked by the system 100 as well as the location and performance of defender's in defending previous shots tracked by the system 100. Yet other types of performance characteristics may be displayed in other embodiments in various sports.

The layering methodology may also be used with an augmented reality system to provide a person with additional information during a training sequence or when viewing a game. For example, the augmented reality system may provide a "shot trace" that shows the trajectory of a player's shot in three dimensions enabling the player to view the path of the ball towards the basket. In a training sequence, the shot trace may be used to assist the player in improving shooting skills. For example, the player may be requested to recreate a previous shot trace (if the trajectory resulted in a shot in the "guaranteed make zone") on a subsequent shot or to alter the player's shot such that the shot trace of the player's shot corresponds to a desired shot trace (which may also be shown) passing through the "guaranteed make zone."

In addition, the person using the augmented reality system can select the specific types of information being layered into the person's view. For example, a player may select left-right position information and depth position information be added to the player's augmented reality view to assist the player in improving his/her shooting performance. In contrast, a person viewing a game with the augmented reality system may select shooting percentage be layered into the augmented reality view to enable the person to predict whether a shot will be successful during the game. In addition, as the person's perspective changes in the augmented reality system, the layered information added to the augmented reality view may also change. For example, a person viewing a game may receive information regarding the offense when a team is at one end of the court and information regarding the defense when the team is that the other end of the court. The layered information may be provided in "real-time" based on the player's performance during the training sequence or the layered information may be based on past information about the player in order to enhance the training sequence (e.g., showing a player performance information to attempt to get the player to work harder during the training sequence).

In an embodiment, the player performance evaluation system 100 can evaluate the shooting parameters used to evaluate a "good shooter" to determine if there are any relationships among the shooting parameters or if the shooting parameters are independent. The player performance evaluation system 100 can evaluate the shooting parameters for an individual shooter 112 or of a group of shooters 112 when attempting to determine relationships among the shooting parameters. The player performance evaluation system 100 may be able to establish relationships among entry angle and left/right position or depth position. For example, the system 100 may identify a relationship between entry angle and depth position such that a lower entry angle results in a greater depth position and a higher entry angle results in a lesser depth position. Similarly, the player performance evaluation system 100 may be able to establish relationships among entry angle consistency and left/right consistency or depth consistency. For example, the player performance evaluation system 100 may determine that a low entry angle can provide for better left/right position or that a low left/right consistency may have a better entry angle consistency. In some embodiments, the system 100 may analyze the shooting parameters and provide recommend ideal or target ranges for a particular player based on his/her personal performance history. As an example, the system 100 may determine a specific range for entry angle or other shooting parameter that is associated with a higher shooting percentage than for shots having the shooting parameter outside of the range. Thus, the ideal or target range for the same shooting parameter may be different for one shooter relative to another.

The player performance evaluation system 100 can be used to assist in evaluating or predicting the shooting capabilities of a shooter 112. The system 100 can provide information to coaches, players or other personnel indicating whether a person has the capability to develop into a "good shooter" with proper training. For example, a shooter 112 with higher numbers for entry angle consistency, depth consistency and/or left/right consistency may be determined to have a higher shooting capability than a shooter with lower consistency numbers because the shooter 112 with the higher consistency numbers has demonstrated an ability to repeat a shooting parameter, which ability can be translated into a capability to repeat a "good shot" with the proper training. In contrast, the shooter 112 with lower consistency number may be identified as having a lower hand-eye coordination level, which may limit the capability of the person to become a "good shooter." However, even if the person only has a limited capability to be a "good shooter," the system 100 can still assist the person in improving his/her shooting via exercises that improve average entry angle, average depth position, and/or average left/right position. Coaches and other personnel can use the shooting capability information for a person in making determinations on which players to include on the team and/or which positions are best for a particular player.

Note that the capability of the shooter may be quantified using a value (e.g., a score) that is calculated or otherwise determined based on the assessed capability of the shooter.

As an example, the value may be calculated using an algorithm based on any of several factors (e.g., the shooter's entry angle consistency, average entry angle, lateral position consistency, average lateral position, etc.). As a further example, the value may be calculated to be higher for players that are assessed to be better shooters such that a higher value indicates better shooting capability. In general, a capability value represents an estimation of a shooter's maximum shooting skill that can be achieved with training and practice. As an example, the system 100 may predict a likely maximum value or ceiling for any specific shooting parameter, such as the shooter's shooting percentage from a certain distance or location from the goal, the shooter's maximum entry angle consistency, or any other parameter described herein. The system 100 may also predict the player's future skill level or a certain shooting parameter at a certain time in the future based on how much improvement the player has demonstrated over time and the amount of training expected in the future according to a defined training regimen or based on past training patterns demonstrated by the player.

Also, note that a capability value or assessment may be based on the rate, referred to herein as "training rate," at which a player improves one or more shooting parameters or skill level. As an example, the system 100 may track the number shots attempted by a particular shooter and assess how much a particular parameter, such as average entry angle, shooting percentage, or any other parameter described herein, improves relative to a desired range for the shooting parameter. The system 100 may then compare this improvement to the number of shots taken during assessment of the training rate. As a mere example, the system 100 may calculate a value indicating how much the shooter's entry angle has improved (e.g., calculate the percentage improvement of the player's average entry angle) and divide such value by the number of shots taken to realize such improvement in order to provide a value indicating the per-shot rate at which the player is able to improve his/her average entry angle. Such a training rate value may be indicative of the player's eye/hand coordination or the player's ability to improve with training. Note that the rate does not have to be per shot. As an example, it should be per unit of time (e.g., per day), per practice session, or some other factor. Using a training rate value, the system 100 may calculate a capability value or otherwise assess the player's capability for improvement. As an example, the system 100 may predict a maximum shooting parameter (e.g., shooting percentage) or otherwise assess a maximum skill level for the player based on at least one training rate value and possibly other parameters, such as one or more of the player's current shooting parameters.

In some embodiments, the system 100 may use data from other players to predict how a given player will improve over time with training. As an example, the system 100 may determine a player's current shooting skill level and assess a training rate indicating the rate at which the player is currently improving one or more shooting parameters. The system 100 may then analyze the tracked performance of other player having similar shooting characteristics (e.g., at a similar skill level and similar training rate) to predict how much the shooting parameter or skill level of the player will likely change over time in order to provide a prediction of what the player's shooting parameter or skill level will be a certain point (e.g., time) in the future. As an example, the system 100 may calculate an average change (e.g., per shot or per unit of time) to the shooting parameter or skill level for the other players determined to have similar shooting characteristics relative to the current player, and then calculate the current player's future shooting parameter or skill level assuming that the player will progress according to the average. Note that the system 100 may provide a prediction of what the player's shooting parameter or skill level will be on a certain day or other time (e.g., month) in the future. In another example, the system 100 may predict what the player's shooting parameter or skill level will be after taking a particular number of shots (e.g., 10,000 or some other number) or after training for a certain number of hours in the future. In other embodiments, other techniques for assessing the shooter's capability and predicting future shooting characteristics of the shooter are possible. Note that the techniques described herein for assessing and predicting shooting performance may be similarly used to assess and predict other types of player performance, such as dribbling performance, passing performance, defensive guarding performance, etc.

In another embodiment, the player performance evaluation system 100 can also determine a release efficiency parameter for a shooter 112 based on the release height, the release separation and/or the release speed of the shots of the shooter 112. To calculate the release efficiency parameter for a shooter 112, the player performance evaluation system 100 may determine the release height, release separation, release speed parameters, and/or other release parameters and compare any of the these parameters to predefined criteria. By standardizing the determination of the release height, release separation and/or release speed (and ultimately the release efficiency parameter), the system 100 can compare different shot techniques across shooters 112 and shot types.

In one embodiment, the release height may be determined as the height of the ball in inches as it last touches the fingertips of the shooter 112. In some embodiments, the release height may be divided by a predetermined number (e.g., 200) or otherwise manipulated to help make the information more intuitive or easier to understand for a user. The release separation may be determined as the distance between the ball and the closest body part of the defender at the time that the ball last touches the finger tips. In some embodiments, the release separation may be divided by a predetermined number (e.g., 100) or otherwise manipulated to help make the information more intuitive or easier to understand for a user. The release speed may be determined as the time from when the ball reaches a predetermined height (e.g., the chin height of the shooter 112) to when the ball last touches the fingertips. In some embodiments, the release speed may be divided by a predetermined time period (e.g., 2/10 of a second) or otherwise manipulated to help make the information more intuitive or easier to understand for a user. Other techniques for determining the release height, release separation and/or release speed may be used in other embodiments.

The player performance evaluation system 100 can determine the release efficiency parameter by combining the release height, release separation, release speed, and/or other release parameters. The release height, release separation, release speed, and/or other release parameters may be added and/or multiplied to obtain the release efficiency parameter. In addition, one or more of the release height, release separation, release speed, and/or other release parameters may be weighted in calculating the release efficiency parameter. Other techniques and/or other parameters may be used in other embodiments to determine the release efficiency parameter.

The system 100 can provide the release efficiency information to coaches, players or other personnel indicating whether a person has the capability to improve as with proper training. For example, a shooter 112 with higher numbers for release speed may be determined to have a higher shooting capability than a shooter with lower numbers for release speed because the shooter 112 with the higher release speed has a lower probability of having a shot blocked by a defender, which can translate into an ability to take and make shots under a broader set of conditions. Coaches and other personnel can use the release efficiency information for a person in making determinations on which players to include on the team and/or how to best utilize a particular player.

In an embodiment, the player performance evaluation system 100 can also determine a guaranteed make ratio for a shooter 112. A "guaranteed make" for each shot attempt can correspond to the ball passing through the "guaranteed make zone." The size of the "guaranteed make zone" can change depending on the shot length, shot release height, entry angle of the shot and/or other shooting parameters. The system 100 can calculate whether the shot went through the "guaranteed make zone" using the entry angle and shot placement information collected for each shot. The system 100 can then determine the guaranteed make ratio by dividing the number of shots passing through the "guaranteed make zone" by the total number of shots taken. The guaranteed make ratio for a shooter 112 can provide a better indicator of shooting capability than a percentage of shots successfully made by the shooter 112 since the percentage of shots successfully made may be inflated from shots that went through the hoop 103 but were not in the "guaranteed make zone" and may not pass through the hoop 103 in subsequent similar attempts. In other words, the percentage of shots actually made may include a group of shots where the result is not repeatable by the shooter 112 or the type of shot is not desired for maximizing shooting percentage.

In one embodiment, the system 100 can provide feedback to the shooter 112 after each shot is taken by the shooter 112. The feedback information may be provided to the shooter 112 in one of a visual format, an audio format and a kinetic format. For instance, in one embodiment, on a visual display, the shot placement relative to the basketball hoop may be viewed by the shooter 112 or the lateral position and depth position of the shot may be viewed in a numeric format by the shooter 112. In another embodiment, when projected through an audio device, numeric values for the lateral position and depth position may be heard by the shooter 112. In yet another embodiment, a kinetic device, such as a bracelet or headband worn by the players may be used to transmit the feedback information in a kinetic format. For instance, the bracelet may vibrate more or less depending on how close the shot is to the center line 402 and/or a predetermined depth line (e.g., a line 11 inches from the base point 410). Alternatively, the bracelet may get hotter or colder depending on how close the shot is to the center line 402 and/or the predetermined depth line. Multiple feedback output mechanisms may also be employed. For instance, the feedback information may be viewed in a visual format by coaches or other spectators on a display while a sound projection device may be used to transmit the feedback information in an audio format to the players.

In general, the parameters may be presented qualitatively or quantitatively. An example of qualitative feedback may be a message such as "to the right" or "to the left" in reference to the lateral position of the shot by the player or "too front" or "too back" in reference to the depth position. An example of quantitative feedback may be the actual lateral position and/or depth position of the shot in an appropriate unit of measurement, such as a message of "2 inches to the right" for the lateral position or "8 inches deep" for the depth position. Again, the qualitative and/or quantitative information may be presented in different formats, such as a visual format, an auditory format, a kinetic format and combinations thereof.

With knowledge of the lateral position and depth position transmitted in the feedback information, the shooter 112 may adjust his next shot to generate a more optimal shot placement. For instance, if the feedback information is a lateral position and their shot is to the right, then the shooter 112 may adjust their next shot to move the shot to the left. The system 100 can then use the shot placement information for the subsequent shot (or group of shots) to determine if the shooter 112 overcompensates or undercompensates with respect to shot placement.

The feedback information may be provided to the player before the ball 109 reaches the hoop 103 or shortly after the ball 109 reaches the hoop 103. The system 100 is designed to minimize any waiting time between shots. For each shooter 112 and for different training exercises, there may be an optimal time between when the shooter 112 shoots the ball 109 and when the shooter 112 receives the feedback information. The system 100 may be designed to allow a variable delay time between the shot and the feedback information to suit the preferences of each shooter 112 that uses the system 100 or to account for different training exercises that may be performed with the system 100. For instance, a rapid shooting drill may require a faster feedback time than a more relaxed drill, such as a player shooting free throws.

In another embodiment, the system 100 can construct specific training exercises for each individual based on one or more of the shooting parameters to increase the learning rate and the shooting percentage for the individual. As an example, if a particular shooting parameter is low (e.g., below a predefined threshold), the system 100 could recommend a certain shooting drill or set of shooting drills associated with the shooting parameter and designed to improve such shooting parameter. In such embodiment, for each shooting parameter, the system 100 may store a list of drills or a practice regimen for improving such shooting parameter, and the system 100 may access and report such drills or regimen when the associated shooting parameter is within a certain range. Since the shooting parameters in need of improvement would be different for each individual, the training exercises and regimen would be highly individualized for each shooter 112. The shooting parameter information from the system 100 could also assist a coach to decide which players might best be able to improve their shot versatility for the benefit of the team and/or which training exercises would be most beneficial to a majority of players on the team. The information on the shooting parameters of a shooter 112 along with the recommended training regimen from the system 100 can assist a coach in predicting how long a particular training regimen would take to get the shooter to the next level of capability and what the ceiling capability would be for the shooter 112.

In another embodiment, the player performance evaluation system 100 can track the performance of both offensive and defensive players and provide a comprehensive training and feedback system to improve offensive and defensive player performance. The system 100 can determine one or more defensive parameters that indicate a defensive understanding of the game and one or more offensive parameters (in addition to shooting parameters) that indicate an offensive understanding of the game.

The analysis software 208 can determine the proficiency of a defender with respect to many different defensive parameters characteristics that provide an indication of a defensive understanding of the game. For example, some of the defensive parameters of the defender that can be evaluated by the analysis software 208 can include block parameters, rebound parameters, and/or steals. In an embodiment, block parameters can include one or more of block opportunities (i.e., shots that could be blocked by the defender), block attempts (i.e., shots that the defender tried to block), blocked shots, height of the block (i.e., how high was defender when blocking a shot), speed of the block (i.e., how fast did the ball travel after the block), lateral distance of the block (i.e., how far did the ball travel after the block), whether the block resulted in a change of possession (i.e., did the defensive team gain possession of the ball 109 after the block or did the offensive team keep possession of the ball 109), location of the block (i.e., whether the block occurred in an area near the hoop), and whether the block was illegal (e.g., a goal tend) or a foul was called on the defensive player. In an embodiment, the rebounding parameters can include one or more of contested rebounds obtained, tipped rebounds obtained, rebounds obtained against specific offensive players, separation (including body part separation) from the offensive player at time of the rebound, rebound height (i.e., how high did the ball travel above the hoop), rebound speed (i.e., how fast did the ball travel from the hoop), rebound lateral movement (i.e., how far did the ball travel from the hoop), and/or position of the body or parts of the body of the defender, (e.g., blocking out) prior to attempting to obtain the rebound. Using any such factors or other factors described herein, the system 100 may calculate a parameter indicative of the defender's proficiency as a defensive player, similar to the techniques described above for assessing the shooting proficiency of a shooter.

The analysis software 208 of the system 100 can also track which offensive players were guarded by the defender and how long the defender guarded each offensive player. The analysis software 208 can also track (for each offensive player) the separation of the defender and the offensive player (including body part separation) during each of dribbling moves, passing moves and shooting moves by the offensive player. The analysis software 208 can also determine the location of the defender and the offensive player on the playing surface 119 during each of the offensive moves. The analysis software 208 can provide corresponding categorized information regarding the defender's performance based on the defender's location on the floor, e.g., close to the hoop, near the 3-point line, on the left-side of the court or on the right-side of the court. The analysis software 208 can also track the offensive performance (e.g., shot versatility) for each of the offensive players guarded by the defender for use in evaluating the defensive performance of the defender.

In another embodiment, the analysis software 208 can determine one or more defensive movements based on a group of corresponding parameters that are determined by the analysis software 208. Each defensive movement, e.g., a "low lunge forward to steal the ball with two hands," can be defined as sequence or group of defensive characteristics that can include hand, arm, shoulder, and leg motions of various heights, of various speeds, of various directions, of various orientations, of various accelerations or decelerations, with various rotations and/or with various velocities. The analysis software 208 can determine the particular defensive characteristics associated with a particular defensive movement using the computer vision logic and then identify the type of defensive movement from the defensive characteristics. Other techniques for detecting defensive movements can be used in other embodiments.

The analysis software 208 can determine the proficiency of the shooter 112 (or other offensive player) with respect to many different offensive parameter characteristics that provide an indication of an offensive understanding of the game. For example, some of the offensive parameters of the offensive player that can be evaluated by the analysis software 208 can include types of shots taken (e.g., pull-up shots, close shots, catch and shoot shots or driving shots), shot versatility factor based on the types of shots taken (a player with a greater shot versatility factor is harder to guard and adds offensive benefit to the team), types of shots made (e.g., pull-up shots, close shots, catch and shoot shots or driving shots), made shot versatility factor based on the types of shots made, shooting parameters for both made shots and missed shots, rebounding parameters and/or turnover parameters. In an embodiment, the shooting parameter information can include the entry angle of the shot, shot placement, shot location, release speed of the shot, separation from the defender at time of shot release, release height of the shot, position of body or parts of the body of the shooter 112 when taking a shot (e.g., position of the shooter's feet when shooting at hoop 103), and the defender of the shooter 112. In an embodiment, the rebounding parameters can include contested rebounds obtained, tipped rebounds obtained, rebounds obtained against specific defenders, separation (including body part separation) from the defender at time of the rebound, rebound height (i.e., how high did the ball travel above the hoop), rebound speed (i.e., how fast did the ball travel from the hoop), rebound lateral movement (i.e., how far did the ball travel from the hoop), and/or position of the body or parts of the body of the offensive player, (e.g., blocking out) prior to attempting to obtain the rebound. In an embodiment, the turnover parameters can include turnovers occurring while dribbling (e.g., steals by the defender or ball or offensive player going out-of-bounds), turnovers occurring while passing (e.g., steals by the defender or ball going out-of-bounds), whether a rules violation occurred (e.g., a travelling violation) or a foul was called on the offensive player, and/or the position (including body part position) of the defender at the time of the turnover.

The analysis software 208 of the system 100 can also track which defensive players guarded the shooter 112 (or offensive player) and how long each defender guarded the offensive player. The analysis software 208 can also track (for each defensive player) the separation of the defender from the offensive player (including body part separation) during each of dribbling moves, passing moves and shooting moves by the offensive player. The analysis software 208 can also determine the location of the defender and the offensive player on the playing surface 119 during each of the moves. The analysis software 208 can provide corresponding categorized information regarding the offensive player's performance based on the offensive player's location on the floor. The analysis software 208 can also track the defensive performance (e.g., blocks and steals) for each of the defenders guarding the offensive player for use in evaluating the offensive performance of the shooter 112.

In another embodiment, the analysis software 208 can determine one or more offensive movements based on a group of corresponding parameters that are determined by the analysis software 208. Each offensive movement, e.g., a "dribble to the basket with the left hand," can be defined as sequence or group of offensive characteristics that can include hand, arm, shoulder, and leg motions of various heights, of various speeds, of various directions, of various orientations, of various accelerations or decelerations, with various rotations and/or with various velocities. The analysis software 208 can determine the particular offensive characteristics associated with a particular offensive movement using the computer vision logic and then identify the type of offensive movement from the offensive characteristics. Other techniques for detecting offensive movements can be used in other embodiments.

In one embodiment, the analysis software 208 can use the computer vision logic to identify the location in a 3-D space of the offensive and defensive player's fingers, hands, elbows, shoulders, chest, head, waist, back, thighs, knees, calves, hips, ankles, feet, and/or other body parts. In addition, once the individual body parts have been identified, the analysis software 208 can determine relative locations of the identified body parts to each other. The analysis software 208 can use the information regarding the location of the player's body for either offensive or defensive performance evaluations. As an example, based on the relative movement of the body parts, the software 208 may identify certain offensive or defensive moves effectuated by the player, such as a jump shot, a pick, a dribble, a hook shot, a layup, etc. In another embodiment, since the players on the playing surface 119 alternate between offense and defense, the analysis software 208 can specifically identify each of the players and store corresponding offensive and defensive information for each of the players.

In one embodiment, the analysis software 208 can be used to identify each of the players and provide each player's offensive and defensive metrics in real time. The analysis software 208 can also provide information on how each player is used on offense (e.g., shooter) and defense (e.g., rim protector). The analysis software 208 can also track and categorize the times during the game the player is on the court (e.g., beginning of game or quarter, end of game or quarter, or ahead or behind by a predetermined number of points) and provide corresponding offensive and defensive metrics for the player. The analysis software 208 can also track the amount of time the player is on the court and provide corresponding offensive and defensive metrics (e.g., shot attempts, made shots, missed shots, turnovers, fouls, or blocks per minute) based on the amount of playing time.

In an embodiment, the system 100 can use the offensive and defensive metrics for the players to provide recommendations on which offensive players should be taking shots in a game (and against which defensive players) and which defensive players should be guarding which offensive players. As an example, the system 100 may display a player's shooting percentage (or other shooting parameter) against each defender (i.e., the defender to be guarding the player for the set of shots defining the shooting percentage). To guard a particular shooter, the coach may select the player against which the shooter has the lowest shooting percentage for the game, the half, the season, or some other time period. In addition, the system 100 can provide recommendations on times during a game when a specific offensive player should be taking shots or when a particular defensive player should be used to guard offensive players. For example, the system 100 can identify that a particular offensive player has good shooting performance at the beginning of halves (or other periods), but has lower shooting performance at the end of halves (or other periods) and then recommend that the player be play more (in terms of time) at the beginning of a half and less at the end of the half. The system 100 can provide recommendations on particular areas of the floor where the offensive or defensive player should be located. For example, the system 100 can identify that a particular defensive player has good defensive metrics when guarding offensive players near the basket, but has lower defensive metrics when required to guard offensive players away from the basket and then recommend that the player be used to guard offensive players near the basket. The system 100 can provide recommendations on the types of shots an offensive player should be taking (e.g., catch and shoot shots) and on the types of shots a defensive player should be guarding (e.g., driving shots). In this regard, the system 100 may categorize a shooting parameter (such as shooting percentage) based on shot type such that a shooter can determine which types of shots he/she is likely to be more successful. Such feedback may be further categorized based on shot location. As an example, the feedback may indicate that a shooter has a higher shooting percentage for one type of shot near or the left of the basket and for a different type of shot further or to the right of the basket. By analyzing the feedback, the shooter can determine which types of shots are likely to be more successful in certain regions of the playing surface.

In an embodiment, the system 100 can be used to evaluate a player's ability to recover from an injury. As previously discussed, the system 100 can provide shooting performance information for a shooter 112 as he/she recovers from an injury. However, the system 100 can also provide comparison information on the offensive or defensive player recovering from an injury with respect to other players recovering from the same or similar injury (if the system 100 is collecting and storing information on multiple players). For example, the system 100 can identify if most players require a specific amount of recovery time for a particular injury or is the recovery time for an injury based on the individual player. The system 100 can also identify if particular injuries result in a similar performance decrease among players or if any changes in performance is based on the individual player.

As an example, the system 100 may track various players having the same injury and determine how long it takes one or more shooting parameters to return to within a certain margin of the player's pre-injury state. Such information may be useful for a coach is assessing how long it will take a player to recover from an injury. Also, if a shooting parameter of a player is not returning to such a state within the same average time period as other players, it may indicate that the player's injury is more severe than expected, that the player is not training hard enough to rehabilitate his/her injury. In an embodiment, the system 100 can use information on recovery times to identify types of training and drills that can be used to shorten the recovery time for a player. In this regard, the system 100 may receive information indicating the types of drills or rehabilitation regimens that various players are using to recover the same type of injury. By comparing the performance results, such as shooting parameters, during rehabilitation, the system 100 can assess which techniques are more effective in returning a player close to his/her pre-injury state. Using such information, the system 100 may make recommendations to other players suffering the same or similar injury. In any event, the system 100 may compare the shooting parameters of a player to a group of players who have suffered the same or similar injuries in order to provide useful information in evaluating the player's injury or training techniques or in making recommendations to the player for rehabilitating the injury.

In an embodiment, the system 100 can provide an interactive sequence to a player to perform an evaluation of one or more skills (e.g., shooting, passing and/or dribbling) of the player. In another embodiment, the interactive sequence may also be used by the system 100 to evaluate the performance of the player at particular sub-skills associated with a skill (e.g., three point shooting and/or entry angle for shooting and left-handed dribbling and/or dribbling height for dribbling). The use of the system 100 in providing the interactive sequence can permit a team or coach to quickly and efficiently determine the value the player may be able to add to the team in both the present and the future and determine how the player's skills (and/or sub-skills) compare to other players. For example, the interactive sequence can be used to evaluate the shooting skills (and/or sub-skills) of a player. The results from the interactive sequence and the corresponding evaluation of the results by the system 100 can provide an indication of the current shooting ability of the player (e.g., with respect to a standard and/or in comparison to other players). For example, the results from the interactive sequence can indicate that the player is a better-than-average shooter with respect to entry angle if the player's average entry angle is near a target entry angle (e.g., an average entry angle of 44 degrees would indicate a better-than-average shooter if the target entry angle is 45 degrees). The results from the interactive sequence can also indicate that the player is a below-average shooter with respect to left-right position if the player's average left-right position is farther from the center line than the average left-right position of other players (e.g., an average left-right position of +4 inches would indicate a below-average shooter if other players have an average left-right position of ±2 inches).

In addition, the system 100 may also provide an indication of what level of shooting performance the player may be able to obtain in the future based on the player's strengths and weaknesses. For example, the results from the interactive sequence can indicate that player has a shooting strength with regard to entry angle (e.g., the player's shots have an entry angle of about 45 degrees), but has a shooting weakness with regard to left-right position (e.g., all of the player's shots consistently go to the right). Based on the above assessment, the system 100 may conclude that the player's shooting performance may improve in the future because other players with similar weaknesses were able to improve their performance with additional training.

Figure 19:
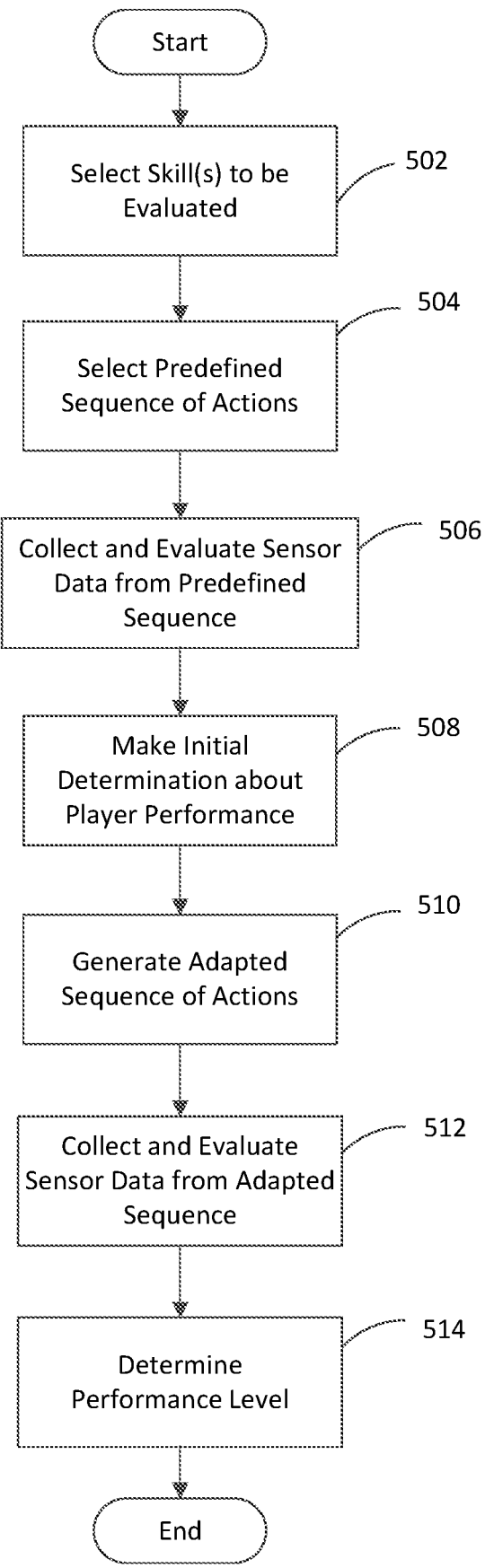
FIG. 19 is a flow chart showing an embodiment of a process for evaluating a performance level of a player.

FIG. 19 shows an embodiment of a process for evaluating a performance level of a player at one or more skills (and/or associated sub-skills). The process utilizes an interactive sequence that instructs the player to perform a series of actions that enables the system 100 to obtain the appropriate data and information to evaluate the performance of the player at one or more skills (and/or sub-skills). The interactive sequence to evaluate the player's performance of one or more selected skills (and/or sub-skills) can include a predetermined portion and an adapted portion. Referring back to FIG. 19, the process can begin by selecting (by a user) one or more skills (and/or sub-skills) to be evaluated (step 502). As previously discussed, the skills to be evaluated for a basketball player can include shooting, passing and/or dribbling and the evaluation of each of the skills may include the evaluation of one or more associated sub-skills. For example, the evaluation of a player's shooting skill can include an evaluation of associated sub-skills such as three-point shooting, entry angle, left-right position, depth position, release height, shooting with the left or right hand, shooting near the basket, shooting near the baseline of the basketball court, etc. In other embodiments, other basketball related skills (and/or sub-skills) may be evaluated for a basketball player. In addition, the process of FIG. 19 can be used to evaluate one or more skills of a player in another sport besides basketball. For example, the kicking or passing skills of a football or soccer player may be evaluated using the process of FIG. 19.

Once the skills to be evaluated have been selected, the system 100 can select a predefined sequence of actions (corresponding to the predetermined portion of the interactive sequence) to be performed by the player based on the skills (and/or sub-skills) being evaluated (step 504). The actions in the in the predefined sequence of actions can be selected from predetermined lists of actions that are associated with each skill to be evaluated. The predetermined list of actions for a skill can include actions that provide information about one or more sub-skills associated with the skill when the action is completed by the player. For example, the predetermined list of actions for the shooting skill can include an action to take a jump shot behind the three point line. When the player performs the action, the system can obtain information about three point shooting percentage, entry angle for the shot, depth position for the shot, left-right position for the shot, release height, etc. that can then be used to assess the shooting performance of the player. The predetermined list of actions can include actions that are used to collect more general information about the performance of the player and actions that are used to collect specific information about the performance of the player. In addition, the predetermined list of actions for a skill may include actions that are not selected for or included in the predefined sequence of actions.

The predefined sequence of actions selected by the system 100 to evaluate the performance level of a skill (and/or sub-skill) can be the same each time regardless of the player being evaluated. In other words, each player receives the same predefined sequence of actions when being evaluated for the same skill (and/or sub-skill). For example, if the system 100 is evaluating the shooting performance of the player, the predefined sequence of actions provided by the system 100 to each player may include instructions to have the player take a predetermined series of shots (e.g., 25 shots) from different locations on the playing surface and/or at different distances from the basketball hoop 103. If multiple skills are being evaluated, the predefined sequence may include instructions for the player to take predetermined actions directed to each of the skills being evaluated. The predefined sequence can be arranged to sequentially evaluate each skill individually (e.g., the player may be required to perform a predetermined series of shooting actions followed by a predetermined series of passing actions) when multiple skills are being evaluated. Alternatively, the predefined sequence for evaluating multiple skills can be arranged such that each sequential action required of the player involves a different skill of the player (e.g., the player may be required to perform a passing action followed by a dribbling action).

Once the predefined sequence has been selected, the system 100 can then provide a series of instructions to the player to perform the actions included in the predefined sequence. The actions in the predefined sequence can be used to efficiently make an initial assessment of the performance of the player with respect to the skills (and/or sub-skills) being evaluated since the performed actions result useful information in assessing performance being obtained quickly, which is needed due to the limited time period for a coach or other person to make an evaluation of the player's skills. In one embodiment, the system 100 can provide instructions to perform the actions of the predefined sequence in a predetermined order. However, in other embodiments, the system 100 can provide instructions to perform the actions of the predefined sequence in a random order.

Sensors 212 of the system 100 can be used to record one or more parameters indicative of the player's performance of the action (e.g., the recording of trajectory information for shooting actions). The system 100 can collect and evaluate the data from the sensors 212 regarding the recorded parameters as the player completes the actions from the predefined sequence (step 506). Once the sensor data has been evaluated, the system 100 can make initial determinations regrading player performance (step 508). In one embodiment, the initial determinations made by the system can be directed to whether or not the system 100 has sufficient information or data to make a determination about the player's performance (either positive or negative) for a skill (and/or sub-skill).

For example, the evaluation of the sensor data may indicate that the player's entry angles for a series of shots fall within a narrow range of entry angles. The presence of a narrow range of entry angles over the series of shots enables the system 100 to determine that there is sufficient information to make an assessment of the entry angle performance of the player because of the small grouping associated with the entry angles. From the small grouping of entry angles, the system 100 can determine the entry angle control the player has for the shots taken by the player. A determination that the player has good entry angle control can be made by the system, if the narrow range of entry angles is near a target entry angle (e.g., 45 degrees) for the shots taken by the player. In contrast, the system 100 can determine that the player has poor entry angle control, if the narrow range of entry angles is outside of a predefined band around the target entry angle.

In another example, the evaluation of the sensor data may indicate that the player's entry angles for a series of shots fall over a wide range of entry angles. The presence of the wide range of entry angles results in the system 100 making a determination that there is not sufficient information to make an assessment of the entry angle performance of the player since the wide range of entry angles prevents the system 100 from performing a meaningful analysis regarding entry angle performance (i.e., the system 100 would have a low degree of confidence regarding any conclusion about entry angle performance). As will be described in more detail below, the system 100 can require additional information about the entry angle associated with the player's shots in order to make an assessment of the entry angle performance of the player with a higher degree of confidence. In an embodiment, the system 100 may use machine learning techniques to make the initial determination regarding the performance of the player.

Based on the initial determinations made by the system 100 from the predefined sequence of actions, the system 100 can generate an adapted sequence of actions (corresponding to the adapted portion of the interactive sequence) for the player based on the skills (and/or sub-skills) being evaluated (step 510). The adapted sequence of actions can include actions that are selected by the system 100 from the predetermined lists of actions for the skills being evaluated in order to enable the system 100 to obtain additional information to permit the system 100 to make better determinations about the performance level of the player. In an embodiment, the system 100 may use machine learning techniques to make the selection of the actions for the adapted sequence based on the initial determinations regarding the performance of the player.

If the shooting performance of a player is being evaluated, the adapted sequence may include additional actions directed to obtaining additional information (or samples) for the sub-skills for which an initial determination could not be made (e.g., sub-skills having a wide range of values after completion of the predefined sequence), but may omit actions directed to obtaining information for sub-skills that had sufficient information to make an initial determination (e.g., sub-skills having a narrow range of values after completion of the predefined sequence). For example, if, after completion of the predefined sequence, the player has a narrow range of values for left-right position and entry angle and a wide range of values for depth position, the adapted sequence of actions can include actions intended to obtain more information about depth position while not including actions intended to obtain information about entry angle or left-right position. The additional actions in the adapted sequence can be used to obtain enough information to either make a determination about the player's performance of a the sub-skill or make a determination that the player's performance of a sub-skill is too inconsistent for any assessment of performance (e.g., strength or weakness) to be made with regard to the sub-skill.

The system 100 can collect and evaluate the data from the sensors 212 regarding the recorded parameters as the player completes the actions from the adapted sequence (step 512). Once the sensor data has been evaluated, the system 100 can determine the performance level for the player for the skills (and/or sub-skills) being evaluated (step 514) and provide the performance level information to the system input/output mechanisms 215 for viewing by the player or other person (e.g., coach). The determinations regarding the performance level of a player for a skill (and/or sub-skill) can include determinations that the player is proficient at certain sub-skills associated with the skill with respect to either other players and/or predetermined standards for the skill and determinations that the player is deficient at certain sub-skills associated with the skill with respect to either other players and/or predetermined standards for the skill. For example, a player may be proficient at having shots at a desired entry angle but deficient at having shots at the desired depth position. In addition, to providing determinations regarding the performance level of the player for skills and sub-skills, the system can also provide a confidence level for the determinations. For example, if the sensor data collected from the interactive sequence and associated with a sub-skill is in a narrow range values or is associated with a compact cluster of data points, the system 100 can provide a higher confidence rating to the determination made from the data because the player is consistent with respect to that sub-skill. In contrast, if the sensor data collected from the interactive sequence and associated with a sub-skill is in a wide range values or is associated with a broad arrangement of data points, the system 100 can provide a lower confidence rating to the determination made from the data because the player is not as consistent with respect to that sub-skill.

In one embodiment, the predetermined portion of the interactive sequence can be the same for each player being evaluated with respect to each particular skill and/or particular sub-skill. The adapted portion of the interactive sequence can vary between the players being evaluated and is based on the results of the predetermined portion of the sequence. In other words, the actions in the adapted portion are selected from the predetermined list of actions for the skills in response to the performance of the player in the predetermined portion of the interactive sequence. The selected actions for the adapted portion can include actions to obtain information about new sub-skills and/or actions to obtain additional information about sub-skills that were being evaluated in the predetermined portion.

In an embodiment, the adapted portion of the interactive sequence may be repeated several times by the system 100 (with either the same actions or new actions from the predetermined list of actions) based on the results of prior adapted portions and the predetermined portion until the system has adequate information to make determinations about the performance level of the player for the selected skills (and/or sub-skills). In still other embodiments, the adapted portion of the interactive sequence may not be needed if the system 100 is able to obtain sufficient information to make determinations about the player's performance level for the selected skills. While the interactive sequence has been described with respect to the evaluation of basketball skills, it is to be understood that the system and interactive sequence can be adapted to evaluate player performance of other skills in other sports (e.g., dribbling in soccer).

To help illustrate some of the concepts described above, assume that the system 100 is used to evaluate a player's skill. Further assume that there is a limited amount of time (e.g., one to two hours) to have the system 100 monitor the player in order to assess his or her skill. To accurately assess the player's skill (e.g., skill level at shooting three-point shots) based solely on the player's shooting percentage may take many thousands of shots to achieve a statistical significance for achieving a desired accuracy of a predication of the player's skill level. With a limited time to monitor the player, it is generally not possible to monitor the player over such a large number of shots. However, using the techniques described herein, it is possible to compare various shot characteristics of the player to similar shot characteristics by a large number of players over a large number of shots to achieve a statistically accurate evaluation of the player's skill.

In this regard, as described herein, it is possible to collect data from a large number of players over a large number of shots to determine various desired ranges for certain shooting characteristics. As an example, by analyzing such data, it may be determined that a player who is capable of shooting a number of shots within a certain range for angle of entry and within a certain deviation range has a high skill level for the shooting characteristic. Thus, even for a small number of shots of a certain type (e.g., three-point shots or jump shots), a player may exhibit a high skill level if his variation in entry angle is low and if his average entry angle is in a certain range. Specifically, if a player shoots a number of shots within a certain entry-angle range (e.g., about 43 degrees to 45 degrees) with relatively small deviation (i.e., the entry angles of the shots are tightly grouped within that range), then an accurate assessment may be made that the player has a high skill level for the type of shot being analyzed. In such case, the system 100 may be capable of assessing the player's skill with a high degree of confidence even though the player has taken a relatively small number (e.g., about 10 to 20) shots. In this regard, the data from a statistically large number of shots may be used to accurately assess with high degree of statistical accuracy the attributes that a shooter with a certain skill level possesses. Moreover, having a small deviation may be a trait shared by shooters with a high skill level such that detecting a small deviation increases the confidence of the skill level assessment even though a small number of shots are actually attempted. On the other hand, a larger deviation may decrease the confidence of the assessment such that it is desirable to obtain more data, such as a larger sampling (e.g., data from more shots), before making an assessment of the player's skill level for a particular type of skill (e.g., the player's skill level at shooting a three-point shot or other type of shot). The confidence in the assessment, which is based on the player's performance during testing, may be used by the system 100 to make dynamic decisions about the sequence of actions instructed by the system 100 so that the time used for monitoring the player is more efficiently used for a range of skills.

As an example, assume that the system 100 is designed to assess the skill level of the user for a variety of skills, including his skill at shooting three-point shots and his skill at shooting jump shots off of a pass (i.e., jump shots within a certain time after receiving a pass). Initially, the system 100 may assess the player's skill level at performing three-point shots by instructing the player to perform a sequence of actions for testing the player's skill at shooting three-point shots. As an example, the sequence of actions may include the shooting of a certain number of shots of a certain type from a certain place on the court (e.g., at the top of the key within a certain distance of the three-point line).

As the user performs the shots indicated by the instructed sequence, the system 100 tracks and records the player's shooting characteristics, such as whether the each shot is made or missed, the entry angle of each shot, the shot placement for each shot relative to the rim, etc. Based on such shooting characteristics, the system 100 may assess the player's skill level for the particular type of shot being tested. In addition, the system 100 may calculate a confidence value for the assessment. As an example, as described above, a smaller deviation in entry angle (or other shooting characteristic) may be a factor that can be used to define or increase the confidence of the assessment. In other embodiments, other factors may be used to determine the confidence of the assessment. If the confidence is within a certain range (e.g., above a predefined threshold), the system 100 may determine that further testing of the particular skill level being assessed is not required. In such case, the system 100 may proceed with assessing other skills in a similar manner by instructing the player to perform sequences of actions associated with other skills, such as shooting jump shots off of passes.

However, if the confidence is not within the foregoing range, thereby indicating that there is a lower confidence in the ability of the system 100 to accurately assess the player's skill for the type of shot under test, the system 100 may instead instruct the player to perform additional actions that are associated with the skill being tested. As an example, the system 100 may instruct the player to perform more shots of the same type, thereby increasing the statistical accuracy of the shooting characteristics, or instruct the player to perform other actions indicative of the skill, such as shots from a different location on the court. Generally, obtaining more data on the player for the skill under test should help to increase the confidence of the assessment until the confidence reaches a level that indicates an accurate assessment is likely. At this point, after performing more actions for the skill under test, the system 100 may then instruct the player to perform other actions associated with other skills, as described above. Thus, the sequences of actions instructed by the system 100 may be dynamically selected or otherwise determined by the system 100 based on the player's performance in order to optimize use the available time for monitoring so that the assessments of the system 100 over a range of skills are more likely to be accurate.

As will be described in more detail below, it is possible for a machine learning algorithm to be employed for assessing the player's skill. Such a machine learning algorithm may receive the monitored characteristics (e.g., entry angle, etc.) as input and then indicate which actions to instruct based on such inputs. In some embodiments, the machine learning system may be used to make skill assessments and to provide, for each assessment, a confidence value indicative of the confidence of the assessment. Based on this feedback from the machine learning algorithm, the system 100 may select from sequences of actions that are predefined and associated with the skill under test.

As an example, the system 100 may instruct the player to perform a sequence of actions for a particular skill and provide the tracked shooting characteristics for the sequence to the machine learning algorithm, which may then assess the player's skill level for the skill under test and provide a confidence value of the assessment. Based on the confidence value, the system 100 may determine whether to instruct a sequence of actions for the same skill or alternatively for a new skill, as described above. Thus, the machine learning algorithm analyzes the results of the actions for a particular skill, but the selection of the sequence of actions is performed by a software program (or other control element) that does not employ machine learning, based on the feedback and, in particular, the confidence value provided by the machine learning algorithm. In other embodiments, other techniques for using machine learning may be used by the system 100.

In one embodiment, the system 100 can be used to evaluate and/or predict a player's performance based on one or more biological parameters. The system 100 can receive information regarding biological parameters associated with a player from sensors 212. In addition, the system 100 can receive information regarding biological parameters associated with a player via a manual entry of information into the system using input/output mechanisms 215 or a data transfer from another computer or system using device/network communication interfaces 209. The information regarding biological parameters associated with a player can include genetic information, microbiome information, physiological information or psychological information for the player.

The biological parameter information can be used to evaluate or predict the physical performance of a player. The biological parameter information may be used to determine a performance level of a player by identifying predetermined changes in biological parameter information. For example, a predetermined drop in the oxygen level of the player from a starting oxygen level may indicate that the player is becoming fatigued. In another example, the absence of a predetermined increase in the heart rate of the player from a starting heart rate may indicate that the player is not providing maximum effort. In addition, the biological parameter information may be used to predict the future capabilities of a player. For example, a younger player's genetic information (or genetic profile) may be used to predict what physical characteristics (e.g., height, weight, muscle mass, etc.) the player may develop in the future. In another example, physiological information (e.g., an increase in antibodies in the blood) may be used to determine an immune response from the player that can be used to determine if the player is becoming sick and thus may perform at a reduced performance level.

The biological parameter information may also be used with skill-based parameter information (e.g., shooting information) to determine when biological parameters can impact skill-based parameters such that the player's performance is significantly altered. Physiological information from the player can be used to determine when a significant change in the player's performance (e.g., shooting performance, dribbling performance, or other type of performance in a game) may occur. The system 100 can store information about both biological parameters and performance parameters such that correlations between the two sets of data can be made.

For example, a player's fatigue can affect his or her ability to successfully accomplish some tasks, such as shooting one or more types of shots. In this regard, as a player fatigues, the entry angle of his or her shots may decrease or deviate more from one shot to the next, such that his or her ability to perform the task is decreased. In some embodiments, the system 100 assess the player's skill in accomplishing one or more tasks (e.g., shooting in general or shooting a particular shot types, such as a three-point shot) based on sensed biological parameters indicative of the player's fatigue or other biological condition. The system 100 also provides feedback indicative of the skill. As an example, the system 100 may provide a value indicate of the player's skill in performing a task, as adjusted for fatigue or other biological condition, and use such value to determine the type of play to run during a game or whether substitute the player or put the player in the game. Skill level value may be a values between a minimum number and maximum number where a lower number indicates a lower skill level. In some cases, the value may be a percentage such as a predicted shooting percentage for the player. Other types of skill level values may be used in other embodiments.

In order to make the foregoing skill level assessment, the system 100 may track the player over an extended period of time during a training phase while monitoring the player's performance (e.g., shooting characteristics, including angle of entry, make/miss, shot placement relative to the rim, etc.) and biological information. The system 100 may correlate each sample (e.g., the measured shooting characteristics for each shot) with the biological information sensed for the player at the time of the sample. To determine the player's skill level for a given fatigue level or other biological condition, the system 100 may use the samples captured by the system 100 while the player was exhibiting a similar fatigue level or other biological condition. Thus, as the player's fatigue level or other biological condition changes, the system 100 may provide a different assessment of the player's skill in performing one or more tasks. As described above, in some embodiments, machine learning may be used to provide an assessment of a player's skill, though the use of machine learning is unnecessary in other embodiments.

When machine learning is used, various parameters may be input to the machine learning algorithm in order assess a player's skill. As an example, the player the training data (both the shooting characteristic and correlated biological information) acquired during a training phase may be used to train the machine learning algorithm to learn the performance characteristics of the player for various biological conditions. In some cases, additional information, such as game situational information may also be used. As an example, as another input the machine learning algorithm, information indicative of the state of the clock (e.g., amount of time remaining in the game) and the score of the game may be included with the player's performance data. Thus, each sample used to train the machine learning algorithm may include, for each shot, the measured shooting characteristics of the shot, the player's biological information at the time of the shot, and game situational information at the time of the shot. The system 100 may learn patterns in the player's performance that can provide an accurate prediction of the player's skill level for a given situation in a game. At a given point in the game, information indicative of the player's biological state and information about the game situation may be input to the machine learning algorithm, which then provides an assessment of the player's skill for the given situation. As an example, the system 100 may be used to provide a similar assessment for multiple players, and the feedback from the system 100 may be used by a coach to determine which of the players should be inserted/removed into/from the game or should be selected to perform a particular task, such as take a game winning shot at the end of the game. Such analysis takes into account how the player has previously performed similar tasks at similar fatigue levels or other biological states and in similar game situations.

Note that there are various techniques that can be used to collect biological information for both training and performing real-time assessments of skill level. For example, the player may be required to provide a physical specimen (e.g., saliva, blood, urine, etc.) to a biological device 140. In some embodiments, the player may be requested to spit into a container to provide a saliva sample or be pricked with a needle to provide a blood sample, however, in other embodiments, any suitable technique may be used to obtain a physical specimen. The specimen provided to the biological device 140 can then be analyzed (by either an analyzer that has been incorporated into the system 100 or by an outside source such as a laboratory) to obtain the biological parameter information about the player. The results of the specimen analysis may either be communicated directly to the computer 202 (e.g., via a wired or wireless connection) if the analyzer is part of the system 100 or the results may have to be uploaded to the computer 202 (either by manual data entry or by electronic data transfer) if an outside source is used to analyze the specimen.

In another example, the biological device 140 may be a non-invasive sensor that is worn by the player during the game or training session or that is applied to the player while on the bench or during a break of the game or training session where the player is idle (e.g., halftime of a game) in order to obtain biological parameter information about the player (e.g., heart rate, respiration rate, blood pressure, oxygen saturation, temperature, etc.). In an embodiment, the biological device 140 may be used to obtain neurological information about the player such that a neurological status of the player may be determined in order to maximize performance of the player or predict the future performance of the player. The non-invasive sensor of the biological device 140 may communicate directly with computer 202 (e.g., via a wired or wireless connection) to provide the biological parameter information to the computer 202 for analysis. In other embodiments, biological parameter information may be obtained by monitoring a player using remote devices. Cameras 118 can be used to record the actions and movements of a player. In addition, microphones or other audio recording devices can be used to record the speech and other sounds produced by the player.

In one embodiment, microbiome information relating to the collective genomes of the microbes (e.g., bacteria, bacteriophage, fungi, protozoa and viruses) that live inside and on the human body may be analyzed to determine a nutritional indication that can be used maximize player performance or predict player performance. Similarly, genetic information relating to the genes and DNA (deoxyribonucleic acid) of the player may be analyzed to determine physical capabilities or limitations of the player that may impact the performance of the player. In another embodiment, a biological phenotype may be developed for the player and used to determine if the player is capable of maximizing performance certain times and/or situations during a game or training session.

Video and/or audio information obtained from cameras 118 and/or microphones may be used to determine biological parameter information of the user. The video and/or audio information may be analyzed by a machine vision system and/or processor 116 to identify actions or characteristics of the player that correspond to biological parameter information. In one embodiment, video information may be used to determine a fatigue level of the player. For example, the processor 116 may identify changes in the player's handling of the ball (e.g., dribbling, passing, or shooting) or changes in the speed with which the player performs actions (e.g., moving to different areas of the court) from video information to determine a fatigue level of the player. Another example of using video information to determine fatigue level can involve the system 100 detecting changes in the trajectory and/or entry angle of shots taken by the player and determining a fatigue level from the changes. As a player becomes fatigued, the trajectory of a player's shot may become "flatter" which results in a smaller entry angle for shots taken by the player. The correlation between fatigue level and trajectory and/or entry angle can be based on stored data that indicates when a change in trajectory and/or entry angle corresponds to the player (or other players) being fatigued.

In another embodiment, an anxiety level of the player may be determined from video information. For example, changes in the player's hand placement on the ball or changes in the amount of perspiration on the ball may be identified to determine an anxiety level of the person. In another example, the amount of perspiration by the player may be determined from biological sensor 140 to determine an anxiety level of the person. For example, increased perspiration from an expected level of perspiration may indicate that the player has an increasing anxiety level.

In still other embodiments, the biological parameter information may be analyzed to determine a player's readiness to enter (or re-enter) a game situation. For example, physiological information, such as information obtained from physical specimens (e.g., saliva, perspiration or blood samples) or information obtained from non-invasive sensors (e.g., temperature, blood pressure, oxygen saturation, heart-rate, etc.) can be used to determine when a fatigued player has rested enough to return to a game situation and perform at an acceptable level. In another example, the video information may be analyzed to determine optical information about the player. The optical information my include information about the player's eye dilation or eye movement that can be used to determine the player's readiness to enter (or re-enter) a game situation. Similarly, information about a player's response time, movements, teamwork or team interaction may be used to determine when a player should exit and/or enter (or re-enter) a game situation. For example, a decrease in response time or movement of a player during a game situation may indicate that the player is playing at a reduced performance level and should be removed from the game situation. Audio information collected about a player may by analyzed to determine whether the player is ready to enter (or re-enter) a game situation. For example, how and/or when the player cheers and/or how or when the player reacts to activity in the game situation can indicate a level of engagement by the player which can indicate a player's readiness to enter (or re-enter) a game situation.

In further embodiments, as briefly described above, biological parameter information can be used to maximize player or team predicted performance by matching game situations and a player's current biological parameter information to stored information about the player's performance in similar game situations with similar biological parameter information. Some examples of game situations include the timing of the game (e.g., two minutes to go in a period, the start of a period, middle of a period, etc.) and the defender(s) that are guarding the player. For example, the system 100 may determine that based on a player's biological parameter information, which may indicate that the player has little fatigue, and the timing of the game (e.g., end of the half), the player should be participating in the game because the player has historically had higher performance in similar situations in the past. Similarly, the system 100 may determine that based on a player's biological parameter information, which may indicate that the player has some fatigue, and the defender guarding the player, the player should not be participating in the game because the player has historically had lower performance in similar situations in the past.

In yet another embodiment, biological parameter information stored by the system 100 for a player may be controlled by the player such that certain biological information may be released to fans, medical personnel, other teams, etc. for other uses. For example, a player may release certain biological parameter information to the player's fan base to permit fans of the player to compare their own biological parameter information to the players. In another example, the player may release biological parameter information to independent medical personnel (e.g., a doctor) who may have been requested to evaluate the physical or mental state of the player.

In an embodiment, the system 100 can be used during a game to automatically control equipment (e.g., the scoreboard 220, the time clock 218 and/or the shot clock 216) used during the game and/or to automatically track and/or update player and/or team information (e.g., game score and/or individual and/or team statistics) during a game. Previously, a "scoreboard operator" was responsible for the operation of the equipment and a "scorekeeper" was responsible for recording game information. The "scoreboard operator" typically watches the action during the game and takes corresponding manual actions (e.g., operate a mechanism to start/stop the time clock or operate a mechanism to update a score on the scoreboard) in response to events occurring during the game. The "scorekeeper" also watches the action during the game and manually records statistics and other information relating to the events occurring during the game. The manual tasks performed by the "scoreboard operator" and the "scorekeeper" can be inconsistently performed (e.g., the delay between stopping the time clock and the action triggering the stoppage can vary dramatically (up to several tenths of a second or even seconds)) and/or be inaccurately performed (e.g., stopping the clock for a missed shot (instead of a made shot) or attributing an action such as a missed shot to the wrong person) with the result that sometimes difficult and time-consuming corrections have to be performed to maintain a requisite level of accuracy for the game. For example, if the time clock is not stopped at the appropriate time, the game may have to be stopped to make the appropriate corrections (e.g., update the time on the time clock), which can interfere with the natural course of the game. In contrast, the system 100 can perform the same actions as the "scoreboard operator" and the "scorekeeper"

with higher consistency (e.g., same game events result in same action taken by system 100) and accuracy (e.g., fewer incorrect determinations) using the images (or other sensor readings) captured by the system 100 and the information and parameters generated by the system 100 from the captured images (or other sensor readings). In one embodiment, the system 100 can perform these actions quickly enough such that there is not any interference with the game (e.g., the system can make determinations about actions in less than 0.1 seconds).

In one embodiment, the scoreboard 220 can display the score (and possibly other information) for each team participating in the game, the time clock 218 can display a time remaining for a predefined portion of the game (e.g., a quarter or half), and the shot clock 216 can display a time remaining for a player to attempt a shot during the game. In some embodiments, the time clock 218 and/or the shot clock 216 may be incorporated into the scoreboard 220. In other embodiments, more than one scoreboard 220, time clock 218 and/or shot clock 216 may be placed around the playing surface 119 used for the game. For example, in a basketball game, the system 100 can automatically reset a shot clock 216 for the game (e.g., set the shot clock 216 to a predetermined time such as 24 seconds or 14 seconds) upon a determination by the system 100 that a shot of the basketball was made (i.e., passed through the basketball hoop) or that the basketball came into contact with the basketball hoop. In addition, the system 100 can control a time clock 218 of the game (e.g., start and/or stop the time clock 218) in response to the determination of specific game actions (e.g., a made shot, a ball travelling out-of-bounds, or the ball being touched by a player after the time clock 218 had been stopped) and/or specific game situations (e.g., less than 2 minutes in the game on the time clock 218).

The system 100 can also automatically track and/or update team and/or individual information and/or statistics during a game and store the information into one or more corresponding records or files in memory. For example, the system 100 can track and/or update the score of the game by determining whether a shot was made, the location where the shot was taken, and the shot type (e.g., 3-point shot, free throw or 2-point shot). The system 100 can also update the score of the game displayed by the scoreboard 220 by determining when a shot is made, determining the proper point value for the made shot based on the location of the shot and the shot type and providing a signal or instruction to the scoreboard 220 to change the score for a team that made the shot by the determined point value. The system 100 can also automatically track and/or update the scoring by individual players during a game by determining the player who has taken the shot that was made, the location of the shot and the shot type. In addition to determining the made shots by a player and/or teams, the system 100 can also determine the total number of shots (or particular shot types) taken by a player and/or team and the total number of shots (or particular shot types) missed by the player and/or team.

In another embodiment, the system 100 can track and/or update other information and/or statistics about a game for a team and/or individual. The system 100 can determine the occurrence of specific game actions or events (e.g., offensive rebounds, defensive rebounds, total rebounds, assists, blocks, steals, fouls, fouls drawn, turnovers, etc.) and track and/or update the information relating to each of the actions or events for either a player or a team. The system 100 can determine when specific game actions or events occur in real-time (e.g., within a predetermined time period from the occurrence of the action), near real-time (e.g., within a time period greater than the predetermined time period but still during the game) or at a later time (e.g., after the game has concluded). In one embodiment, the predetermined time period can be 0.1 seconds or less for the system 100 to determine an action or event. In another embodiment, the system 100 can also generate a box score for the game using the tracked and/or updated information determined by the system 100.

Figure 20:
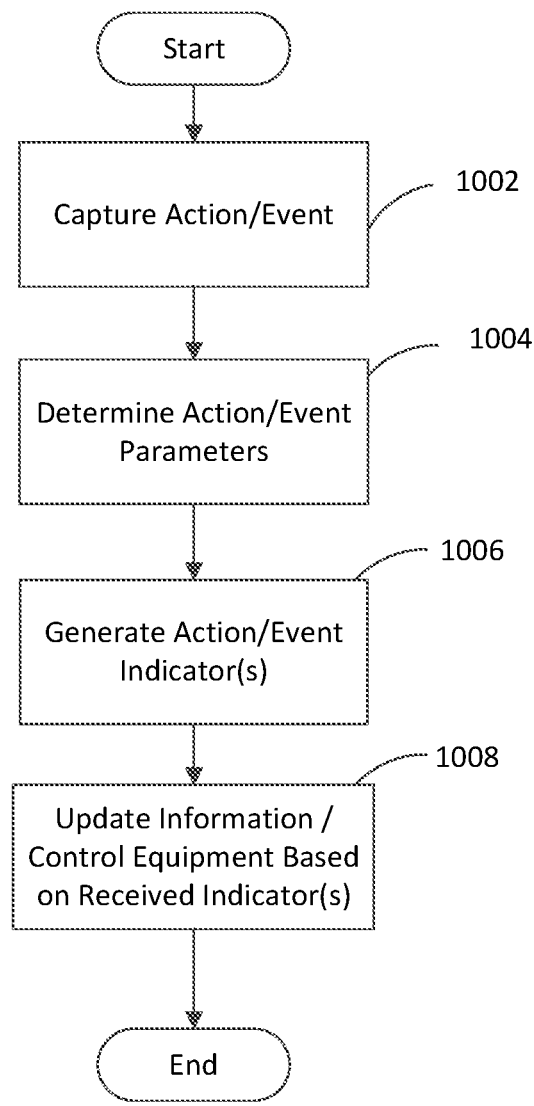
FIG. 20 is a flow chart showing an embodiment of a process for updating information and/or controlling equipment during a game in response to an action.

FIG. 20 shows an embodiment of a process for tracking and/or updating information or controlling equipment during a game. The process begins by capturing a plurality of images or sensor readings of an action or event occurring during the game (step 1002). In one embodiment, the plurality of images can be captured with at least one camera 118 positioned around the playing surface 119 or other types of sensors. The camera(s) 118 can capture the images of the action or event (e.g., a shot) as previously described herein. Once the images of the action or event have been captured, the system 100 can analyze the captured images and determine one or more parameters associated with the action or event (step 1004) including determining the player that performed the action or was involved with the event. In one embodiment, when the action taken is a shot, the system 100 can determine, as previously described herein, parameters associated with the shot such as the shot trajectory, the left-right position of the shot, the depth position of the shot, the shot location, the entry angle of the shot, shot type, etc. In an embodiment, the system 100 can also determine the time on the time clock 218 for the game when the action or event occurred by analyzing the captured images or using other suitable techniques. Once the system 100 has determined the parameters associated with the action or event, the system 100 can then analyze the parameters from the action or event and generate one or more indicators (step 1006) based on the determined parameters from the action or event (and other data associated with the action or event such as the captured images).

Figure 21:
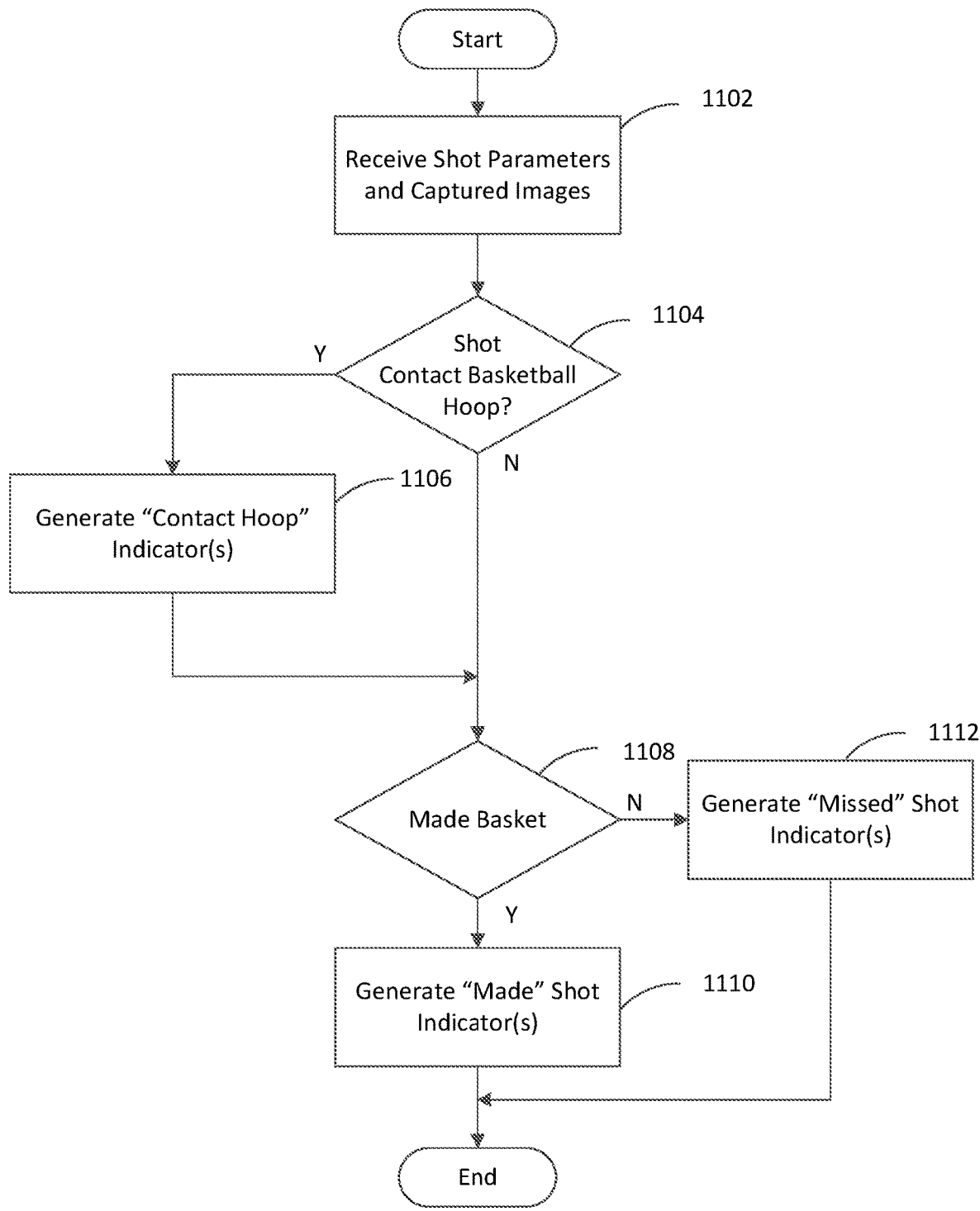
FIG. 21 is a flow chart showing an embodiment of a process for generating signals when the taken action is a shot.

In one embodiment, when the action taken is a shot, the system 100 can generate one or more indicators based on the determined shot parameters. FIG. 21 shows an embodiment of a process for generating the one or more indicators associated with the taking of a shot by the player. In one embodiment, the process of FIG. 21 can be used to generate the indicators from step 1006 of the process of FIG. 20 when the captured action is a shot, but the process of FIG. 21 may also be used to generate indicators for other applications in other embodiments. The process of FIG. 21 can begin with the system 100 receiving the determined shot parameters and the captured images (or other sensor readings or data) associated with the shot (step 1102). The system 100 can then determine whether the shot resulted in the ball contacting the basketball hoop (step 1104).

In an embodiment, the system 100 can determine whether the shot resulted in the ball contacting the hoop (step 1104) by analyzing the captured images associated with the shot and/or by analyzing the trajectory information associated with the shot. The system 100 can determine that the ball contacted the hoop by analyzing the captured images of the shot (such as from an overhead view of the basketball hoop) to: identify the ball and/or the hoop in the captured images; and determine if there is space between the ball and the hoop in the captured images. If the system 100 determines that there is no space between the ball and the hoop in at least one of the captured images, the system 100 can determine that the shot has contacted the hoop. Alternatively, the system 100 can determine that the ball contacted the hoop by analyzing the trajectory information of the shot to: determine the position of the ball relative to the hoop; determine if the position of the ball is in the area occupied by the hoop; identify any changes in the trajectory of the shot; identify any changes in the rotation rate or rotation axis of the ball; and determine if the position of the ball is in the area occupied by the hoop and if there is a change in the trajectory of the shot. If the system 100 determines that there has been a change in the trajectory of the shot and the that the position of the ball is in the area occupied by the hoop (in contrast to the position of the ball being in areas occupied by other portions of the basketball goal such as the backboard), the system 100 can determine that the shot has contacted the hoop. In a further embodiment, the system 100 can determine that the ball contacted the hoop by using one technique (e.g., analyzing the captured images of the shot) and then confirming the initial determination by using the another technique (e.g., determining a change in the trajectory of the shot when the position of the ball is in the area occupied by the hoop). By requiring two separate determinations based on different techniques before making a determination that the ball contacted the hoop, the system 100 can demonstrate increased accuracy and confidence in making determinations regarding the ball contacting the hoop.

Referring back to FIG. 21, if the system 100 determines that the shot has contacted the basketball hoop, the system 100 can generate one or more "contact hoop" indicators (step 1106) that can be used to control game equipment and/or track information as will be described in greater detail below. The system 100 can then determine (or predict) whether the shot resulted in a made basket (step 1108) based on the shot parameters and captured images. In one embodiment, the system 100 can use both trajectory information and visual indicators (from the captured images) to determine if a made basket has occurred. The system 100 can determine whether a made basket has occurred by analyzing trajectory information to determine if the trajectory of the shot results in the ball passing through the basketball hoop. In an embodiment, the system 100 can predict whether the ball will pass through the basketball hoop by analyzing the trajectory information prior to the ball reaching the basketball hoop. After determining that the trajectory of the ball results in the ball passing through the basketball hoop, the system 100 can then analyze the captured images to determine when one or more predetermined criteria (e.g., a predetermined portion of the ball passes a predetermined point associated with the basketball hoop or a predetermined portion of the ball enters a predetermined region related to the basketball hoop or predetermined portion of the ball enters a predetermined region related to the basketball hoop plus a set amount of safety measure time) are satisfied that clearly indicate that a made basket has occurred. By having the made basket determination linked to the predetermined criteria, the system 100 can avoid errors and false determinations of a made basket that can result from an unusual movement of the ball around the hoop such as the ball circling along the inner edge of the hoop and then exiting the hoop from the top of the hoop. In addition, the determination of the made basket based on the predetermined criteria permits the system to consistently determine the exact moment when a made basket has occurred for situations that require such a determination (e.g., for stopping the time clock near the end of a game).

In an embodiment, the organization responsible for the rules of the game can, prior to the game, establish predetermined criteria for the predetermined position for the ball, the predetermined point associated with the basketball hoop, and the set amount of safety measure time to be added used to determine the specific time when a shot passing through the basketball hoop is a made shot. In one embodiment, the predetermined point can be the top of the basketball hoop, the bottom of the basketball hoop, the bottom of the net, the bottom of the backboard, an intermediate point of the net between the bottom of the basketball hoop (i.e., the top of the net) and the bottom of the net or a point corresponding to a predetermined distance measured from any of the previously listed points (e.g., 6 inches below the bottom of the basketball hoop). In another embodiment, the predetermined portion of the ball can be the top of the ball, the bottom of the ball, the center of the ball, an intermediate point of the ball between the top of the ball and the center of the ball or an intermediate point of the ball between the bottom of the ball and the center of the ball. In a further embodiment, the amount of safety measure time to be added can be 0.01 second, or 0.05 second, or 0.1 second or other appropriate time amount. In an embodiment, any combination of the predetermined point associated with the basketball hoop, the predetermined portion of the ball or the predetermined amount of safety measure time to be added from those listed above may be selected as the predetermined criteria to indicate when a made basket has occurred. In other embodiments other criteria may be used to determine when a shot has been made.

An example of how the system 100 can determine a made basket will be provided below with respect to FIGS. 22A-22C. When a shot is taken by a player, the system 100 can determine the trajectory of the shot and the shot placement with respect to the basketball hoop based on an analysis of the captured images. Based on the trajectory information and the shot placement, the system 100 can then determine if the ball will pass, is passing, or has passed through the basketball hoop. In one embodiment, the system 100 can determine if the shot placement is within a "guaranteed make zone," as described above, that is determined by the system 100 based on the trajectory information. The system 100 can determine (or predict) that the ball will pass is passing, or has passed through the basketball hoop in response to the determination that the shot placement is within the "guaranteed make zone." If the shot placement is not within the "guaranteed make zone," the system 100 can then determine whether the shot placement is within a "dirty make zone," as described above, that indicates the ball will pass, is passing, or has passed through the basketball hoop after contacting the basketball hoop and/or backboard. If the system 100 determines that the shot placement is not within either the "guaranteed make zone" or the "dirty make zone," the system 100 can determine that the ball has not passed through the basketball hoop and that the shot will be or has been missed.

Figure 22A:
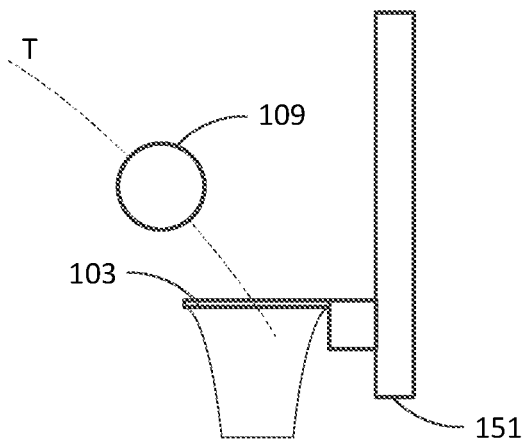
FIGS. 22A-22C show different stages of a ball relative to a basketball hoop that can be analyzed to determine when a made shot occurs.

In FIG. 22A, the trajectory of a ball 109 shot by a player at the basketball hoop 103 (with corresponding backboard 151) is shown by dashed line T. While not shown in FIG. 22A, the shot placement for the shot can be within the "guaranteed make zone" for the shot as determined by the system 100 based on the trajectory information. Since the trajectory T for the shot shown in FIG. 22A is determined by the system 100 to result in the ball 109 passing through the hoop 103, the system 100 can then analyze the captured images to determine when the predetermined portion of the ball 109 passes a predetermined point associated with the basketball hoop 103. In the embodiment shown in FIGS. 22A-22C, the system 100 can determine a made basket using the following exemplary criteria: the predetermined portion of the ball can be the top of the ball 109; and the predetermined point associated with the basketball hoop 103 can be the bottom of the basketball hoop 103. As described above, the system 100 can use other predetermined portions of the ball with other predetermined points associated with the basketball hoop 103 to determine when a made basket occurs.

Figure 22B:
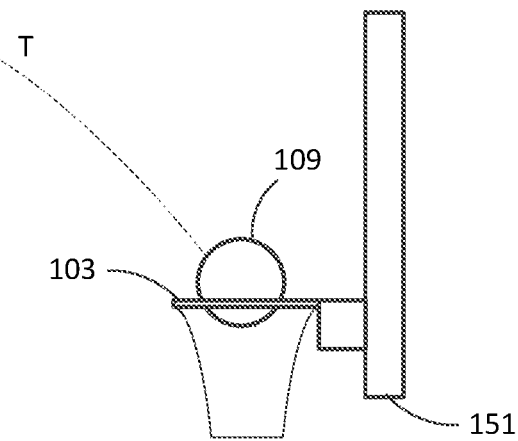
Figure 22C:
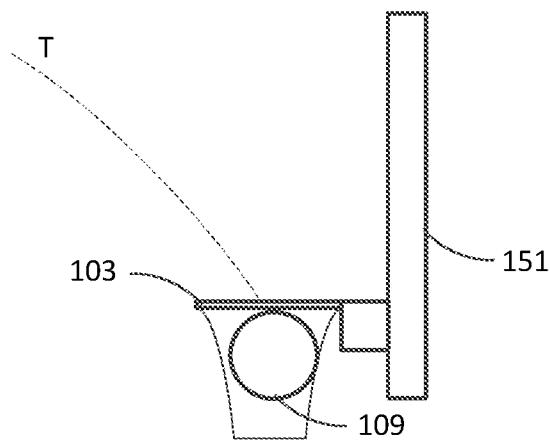

The system 100 can analyze the captured images, which may correspond to the views shown in FIGS. 22A-22C, to identify the ball 109 (and the predetermined portion of the ball 109) and the basketball hoop 103 in the captured images. After identifying the ball 109 and the basketball hoop 103 in the captured images, the system 100 can determine when the predetermined portion of the ball 109 passes the predetermined point associated with the basketball hoop 103. When analyzing captured images corresponding to the views shown in FIGS. 22A and 22B, the system 100 would not make a made basket determination since the top of the ball 109 is above the basketball hoop 103. However, when analyzing a captured image corresponding to the view shown in FIG. 22C, the system 100 can make a made basket determination since the top of the ball 109 is below the bottom edge of the basketball hoop 103.

In another embodiment, the system 100 can determine a made basket by using multiple camera views to determine when the ball passes through the basketball hoop and/or that the predetermined portion of the ball has passed through the basketball hoop. For example, the system 100 can use an overhead camera view (i.e., a view showing the top of the basketball hoop) to determine that the ball will pass through the basketball hoop. Alternatively, the system 100 can use a pair of cameras showing opposite sides of the basketball hoop to determine that the ball will pass through the basketball hoop by determining that the hoop is in front of (i.e., occludes) a portion of the ball in both of the images from the opposed cameras. The system 100 can make the determination that the predetermined portion of the ball has passed the predetermined point associated with the basketball hoop using one (or more) camera(s) showing a side (or front) view of the basketball hoop.

Referring back to FIG. 21, if the system 100 determines that the shot has resulted in a made basket, the system 100 can generate one or more "made" shot indicators (step 1110) that can be used to control game equipment and/or track information as will be described in greater detail below. If the system 100 determines that the shot has resulted in a missed shot (i.e., not a made shot), the system 100 can then generate one or more "missed" shot indicators (step 1112) that can be used to control game equipment and/or track information as will be described in greater detail below.

Referring back to FIG. 20, the system 100 can use the generated indicators, possibly along with other information obtained by the system 100 from the captured action or event, to track and/or update information on players and/or teams and/or control equipment used in the game (step 1008). The system 100 can process the generated indicators to generate control signals or instructions for the shot clock 216, the time clock 218 or the scoreboard 220 based on equipment control algorithms. The equipment control algorithm can generate a particular control signal or instruction in response to the receipt of a particular indicator and, in some embodiments, the satisfaction of one or more additional criteria associated with the indicator. Similarly, the system 100 can process the generated indicators to generate control signals or instructions that can update the information or statistics for a player and/or team in memory based on game statistic control algorithms. The game statistic control algorithms can generate a particular control signal or instruction to update information in memory for a player and/or team in response to the receipt of a particular indicator, the identification of the player and/or team to which the particular indicator pertains and, in some embodiments, the satisfaction of one or more additional criteria associated with the indicator.

For example, if the system 100 receives a "contact hoop" indicator, the system can generate a control signal to set (or reset) the shot clock 216 to a predetermined amount of time. In one embodiment, the system 100 can determine the predetermined amount of time associated with the control signal by determining whether a "change of possession" has occurred by also analyzing the captured images to identify the ball and/or one or more players possessing the ball. The system 100 can determine that a "change of possession" has occurred by determining that a made shot has occurred, as described above, or that the defensive team has gained control of the ball if a missed shot has occurred. In an embodiment, a first predetermined amount of time (e.g., 24 seconds) may be used if the system 100 determines a "change of possession" has occurred or a second predetermined amount of time (e.g., 14 seconds) may be used if the system 100 determines a "change of possession" has not occurred.

In another example, if the system 100 receives a "made" shot indicator, the system 100 can generate a control signal for the scoreboard 220 to increase the score for the team that made the shot (as determined by the system 100 by analyzing captured images or other information). In one embodiment, the system 100 can determine the increase amount for the scoreboard 220 by determining the shot location for the shot (as described above) and assigning a particular point value (e.g., 2 or 3 points) based on the shot location. In addition, if the system 100 has not received a "contact hoop" indicator, the system 100 can generate a control signal to set (or reset) the shot clock 216 to a predetermined amount of time based on the receipt of the "made" shot indicator. The system 100 can also can generate a control signal to stop the time clock 218 in response to a "made" shot indicator if a determination is also made by the system 100 that certain game criteria has been satisfied (e.g., less than 2 minutes in the game). The "made" shot indicator can also be used by the system 100 to generate instructions to update the information and/or statistics in memory associated with the player and/or team that made the shot.

In still another example, if the system 100 receives a "missed" shot indicator, the system 100 can generate instructions to update the information and/or statistics in memory associated with the player and/or team that missed the shot. In addition, if the system 100 has not received a "contact hoop" indicator, the system 100 can generate a control signal to set (or reset) the shot clock 216 to a predetermined amount of time if the system 100 also determines that a change of possession has also occurred. The updating of team and/or individual information with regard to made or missed shots can also include instructions to update other information associated with the determined shot parameters for the shot.

For other actions, the generated indicators can be used by the system 100 to generate control instructions to update team and/or individual information with regard to the action (e.g., a defensive rebound) and to update the corresponding information associated with the determined action parameters for the action. In addition to updating the team and/or individual information for the other actions, the generated indicators can also be used to control equipment used during the game. For example, if an indicator is generated by the system 100 that indicates that the basketball has been touched by a player after the time clock 218 had been stopped, the system 100 can generate a control signal to start the time clock 218 in response to the "touching" indicator. In one embodiment, the "touching" indicator can be generated by the system 100 by analyzing the captured images to identify the player(s) and the ball and then determine when a part of a player has contacted the ball in the images. Similarly, other indicators can be generated based on an analysis of the captured images by the system 100 that can result in the generation of control signals that can start or stop the time clock 218. For example, a "foul" indicator can be generated by the system 100 by analyzing the captured images to identify a referee and then determine when the referee makes a movement indicative of the occurrence of a foul (e.g., by raising his arm at least a predefined amount) and/or by detecting when a whistle sound occurs. The system 100 can generate a control signal to stop the time clock 218 in response to the "foul' indicator.

In another embodiment, the system 100 can generate control signals that are used to activate an indicator for a human operator (e.g., a scorekeeper or scoreboard operator) notifying the person that an action should take place (e.g., operate the scoreboard, time clock or shot clock or update a statistic or information associated with the game). By providing indicators to the human operators, the system 100 can augment the duties performed by the human operators while still permitting the human operators to apply their judgment to particular situations. The control signals generated by the system 100 for the human operator can activate a visual indicator (e.g., an indicator light is activated), an audible indicator (e.g., a tone or computer-generated speech is provided to an earpiece worn by the person) and/or a physical indicator (e.g., a device worn by the person vibrates or provide other physical stimulation). For example, on receipt of a "contact hoop" indicator, the system 100 can generate a control signal that activates "a reset shot clock" light on the scoreboard controller for the scoreboard operator. In another embodiment, the system 100 can generate control signals that provide the human operator with a prompt to confirm an intended action to be taken by the system 100. For example, if the system 100 receives a "made basket" indicator, the system 100 can generate a prompt to the human operator that indicates that the system 100 is intending to update the score on the scoreboard, stop the time clock, or reset the shot clock. The human operator can then either "accept" the intended action and the system 100 will automatically perform the action or "decline" the intended action by the system 100 and manually perform an action (or take no action). Such acceptance or declining may be indicated by a manual input from the human operator, such as the push of a button or toggle of a switch. In a further embodiment, if the human operator does not respond to the prompt from the system 100 within a predetermined time period (e.g., 1 or 2 seconds), the system 100 can automatically perform the intended action without input from the human operator.

Note that this type of interaction between a human and the system may enable the system to perform in a manner that is more reliable and accurate than what could be achieved through complete manual control or complete automatic control. For example, in the context of stopping the time clock after a made shot, manual verification that a shot is made is highly reliable after several seconds of human observation, but may be considerably less accurate at the time that a decision should be made to accurately stop the clock. In such a situation, the system 100 can automatically detect that a shot is made through any of the techniques described herein and mark the time indicated by the time clock at the precise moment that the shot is made (according to the criteria used to determine a made shot). If the human operator confirms the made shot, then the system 100 may update or otherwise control the time clock so that it indicates the time marked by the system 100 at the precise time that the shot was made.

In such an embodiment, the system 100 may continue to track the time that elapses after the point at which the shot is deemed to be made. If the human operator provides an input indicating that the shot was not in fact made, the system 100 may update or otherwise control the time clock so that it indicates the correct time of the game in the absence of the made shot. For example, the system 100 may initially stop the time clock when it detects a made shot. If the human operator determines that the shot was not actually made, the system 100 automatically adjusts the time clock so that it indicates a time as if the time clock was never stopped by the system 100 in response to the erroneous detection of a made shot. In another example, the system may allow the time clock to continue to run temporarily after detecting that a shot is made. If the human operator later confirms that the shot was made (e.g., by an affirmative input or absence of an input after being notified of the detection of the made shot), then the system 100 may update the time clock to indicate the time marked when the shot was deemed to be made. For example, if the time clock was at 10.2 seconds when the shot was made, and the human operator confirms that the shot was in fact made when the time clock indicates 8.1 second (assuming that the time clock is counting down), the time clock may be adjusted to indicate 10.2 seconds.

In either embodiment, the precise time that a shot is made, as determined by the system 100, is indicated by the time clock after a made shot, and the making of the shot is confirmed by a human operator after observing the shot some amount of time (e.g., a few seconds) after the shot is deemed to be made by the system 100. Such embodiments allow human operators to take additional time after the making of a shot to confirm that the shot indeed was indeed made while still precisely indicating the exact moment that the shot was actually made, as determined by the system 100. Similar techniques could be used to precisely mark the occurrence of an event while allowing manual confirmation of the event some amount of time later, such as resetting of the shot clock, for example.

Similar techniques may also be used to provide confirmation of an event, such as a made shot, by the system 100 regardless of whether manual confirmation of the event is provided. As an example, once the system 100 make a determination that an event occurs, such as a made shot, the system 100 may continue to evaluate the shot and ultimately come to a more accurate determination about the occurrence of the event. The system 100 may then automatically update a clock as appropriate to indicate the precise time of occurrence of the event. As an example, the system 100 after making an initial determination that a shot was made may make a determination through further evaluation that the shot in fact was missed. In such case, the system 100 may update the time clock so that it indicates the correct time as if the determination of a made shot never occurred. Alternatively, the system 100 may allow the time clock to continue to run for a short time after detecting a made shot and then adjust the time clock to the precise time of the made shot after later confirming that the shot indeed was made. As a mere example, if a made shot is deemed to occur once the center of the ball passed through the hoop, the system 100 may mark the time that the center of the ball is at or just below the hoop but may update the time clock once another portion of the ball, such as the top of the ball, passes through (e.g., is below) the hoop. In yet other embodiments, other techniques may be used to precisely indicate the time of occurrence of an event based on information gleaned after such occurrence.

Figure 15:
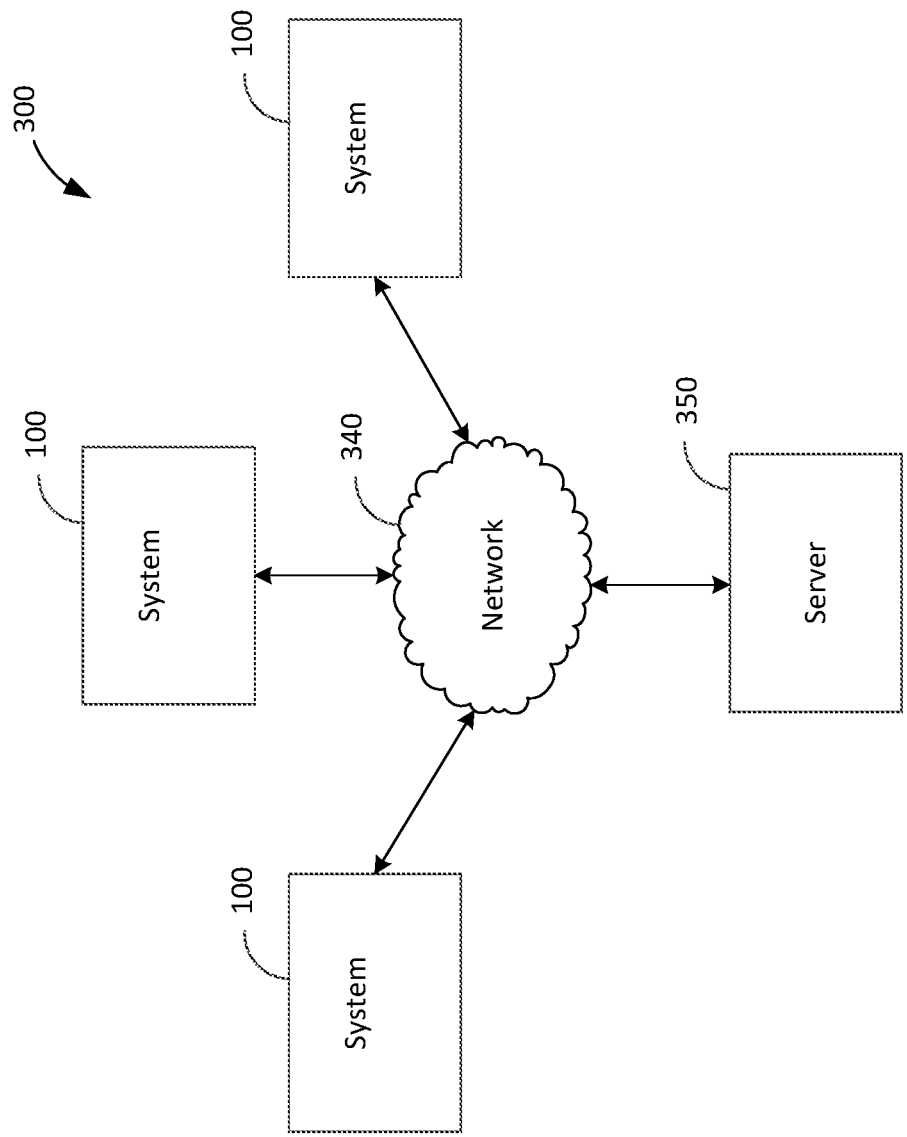
FIG. 15 shows an embodiment of a data aggregation system.

In an embodiment, the system 100 can be part of a larger data aggregation system that collects and processes player performance information from multiple systems 100. FIG. 15 shows an embodiment of a data aggregation system 300. The aggregation system 300 can include a server 350 that is connected to multiple systems 100 by a network 340. As each system 100 collects player performance information (e.g., shooting parameter information) from either a game or from practice and/or training sessions, the system 100 can provide the information to the server 350. In one embodiment, the systems 100 can automatically provide the player performance information to the server 350 on a predetermined time schedule (e.g., once a day or upon completion of a game or training session) or when a predetermined amount of information has been collected (e.g., 5 gigabytes or 1000 records). In another embodiment, the server 350 can automatically request information from the systems 100 at predetermined times or in a predetermined sequence. In still another embodiment, an operator of a system 100 can manually initiate the providing (or uploading) of information to the server 350.

In one embodiment, the network 340 can be the Internet and use the transmission control protocol/Internet protocol (TCP/IP) to communicate over the network 340. However, in other embodiments, the network 340 may be an Intranet, a local area network (LAN), a wide area network (WAN), a Near Field Communication (NFC) Peer to Peer network, or any other type of communication network using one or more communication protocols.

Figure 16:
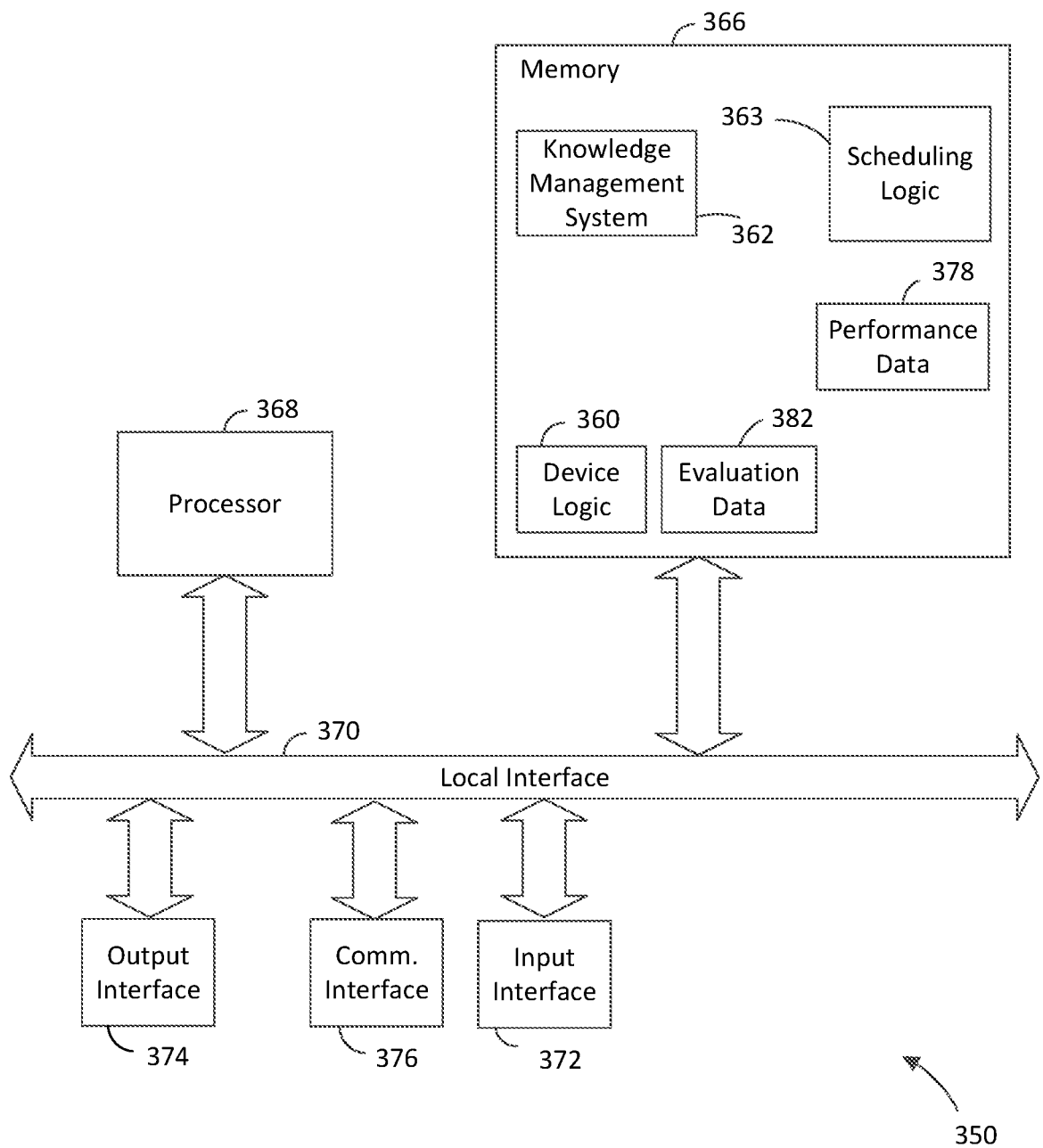
FIG. 16 is a block diagram of an embodiment of a server used in the data aggregation system of FIG. 15.

FIG. 16 shows an embodiment of the server 350. The server 350 may be implemented as one or more general or special-purpose computers, such as a laptop, hand-held (e.g., smartphone), user-wearable (e.g., "smart" glasses, "smart" watch), user-embedded, desktop, or mainframe computer. The server 350 can include logic 360, referred to herein as "device logic," for generally controlling the operation of the server 350, including communicating with the systems 100 of the data aggregation system 300. The server 350 also includes logic 362, referred to herein as a "knowledge management system," to review and process the information from the systems 100 and scheduling logic 363 to manage the reserving of systems 100 for use by individuals or teams. The device logic 360, the scheduling logic 363 and the knowledge management system 362 can be implemented in software, hardware, firmware or any combination thereof. In the server 350 shown in FIG. 16, the device logic 360, the scheduling logic 363 and the knowledge management system 362 are implemented in software and stored in memory 366 of the server 350. Note that the device logic 360, the scheduling logic 363 and the knowledge management system 362, when implemented in software, can be stored and transported on any non-transitory computer-readable medium for use by or in connection with an instruction execution apparatus that can fetch and execute instructions.

The server 350 can include at least one conventional processor 368, which has processing hardware for executing instructions stored in memory 366. As an example, the processor 368 may include a central processing unit (CPU), a digital signal processor (DSP), a graphic processing unit (GPU) and/or a quantum processing unit (QPU). The processor 368 communicates to and drives the other elements within the server 350 via a local interface 370, which can include at least one bus. Furthermore, an input interface 372, for example, a keypad, keyboard, "smart" glasses, "smart" watch, microphone or a mouse, can be used to input data from a user of the server 350, and an output interface 374, for example, a printer, speaker, "smart" glasses, "smart" watch, "direct to brain" system, "direct to retina" system, monitor, liquid crystal display (LCD), or other display apparatus, can be used to output data to the user. Further, a communication interface 376 may be used to exchange data with the systems 100 via the network 340 as shown in FIG. 15.

The knowledge management system 362 can use the performance information obtained from one system 100 (including performance information for the gym/team(s)/individual(s)) and analyze the obtained performance information compared to the mass or aggregate of performance information gathered from all the systems 100 (including performance information for the gyms/teams/individuals). In one embodiment, the knowledge management system 362 can analyze the performance data 378 from the systems 100 to determine practice approaches and individual training approaches that are most effective at building winning teams or developing top athletes. For example, the knowledge management system 362 can compare practice and training approaches for very successful teams with those used by less successful teams to identify practice and training approaches that may be used to improve team performance. In another example, the knowledge management system 362 can compare shooting drills between highly accomplished shooters, moderately accomplished shooters and inexperienced or less accomplished shooters to identify shooting drills or practice/training approaches that may be used to develop a player's shooting ability. In addition, similar to the techniques described above for making training recommendations to rehabilitate injuries, the system 100 may track the training techniques used by players and assess the performance improvement that one or more techniques have on a particular shooting parameter to determine which training techniques (e.g., shooting parameters) have the greatest impact on that shooting parameter. When a particular shooting parameter is in a certain range (e.g., below a predefined threshold) or when a user provides an input indicating that a player would like to improve a certain shooting parameter, the system 100 may then recommend techniques that have historically had the greatest impact on such shooting parameter for other players. Similar techniques may be used for other types of performance parameters, such as dribbling parameters or defensive parameters, as may be desired.

In another embodiment, the knowledge management system 362 can analyze the performance data 378 from the systems 100 to determine practice approaches and individual training approaches that are most effective at correcting offensive or defensive parameter deficiencies. For example, the knowledge management system 362 can compare practice and training approaches used by shooters 112 having low entry angles to identify those practice and training approaches that resulted in an improvement in the shooter's entry angle. In another example, the knowledge management system 362 can compare practice and training approaches used by shooters having a common lateral position deficiency for particular shots (e.g., baseline shots to the left) to identify those practice and training approaches that resulted in an improvement in the shooter's lateral position for the particular shot.

The knowledge management system 362 can also analyze the performance data 378 from the system to determine practice approaches and individual training approaches that are most effective at developing a new skill for the player or improving the overall pace of development for the player. For example, the knowledge management system 362 can compare practice and training approaches used by players to develop a behind-the-back dribble technique to identify those practice and training approaches that resulted in the player being able to quickly and efficiently develop a behind-the-back dribble.

As shown by FIG. 16, evaluation data 382 and performance data 378 can be stored in memory 366 at the server 350. The performance data 378 can include the performance information on the gyms/teams/individuals acquired by each system 100 and provided to the server 350. In another embodiment, the performance data 378 can also include information on training exercises, programs and/or regimens that have been utilized with individual systems 100. For example, the performance data 378 can include information on programs used for skills training (e.g., shooting drills, rebounding drills, dribbling drills, defensive drills, blocking out drills, etc.), offensive set training (i.e., how to most effectively teach new plays), or conditioning training.

In an embodiment, the performance data 378 can be anonymized for privacy concerns by either the systems 100 before providing the information to the server 350 or by the server 350 on receipt of the information from the systems 100. In another embodiment, a portion of the performance data 378 may not be anonymized (e.g., performance data 378 obtained from games), while the remainder of the performance data 378 can be anonymized (e.g., performance data 378 obtained from practice or training sessions). The portion of the performance data 378 that is not anonymized may be attributed to individual players and or teams. The performance data 378 (both attributed and anonymized performance data 378) can be processed by the device logic 360 and/or the knowledge management system 362 to generate the evaluation data 382. In one embodiment, the knowledge management system 362 can generate evaluation data 382 by aggregating the performance data 378 (including both attributed and anonymized performance data 378) from the systems 100 and analyzing the aggregated information to identify information that can be used to improve the performance of a player and/or team. In another embodiment, the knowledge management system 362 can generate evaluation data 382 by aggregating the anonymized performance data 378 and then analyzing the attributed performance data 378 with the aggregated and anonymized performance data 378 from the systems 100 to generate insights regarding how a player or team may perform in the future.

The evaluation data 382 can include data and information obtained from the knowledge management system 362 as a result of the processing and analyzing the performance data 378. The evaluation data 382 can include aggregated performance information associated with one or more offensive and/or defensive parameters and aggregated training information associated with one or more training/practice approaches used by teams and/or individuals. The aggregated information may be categorized based on individual players, teams, programs (e.g., a high school program including a varsity team, a junior varsity team, a freshman team, etc.), regions (e.g., one or more states, counties, cities, etc.), leagues/conferences, organizations (e.g., Amateur Athletic Union (AAU)), genetic characteristics (e.g., human genome) and any other suitable or desired categorization. The evaluation data 382 can also include training information, such as diagrams and videos, on "proper" offensive and/or defensive techniques that can be provided to systems 100 for use by individuals using the systems 100. The evaluation data 382 may include one or more testing procedures based on "proper" offensive and/or defensive technique form that can be used to evaluate the performance of a user.

The scheduling logic 363 can provide a scheduling portal for third parties to be able to reserve a facility (e.g., a gymnasium or sports field) with a corresponding system 100 for personal use. The user or administrator of a system 100 (or the system 100 itself) can provide information to server 350 (and the scheduling logic 363) as to the days/times when the facility is in use (or alternatively, when the facility is available). In one embodiment, the availability information for a facility can be included with the performance data provided by the system 100 to the server 350. However, in other embodiments, the system 100 can provide the availability information separate from the performance data.

The scheduling logic 363 can then use the availability information from the system 100 to determine the days/times when the facility may be available for use by third parties. Once the scheduling logic 363 has determined when a facility is available for use by third parties, a third party can then use the scheduling portal to determine the availability of the facility and reserve the facility for his/her use. The scheduling portal can also be used to collect any information (e.g., contact information, insurance information, intended use, etc.) and payments required by the facility to complete a reservation by a third party and before the facility may be used by the third party. Once the reservation has been completed, the scheduling logic 363 can push an update to the system 100 providing the time when the facility will be used by the third party, the required information from the third party to complete the reservation, and the payment information. In another embodiment, the scheduling logic 363 may also send a notification to a user or administrator of the system 100 informing them of the reservation by the third party.

The scheduling portal can be used by a third party to search for available facilities (if more than one facility has provided availability information) and available times for the facility. In addition, the scheduling portal may be able to provide the third party with an image(s) of the facility using the camera(s) 118 of the system 100 prior to the third party making a reservation. In one embodiment, the third party can decide to use the system 100 at the facility during the reserved time or to have the system 100 inactive when the third party is using the facility. In another embodiment, a facility without a system 100 can also provide availability information to server 350 for use by scheduling logic 363.

In one embodiment, as described above, the analysis software 208 may implement a machine learning system to evaluate the performance of the player. The machine learning system can receive as inputs the sensor/camera data 205 and/or other information or data that is stored in memory 207 and generate an output that is indicative of the performance of the player. The output of the machine learning system can then be used to make a determination regarding the performance of the player. In one embodiment, the output of the machine learning system can be a probability value such that the higher (or lower) the value from the machine learning system, the greater the probability that the player is performing at a higher level with respect to other players.

The machine learning system can evaluate a plurality of parameters associated with an action by the player to generate the output. The plurality of parameters evaluated by the machine learning system may correspond to parameters provided by the analysis software 208 (e.g., parameters indicative of a trajectory of a shot), but the plurality of parameters may also include "self-generated" parameters from the machine learning system. The self-generated parameters can be determined by nodes of a neural network implementing a deep learning process to improve the output. The self-generated parameters can be based on information or data from one or more of the sensor/camera data 205 or memory 207.

Prior to using the machine learning to evaluate the actions of a player, the machine learning system can be trained. The training of the machine learning system can involve the providing of numerous inputs (e.g., thousands of input or more) to the machine learning system to train it to learn parameters that are indicative of player performance. As an example, any of the types of sensors described herein (e.g., cameras) may be used to capture the historical data associated with the player (and/or other players) taking a large number of shots, and this data may include the raw sensor data and/or processed sensor data, such as parameters (e.g., trajectory parameters or body motion parameters) measured from the sensor data. The analysis software 208 implementing a machine learning system may analyze such data to learn parameters indicative of performance. In the context of a neural network, the learned parameters may be defined by values stored in the nodes of neural network for transforming input to the desired output. In this way, the machine learning system may learn which performance characteristics are likely indicative of good performance, such as the entry angle being within a desired range, and evaluate parameters indicative of such characteristics to make an assessment about the player performance. The machine learning system may also learn which characteristics are indicative of high confidence in the assessing the player's skill. As an example, the machine learning system may determine that an assessment based on a certain characteristic (e.g., entry angle) may have a higher confidence or likelihood of being accurate when samples of the characteristic are within a certain range or have a deviation within a certain range. As an example, less deviation in a certain shooting characteristic may indicate that the samples captured by the system 100 for the shooting characteristic are more likely to accurately reflect the player's actual skill for the shooting characteristic.

The machine learning may be used to implement the concepts described above or similar to the concepts described above for non-machine learning embodiments. As an example, as described above, it is possible for certain trajectory parameters, when in certain ranges, to be indicative of good performance. When the analysis software 208 implements a machine learning system, it may learn the necessary parameters so that when the trajectory parameters are in the ranges indicative of good performance, the output of the machine learning system indicates that the player is performing at a good level.

In some embodiments, the machine learning system implemented by the analysis software 208 may be trained using shot data from a large number of shots (or other types of actions) taken by a plurality of users. During training, the machine learning system may be configured to learn parameters indicative of performance characteristics that likely show good performance or poor performance. Such parameters may be based on the trajectory of the object being launched by the player or of body motions of the player in launching the object (or performing another type of action).

Information passed between the different components in the system may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A system for evaluating player performance, comprising:
   at least one sensor for capturing images of a player performing a basketball shot for which the player shoots a basketball toward a basketball goal;
   at least one processor programmed with instructions that, when executed by the at least one processor, cause the at least one processor to:
      analyze the images to determine a trajectory of the basketball during the basketball shot,
      based on the determined trajectory, determine a first location or direction from which the basketball was shot by the player for the basketball shot;
      based on the determined first location or direction, select a reference point for use in evaluating a performance of the player for the basketball shot,
      based on the images, determine a second location of the basketball along the trajectory,
      calculate a first value indicating a distance of the second location from the reference point, and
      provide, based on the first value, performance information indicating the performance of the player for the basketball shot; and
   an output mechanism configured to display the performance information, wherein the displayed performance information includes the first value, a first area that is color coded based on the first value, or a graphical element having a shape that is controlled based on the first value.

2. The system of claim 1, wherein the displayed performance information includes the first value, and wherein the first value or the first area is color coded in the displayed performance information based on the first value.

3. The system of claim 1, wherein the distance corresponds to a lateral position of the second location from the reference point.

4. The system of claim 1, wherein the distance corresponds to a depth of the second location from the reference point.

5. The system of claim 1, wherein the instructions, when executed by the at least one processor, cause the at least one processor to:
   based on the determined trajectory, identify a region from which the basketball was shot by the player for the basketball shot; and determine, based on the images, whether the basketball shot is made,
wherein the displayed performance information is based on the identified region and indicates whether the basketball shot is determined to be made.

6. The system of claim 5, wherein the displayed performance information indicates the identified region.

7. The system of claim 5, wherein the instructions, when executed by the at least one processor, cause the at least one processor to:
based on whether the basketball shot is determined to be made, calculate a second value associated with the identified region and indicating a performance of the player in taking a plurality of basketball shots from the identified region,
wherein the displayed performance information includes the second value or a second area that is color coded based on the second value.

8. The system of claim 7, wherein the displayed performance information includes the second value.

9. The system of claim 7, wherein the second value indicates an average of the plurality of basketball shots determined to be made.

10. The system of claim 1, wherein the instructions, when executed by the at least one processor, cause the at least one processor to:
based on the first value, calculate a second value indicating a performance of the player in taking a plurality of basketball shots,
wherein the displayed performance information includes the second value, a second area that is color coded based on the second value, or a graphical element having a shape that is controlled based on the second value, and wherein the second value indicates a consistency of depth position or lateral position for the plurality of basketball shots.

11. A method for evaluating player performance, comprising:
capturing, with at least one sensor, images of a player performing a basketball shot for which the player shoots a basketball toward a basketball goal;
analyzing, with at least one processor, the images to determine a trajectory of the basketball during the basketball shot;
determining, with the at least one processor based on the determined trajectory, a first location or direction from which the basketball was shot by the player for the basketball shot;
selecting, with the at least one processor based on the determined first location or direction;
a reference point for use in evaluating a performance of the player for the basketball shot;
determining, with the at least one processor based on the images, a second location of the basketball along the trajectory,
calculating, with the at least one processor, a first value indicating a distance of the second location from the reference point,
providing, with the at least one processor, based on the first value, performance information indicating the performance of the player for the basketball shot; and
displaying, with an output mechanism, the performance information, wherein the displayed performance information includes the first value; a first area that is color coded based on the first value, or a graphical element having a shape that is controlled based on the first value.

12. The method of claim 11, wherein the displayed performance information includes the first value, and wherein the first value or the first area is color coded in the displayed performance information based on the first value.

13. The method of claim 11, wherein the distance corresponds to a lateral position of the second location from the reference point.

14. The method of claim 11, wherein the distance corresponds to a depth of the second location from the reference point.

15. The method of claim 11, further comprising:
identifying, with the at least one processor based on the determined trajectory, a region from which the basketball was shot by the player for the basketball shot; and
determining, with the at least one processor based on the images, whether the basketball shot is made,
wherein the displayed performance information is based on the identified region and indicates whether the basketball shot is determined to be made.

16. The method of claim 15, wherein the displayed performance information indicates the identified region.

17. The method of claim 15, further comprising:
calculating, with the at least one processor based on whether the basketball shot is determined to be made, a second value associated with the identified region and indicating a performance of the player in taking a plurality of basketball shots from the identified region,
wherein the displayed performance information includes the second value or a second area that is color coded based on the second value.

18. The method of claim 17, wherein the displayed performance information includes the second value.

19. The method of claim 17, wherein the second value indicates an average of the plurality of basketball shots determined to be made.

20. The method of claim 11, further comprising:
calculating, with the at least one processor based on the first value, a second value indicating a performance of the player in taking a plurality of basketball shots,
wherein the displayed performance information includes the second value, a second area that is color coded based on the second value, or a graphical element having a shape that is controlled based on the second value, and wherein the second value indicates a consistency of depth position or lateral position for the plurality of basketball shots.

21. A system for evaluating player performance, comprising:
at least one sensor for capturing images of a player performing a basketball shot for which the player shoots a basketball toward a basketball goal;
at least one processor programmed with instructions that, when executed by the at least one processor, cause the at least one processor to:
analyze the images to determine a trajectory of the basketball during the basketball shot,
based on the determined trajectory, determine a location or direction from which the basketball was shot by the player for the basketball shot;
based on the determined location or direction, set a reference parameter for use in evaluating a performance of the player for the basketball shot,
calculate a first value indicating a difference between the reference parameter and the trajectory, and
provide, based on the first value, performance information indicating the performance of the player for the basketball shot; and an output mechanism configured to display the performance information, wherein the displayed performance information includes the first value, a first area that is color coded based on the first value, or a graphical element having a shape that is controlled based on the first value.

22. The system of claim 21, wherein the displayed performance information includes the first value, and wherein the first value or the first area is color coded in the displayed performance information based on the first value.

23. The system of claim 22, wherein the displayed performance information indicates the identified region.

24. The system of claim 23, wherein the displayed performance information includes the second value.

25. The system of claim 23, wherein the second value indicates an average of the plurality of basketball shots determined to be made.

26. The system of claim 22, wherein the instructions, when executed by the at least one processor, cause the at least one processor to:
based on whether the basketball shot is determined to be made, calculate a second value associated with the identified region and indicating a performance of the player in taking a plurality of basketball shots from the identified region,
wherein the displayed performance information includes the second value or a second area that is color coded based on the second value.

27. The system of claim 21, wherein the instructions, when executed by the at least one processor, cause the at least one processor to:
based on the determined trajectory, identify a region from which the basketball was shot by the player for the basketball shot; and
determine, based on the images, whether the basketball shot is made,
wherein the displayed performance information is based on the identified region and indicates whether the basketball shot is determined to be made.

28. The system of claim 21, wherein the instructions, when executed by the at least one processor, cause the at least one processor to:
based on the first value, calculate a second value indicating a performance of the player in taking a plurality of basketball shots,
wherein the displayed performance information includes the second value, a second area that is color coded based on the second value, or a graphical element having a shape that is controlled based on the second value, and wherein the second value indicates a consistency of the trajectory for the plurality of basketball shots.

* * * * *